(12) United States Patent
Fearing et al.

(10) Patent No.: US 10,951,134 B2
(45) Date of Patent: Mar. 16, 2021

(54) REPULSIVE-FORCE ELECTROSTATIC ACTUATOR

(71) Applicant: The Regents of the University of California, Oakland, CA (US)

(72) Inventors: Ronald S. Fearing, Orinda, CA (US); Ethan W. Schaler, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 28 days.

(21) Appl. No.: 16/250,522

(22) Filed: Jan. 17, 2019

(65) Prior Publication Data

US 2019/0222141 A1 Jul. 18, 2019

Related U.S. Application Data

(60) Provisional application No. 62/618,381, filed on Jan. 17, 2018.

(51) Int. Cl.
| | |
|---|---|
| *H02N 1/00* | (2006.01) |
| *B25J 9/12* | (2006.01) |
| *G02B 26/08* | (2006.01) |
| *B41J 2/14* | (2006.01) |
| *B25J 7/00* | (2006.01) |

(52) U.S. Cl.
CPC ............. *H02N 1/004* (2013.01); *B25J 9/12* (2013.01); *B25J 7/00* (2013.01); *B41J 2/14314* (2013.01); *G02B 26/0841* (2013.01)

(58) Field of Classification Search
CPC .......... H02N 1/04; H02N 1/004; H02N 1/006; H02N 1/06; B25J 9/12; B25J 7/00; G02B 26/0841; B41J 2/14314
USPC ................................................... 310/300, 309
See application file for complete search history.

(56) References Cited

U.S. PATENT DOCUMENTS

| | | | | |
|---|---|---|---|---|
| 2004/0189144 A1* | 9/2004 | Gondoh | ................. | H02N 1/004 310/309 |
| 2012/0268386 A1* | 10/2012 | Karamath | ............... | G06F 3/041 345/173 |
| 2017/0331397 A1* | 11/2017 | Kim | ........................ | H02N 2/18 |

* cited by examiner

*Primary Examiner* — Thomas Truong
(74) *Attorney, Agent, or Firm* — Venable LLP; Henry J. Daley

(57) ABSTRACT

A repulsive-force electrostatic actuator includes a first actuator layer including a first substrate, a first electrode pattern, and a second electrode pattern. The actuator includes a second actuator layer spaced apart from the first actuator layer that includes a second substrate, a third electrode pattern, and a fourth electrode pattern. The actuator includes a voltage source connected to the first, second, third, and fourth electrode patterns such that the first electrode pattern is at an opposite voltage relative to the second, the third electrode pattern is at an opposite voltage relative to the fourth, and the first and second actuator layers are arranged to have a repulsive electrostatic force therebetween. The actuator further includes an actuator frame connected to the first and second actuator layers such that at least a portion of at least one of the first and second actuator layers is movable due to an applied voltage to effect motion to an object.

21 Claims, 49 Drawing Sheets

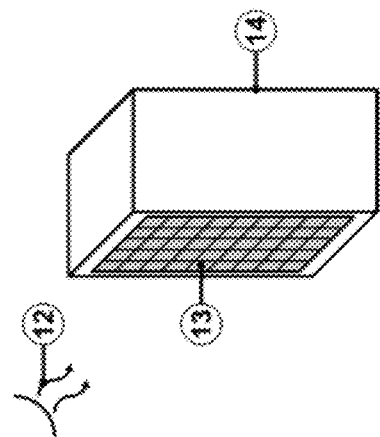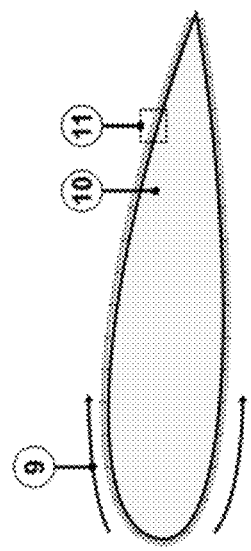
FIG. 9

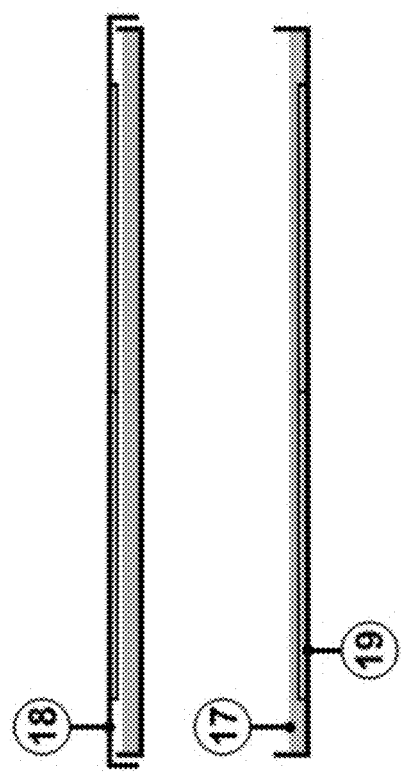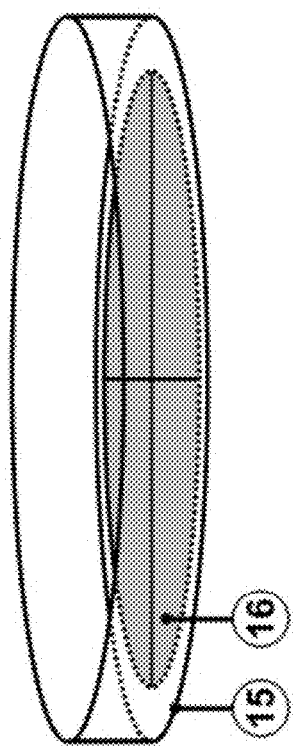
FIG. 10

Table 1
Survey of meso-scale electrostatic actuators, with key normalized metrics highlighted in grey.

| Design | A / mm × mm | L / mm | ΔL / mm | ε / % | E / V/m | F / N | F/A / N/m² | BW / Hz | Source |
|---|---|---|---|---|---|---|---|---|---|
| Dielectric Elastomer | 0.070 × 1.8 | 31 | - | +61* | 40·10⁶* | 0.75 | 600·10³ | 18 | [20] |
| Parallel Plate Inchworm | 0.040 × 1.86 | 0.97 | 0.124 | +13 | 21·10⁶ | 0.23·10⁻³ | 1.38·10³ | 35* | [31] |
| Integrated Force Array | 0.0972 × 1 | 10 | 0.700 | -7.0 | 80·10⁶ | 60·10⁻⁶ | 28·10³ | - | [22] |
| Stacked Electrostatic | 54 × 54 | 2.27 | 0.430 | -20.5 | 28·10⁶ | 1.27 | 400 | - | [15] |
| Electrostatic Film Slider | 80 × 100 | 0.380 | - | - | 14.3·10⁶ | 4.4 | 550 | - | [23] |
| Distributed Electrostatic | 0.005 × 8 | 5 | 0.028 | -0.6 | 33·10⁶ | 0.33·10⁻⁶ | 31.5 | 1.6* | [13] |
| Distributed Electrostatic | 33 × 28 | 11 | 4 | -36 | 9·10⁶ | - | - | - | [12] |
| Zipper Electrostatic | 80 × 10 | 18.1 | 18 | -99* | 110·10⁶ | 1 | 1 | 12 | [14] |
| Repulsive Force | 0.26 × 3.66 | 0.084 | 0.086 | +2600 | 3.6·10⁶ | 0.19·10⁻⁶* | 2.5* | 50-250 | [18] |
| V1-A | 80 × 10 | 0.198 | - | - | 2·10⁶ | 2.74·10⁻³ | 3.4 | - | This Work |
| V1-B | 25 × 10 | 0.380 | - | - | 2·10⁶ | 1.04·10⁻³ | 4.2 | - | This Work |
| V2 | 35 × 10 | 0.831 | 0.611 | +13.9 | 40·10⁶ | 9.03·10⁻³ | 26.1 | 45 | This Work |

A – area (orthogonal to stroke axis); L – length (parallel to stroke axis); E – electric field strength; ΔL – stroke length; ε – strain (ΔL/L, with + indicating expansion); F – force; F/A – area force density; BW – frequency bandwidth. (*) denotes properties calculated from provided information.

FIG. 13

Table 1. Operational performance of this work's 2-DoF micro-mirror and comparison to existing electrostatic micro-mirror systems.

| Design | Mechanical | | Electrical | | | Performance | | | Source |
|---|---|---|---|---|---|---|---|---|---|
| | Process | A (mm × mm) | DoF (#) | V (V) | E (MV/m) | BW (Hz) | θ (°) | ΔZ (μm) | |
| Attractive Force | Micro-Masonry | 0.9 × 0.9 | 3 | 80 | 2.1 | 1200 | 3.5 | 0.5 | [1] |
| Repulsive Force | PolyMUMPS | 3.3 × 3.3 | 3 | 200 | 3.8 | 200 | ±1.5 | 86 | [2] |
| 2-Layer RFA | Wet Etch | 45 × 1.5 | 1 | 1000 | 40 | 16 | 5.1 | — | [7] |
| 2-Layer RFA | Wet Etch | 25 × 10 | 1 | 2000 | 40 | 43 | — | 511 | [7] |
| 4-Layer RFA | Laser | 60 × 60 | 2 | 2000 | 33 | 35 | 8.8 / 7.6 | — | This Work |

A – Area   DoF – Degrees of Freedom   V – Voltage   E – Electric Field Strength   BW – Bandwidth   θ – Angular Displacement
ΔZ – Normal Displacement

FIG. 39

REPULSIVE-FORCE ELECTROSTATIC ACTUATOR

CROSS-REFERENCE TO RELATED APPLICATION

This application claims benefit to U.S. provisional application No. 62/618,381, filed on Jan. 17, 2018, the entire content of which is incorporated by reference herein.

STATEMENT OF GOVERNMENT SUPPORT

This invention was made with government support under Grant Numbers 1427096, 1461157, and 0939514 awarded by the National Science Foundation. The government has certain rights in the invention.

BACKGROUND

1. Technical Field

The field of the currently claimed embodiments of this invention relates to electrostatic actuators and products that incorporate the actuators, and more particularly to repulsive-force electrostatic actuators and products that incorporate the repulsive-force electrostatic actuators.

2. Discussion of Related Art

Electrostatic actuators typically consist of sets of moveable electrodes (conductive plates or combs) separated by an insulating dielectric, with electrostatic forces proportional to the charge accumulation on and electric fields between electrodes due to an applied electric potential. In repulsive-force actuators, the moveable electrodes repel each other. However, conventional repulsive force actuators have numerous problems, including shorting between electrodes within a layer as well as possible shorting of electrodes between layers. Because of these and other problems with current repulsive-force electrostatic actuators, there remains a need for improved repulsive-force electrostatic actuators.

SUMMARY

A repulsive-force electrostatic actuator according to some embodiments includes a first actuator layer including a first substrate of a first dielectric material having a first transverse thickness and two opposing surfaces, a first electrode pattern at least one of attached to or formed on one of the two opposing surfaces of the first substrate, and a second electrode pattern at least one of attached to or formed on the other one of the two opposing surfaces of the first substrate so as to be on an opposing side with respect to the first electrode pattern. The first and second electrode patterns are substantially a same pattern, and the first and second electrode patterns are substantially aligned with each other in a direction of the first transverse thickness on the two opposing surfaces of the first substrate.

The repulsive-force electrostatic actuator according to some embodiments further includes a second actuator layer spaced apart from the first actuator layer with at least one of a vacuum, air, a gas or a dielectric material therebetween, the second actuator layer including a second substrate of a second dielectric material having a second transverse thickness and two opposing surfaces, a third electrode pattern at least one of attached to or formed on one of the two opposing surfaces of the second substrate, and a fourth electrode pattern at least one of attached to or formed on the other one of the two opposing surfaces of the second substrate so as to be on an opposing side with respect to the third electrode pattern. The third and fourth electrode patterns are substantially the same pattern of the first and second electrode patterns. The third and fourth electrode patterns are substantially aligned with each other in a direction of the second transverse thickness on the two opposing surfaces of the second substrate.

The repulsive-force electrostatic actuator according to some embodiments further includes at least one voltage source connected to the first, second, third and fourth electrode patterns such that, during operation, each is entirely at a common voltage across the corresponding electrode pattern, the first electrode pattern is at an opposite voltage relative to the second electrode pattern, the third electrode pattern is at an opposite voltage relative to the fourth electrode pattern, and the first and second actuator layers are arranged to have a repulsive electrostatic force therebetween during operation.

The repulsive-force electrostatic actuator according to some embodiments further includes an actuator frame connected to the first and second actuator layers such that at least a portion of at least one of the first and second actuator layers is movable due to an applied voltage to effect motion to an object at least one of attached to or in mechanical connection to the repulsive-force electrostatic actuator when in operation.

BRIEF DESCRIPTION OF THE DRAWINGS

Further objectives and advantages will become apparent from a consideration of the description, drawings, and examples.

FIG. 4 shows force vs. distance between layers at 750 V (left), and FIG. 5 shows force vs. voltage for a 25 µm gap between layers.

FIG. 9 shows two examples of surface actuator arrays according to some embodiments of the current invention.

FIG. 10 is a schematic illustration of an embodiment of an array of actuators according to an embodiment of the current invention attached to a petri dish.

FIG. 13 shows Table 1, a survey of meso-scale electrostatic actuators, with key normalized metrics highlighted in grey.

FIG. 39 shows a table listing operational performance of a 2-DoF micro-mirror according to some embodiments of the invention and a comparison to existing electrostatic micro-mirror systems.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "air" is intended to cover ordinary atmospheric environments such that it can include a mixture of atmospheric gases as well as possibly containing some suspensions of particles and/or liquid droplets.

The term "gas" is intended to include either chemically pure gas types and/or mixtures of chemically pure gas types.

An embodiment of the current invention is a planar electrostatic actuator, which uses a novel electrode pattern to generate a repulsive force. It uses adjacent electrodes at the same potential, which allows greatly increased electric field strength. Unlike previous electrostatic actuators, the device does not short if opposing electrodes are brought into contact. In some embodiments, an actuator array can be printed over large areas at low cost to make visual displays or sound walls. Some embodiments can provide large arrays for signs, large actuator arrays for building shading, large actuator arrays for synthetic sound sources, noise cancelling walls, and actuator arrays for biological tissue growth control. In principle, some embodiments can be scaled up to higher stress, low-cost, light weight artificial muscles.

Figure 1:
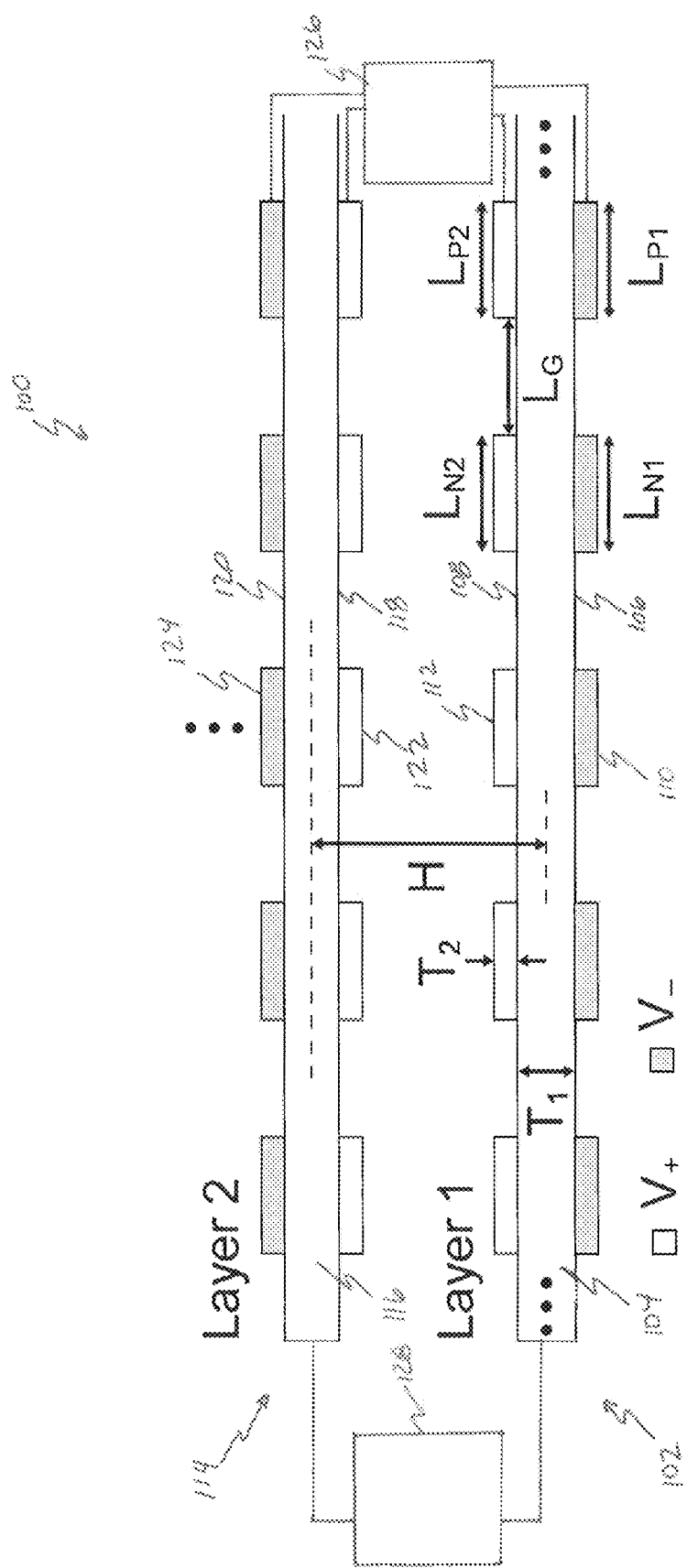
FIG. 1 shows an electrode configuration according to some embodiments of the invention with cross-section showing two double-sided layers. The gap H may be air, insulating gas, insulating foam, or vacuum, for example. Note that adjacent electrodes may not be at the same potential.
Figure 2:
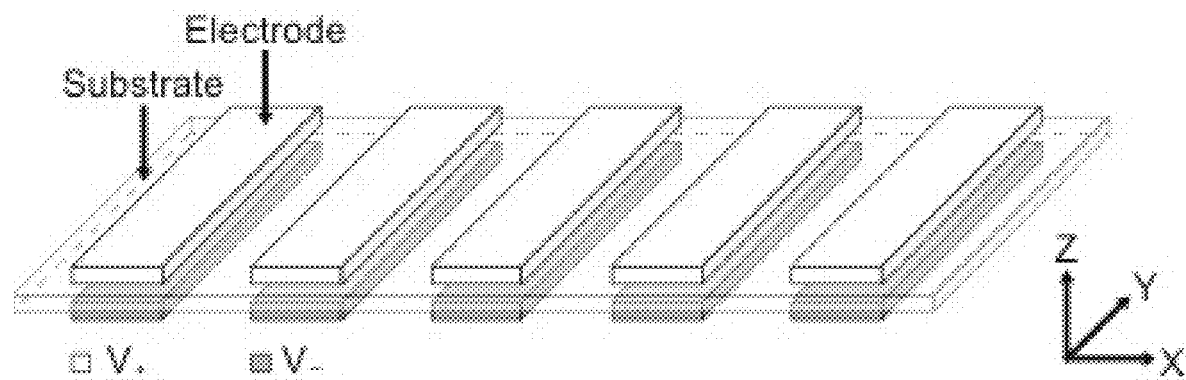
FIG. 2 shows detail of one layer of the device according to some embodiments. Each layer may include thin conductive electrodes on opposite sides of an insulating dielectric. Layers 1 and 2 repel one another (in Z-direction) when an electric potential (voltage) is applied across the electrodes (indicated with $V_+$ and $V_-$). Note that electric breakdown is not likely across H or between co-planar electrodes, due to operation at the same electric potential.
Figure 3:
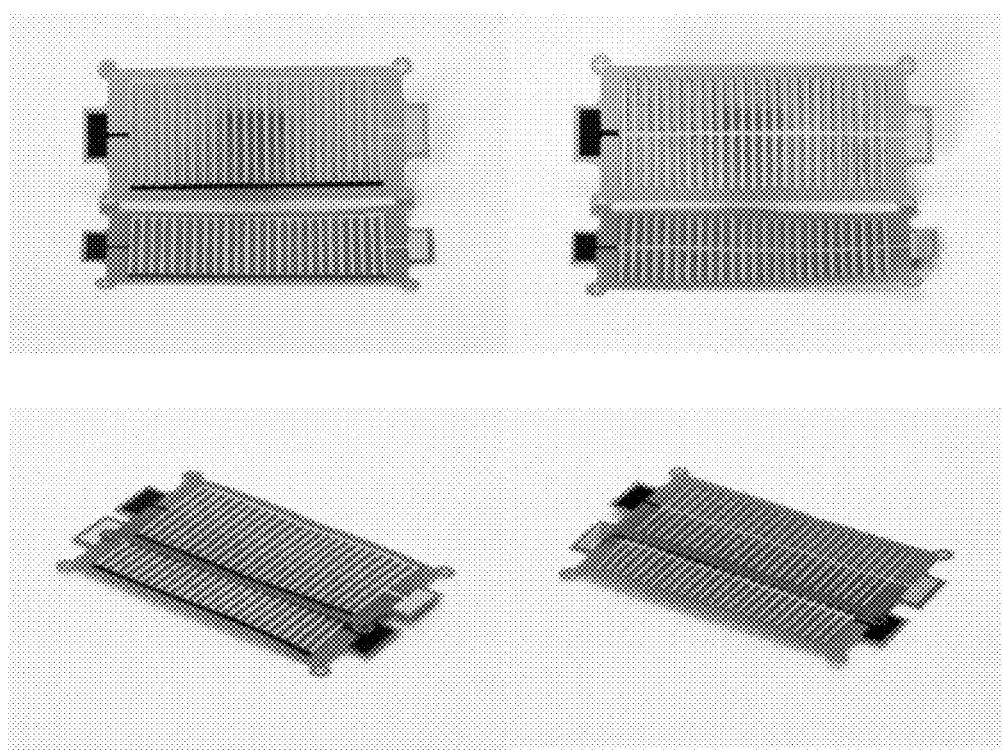
FIG. 3 shows two possible variations on electrode configuration. The left figures represent an actuator electrode geometry ideal for out-of-plane rotational motion; the right figures represent an actuator electrode geometry ideal for out-of-plane translational motion.
Figure 4:
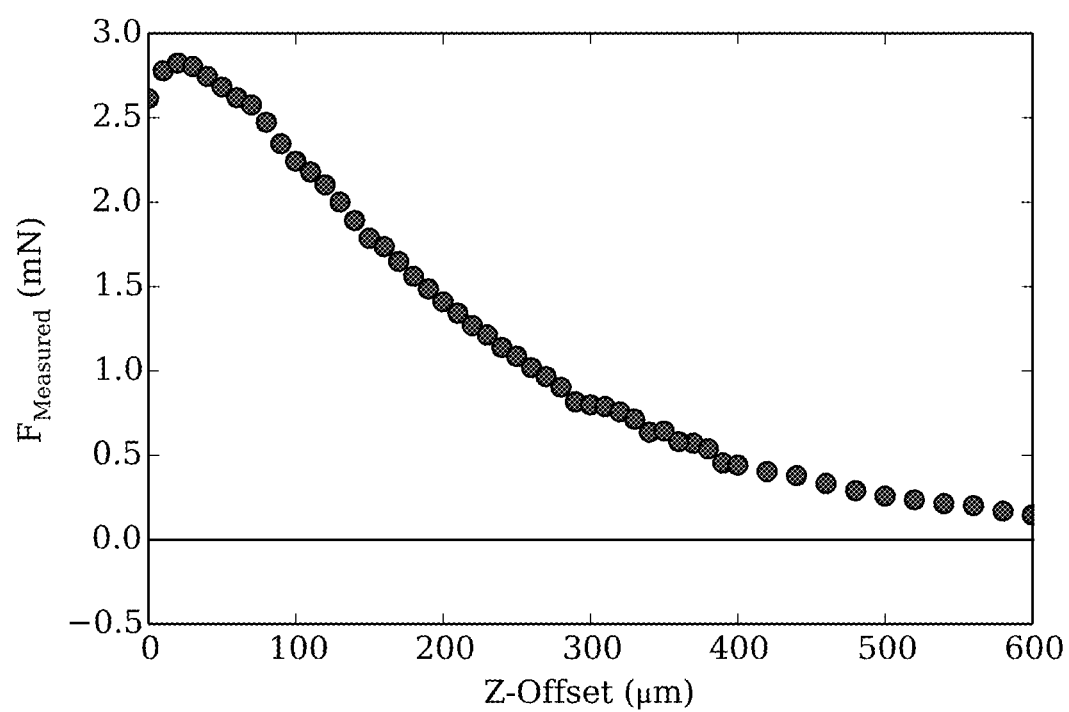
FIGS. 4 and 5 show force profiles for a sample actuator (two 25 mm×10 mm actuator layers).
Figure 5:
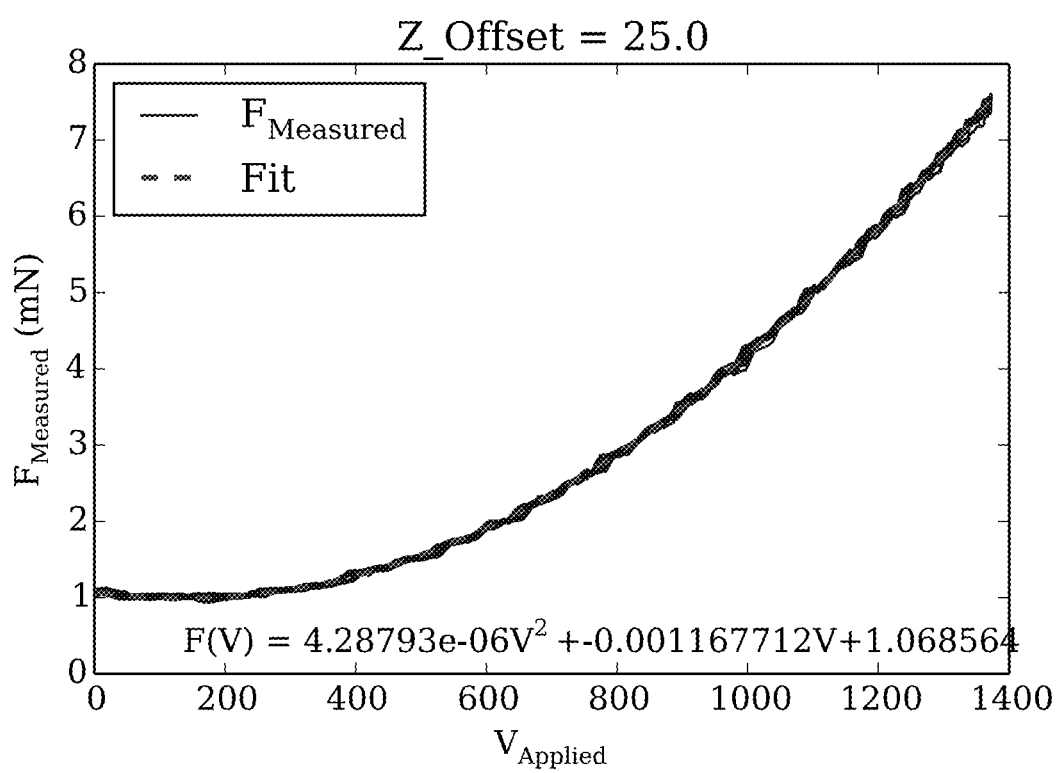

An embodiment of the current invention is directed to a repulsive-force electrostatic actuator that has a novel electrode configuration. The configuration according to some embodiments is shown in FIGS. 1 and 2. Sample fabricated actuator layers are shown in FIG. 3. Performance of a fabricated actuator is shown in FIG. 4.

FIG. 1 shows a repulsive-force electrostatic actuator 100 according to some embodiments of the invention. The repulsive-force electrostatic actuator 100 includes a first actuator layer 102 including a first substrate 104 of a first dielectric material having a first transverse thickness $T_1$ and two opposing surfaces 106, 108. The first actuator layer 102 also includes a first electrode pattern 110 at least one of attached to or formed on one of the two opposing surfaces 106, 108 of the first substrate 104, and a second electrode pattern 112 at least one of attached to or formed on the other one of the two opposing surfaces 106, 108 of the first substrate 104 so as to be on an opposing side with respect to the first electrode pattern 110. The first electrode pattern 110 and second electrode pattern 112 are substantially a same pattern. The first electrode pattern 110 and second electrode pattern 112 are substantially aligned with each other in a direction of the first transverse thickness $T_1$ on the two opposing surfaces 106, 108 of the first substrate 104.

The repulsive-force electrostatic actuator 100 includes a second actuator layer 114 spaced apart from the first actuator layer 102 with at least one of a vacuum, air, a gas or a dielectric material therebetween. The second actuator layer 114 includes a second substrate 116 of a second dielectric material having a second transverse thickness and two opposing surfaces 118, 120. The second actuator layer 114 includes a third electrode pattern 122 at least one of attached to or formed on one of the two opposing surfaces 118, 120 of the second substrate 116, and a fourth electrode pattern 124 at least one of attached to or formed on the other one of the two opposing surfaces 118, 120 of the second substrate 116 so as to be on an opposing side with respect to the third electrode pattern 122. The third electrode pattern and fourth electrode pattern are substantially the same pattern of the first electrode pattern 110 and second electrode pattern 112. The third electrode pattern 122 and fourth electrode pattern 124 are substantially aligned with each other in a direction of the second transverse thickness on the two opposing surfaces 118, 120 of the second substrate 116.

The repulsive-force electrostatic actuator 100 further includes at least one voltage source 126 connected to the first electrode pattern 110, second electrode pattern 112, third electrode pattern 122, and fourth electrode pattern 124 such that, during operation, each is entirely at a common voltage across the corresponding electrode pattern, the first electrode pattern 110 is at an opposite voltage relative to the second electrode pattern 112, the third electrode pattern 122 is at an opposite voltage relative to the fourth electrode pattern 124, and the first and second actuator layers 102, 114 are arranged to have a repulsive electrostatic force therebetween during operation.

The repulsive-force electrostatic actuator 100 further includes an actuator frame 128 connected to the first and second actuator layers 102, 114 such that at least a portion of at least one of the first and second actuator layers 102, 114 is movable due to an applied voltage to effect motion to an object at least one of attached to or in mechanical connection to the repulsive-force electrostatic actuator 100 when in operation.

According to some embodiments, the first and second substrates 104, 116 are each at least one of a thin film or a sheet of a first dielectric material and a second dielectric material, respectively. According to some embodiments, the first and second dielectric materials are each selected from at least one of a polyimide or biaxially-oriented polyethylene terephthalate. According to some embodiments, the first and second dielectric materials are the same dielectric material. According to some embodiments, the first and second dielectric materials are both poly (4,4'-oxydiphenylene-pyromellitimide).

According to some embodiments of the invention, the actuator frame 128 is connected to the first and second actuator layers 102, 114 such that one edge thereof is held relatively fixed and an opposite edge is free to move with a cantilever motion. According to some embodiments, the actuator frame 128 is connected to the first and second actuator layers 102, 114 such that the at least one of the first and second actuator layers 102, 114 moves in a direction substantially orthogonal to the two opposing surfaces of the first and second substrates 104, 116 to provide substantially translational motion in operation while the first and second substrates 104, 116 remain substantially parallel to each other.

According to some embodiments of the invention, the at least one voltage source 126 is a high-voltage source capable of providing a voltage of at least 1 kV. According to some embodiments, the at least one voltage source 126 is a high-voltage source capable of providing a voltage of between 1 kV to 5 kV. According to some embodiments, the first, second, third and fourth electrode patterns 110, 122, 122, 124 each comprises a plurality of substantially parallel rectangular electrode portions interconnected by a substantially rectangular electrode portion. An example of such an electrode pattern is shown in FIG. 3. According to some embodiments, the first, second, third and fourth electrode patterns 110, 112, 122, 124 are each substantially a fractal electrode pattern. For example, the electrodes could be patterned into a Hilbert or Minkowski curve fractal pattern, which would have increased electrode perimeter in a finite area.

According to some embodiments of the invention, a width of the first electrode pattern 110 in a direction perpendicular to the first transverse thickness is greater than a width of the second electrode pattern 112 in the direction perpendicular to the first transverse thickness, and a width of the third electrode pattern 122 in a direction perpendicular to the second transverse thickness is less than a width of the fourth electrode pattern 124 in the direction perpendicular to the second transverse thickness. For example, in FIG. 6, the right-hand image shows the first and fourth electrode patterns, i.e., the outer electrode patterns, having a width $L_N$ that is greater than a width $L_P$ of the second and third electrode patterns, i.e., the inner electrode patterns.

According to some embodiments of the invention, the second electrode pattern 112 opposes and is spaced apart from the third electrode pattern 122 with at least one of a vacuum, air, a gas or a dielectric material therebetween. The opposing second electrode pattern 112 and third electrode pattern 122 are contained within a projection of the first electrode pattern 110 and the fourth electrode pattern 124. For example, in the right-hand image in FIG. 6, the inner electrodes are aligned with the outer electrodes. However, because the outer electrodes have a greater width than the inner electrodes, the opposing electrode patterns of the inner electrodes are contained within a projection for the outer electrode patterns.

According to some embodiments of the invention, the repulsive-force electrostatic actuator 100 further includes a third actuator layer spaced apart from the first and second actuator layers with at least one of a vacuum, air, a gas or a dielectric material therebetween. The third actuator layer includes a third substrate of a third dielectric material having a transverse thickness and two opposing surfaces, a fifth electrode pattern at least one of attached to or formed on one of the two opposing surfaces of the third substrate, and a sixth electrode pattern at least one of attached to or formed on the other one of the two opposing surfaces of the third substrate so as to be on an opposing side with respect to the fifth electrode pattern. The fifth and sixth electrode patterns are substantially the same pattern of the first and second electrode patterns, and the fifth and sixth electrode patterns are substantially aligned with each other in a direction of the transverse thickness on the two opposing surfaces of the third substrate. The at least one voltage source is further connected to the fifth and sixth electrode patterns such that, during operation, each is entirely at a common voltage across the corresponding electrode pattern, the fifth electrode pattern is at an opposite voltage relative to the sixth electrode pattern, and the first, second and third actuator layers are arranged to have repulsive electrostatic force with a closest one of the first, second and third actuator layers. The actuator frame is further connected to the third actuator layer such that at least a portion of at least one of the first, second and third actuator layers is movable due to an applied voltage to effect motion to an object at least one of attached to or in mechanical connection to the repulsive-force electrostatic actuator. An example of the repulsive-force electrostatic actuator 100 including a third actuator layer is shown in the right-hand image in FIG. 6.

According to some embodiments of the invention, the fifth and sixth electrode patterns each comprises a plurality of substantially parallel rectangular electrode portions interconnected by a substantially rectangular electrode portion. According to some embodiments, the fifth and sixth electrode patterns are each substantially a fractal electrode pattern.

According to some embodiments of the invention, the repulsive-force electrostatic actuator include four or more actuator layers, each actuator layer being spaced apart from an adjacent actuator layer. Each actuator layer haves an electrode pattern at an opposite voltage relative an electrode pattern of said adjacent actuator layer, and each actuator layer is arranged to have repulsive electrostatic force with said adjacent actuator layer. The repulsive-force electrostatic actuator may have any number of actuator layers. FIGS. 11, 30, 31, 34, 35.

Figure 11:
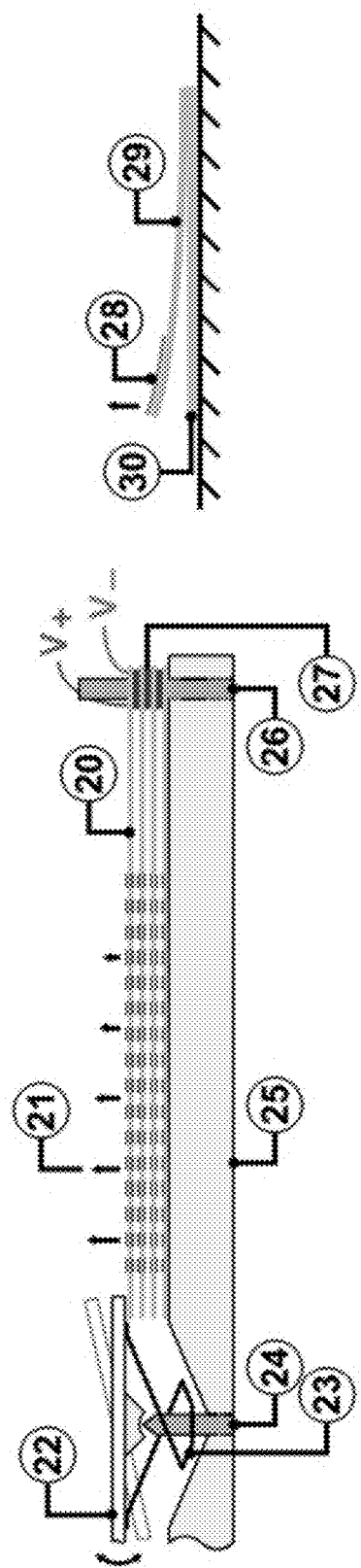
FIG. 11 is a schematic illustration of an embodiment of mirror or other optical component such as, but not limited to, a lens, diffraction grating, or frosted glass, that has at least one degree of freedom that is controlled by one or more actuators according to an embodiment of the current invention.

According to some embodiments of the invention, a steerable optical component includes an optical component attached to an assembly which allows motion in at least one degree of freedom; and a repulsive-force electrostatic actuator 100 arranged in mechanical connection with the optical component. Examples of steerable optical components according to some embodiments are shown in FIG. 11.

According to some embodiments of the invention, a surface coating includes a plurality of repulsive-force electrostatic actuators 100 arranged in an array to control interaction of at least one of a fluid or electromagnetic radiation interactions with a surface coated therewith. Examples of surface coatings according to some embodiments are shown in FIG. 9.

Figure 57:
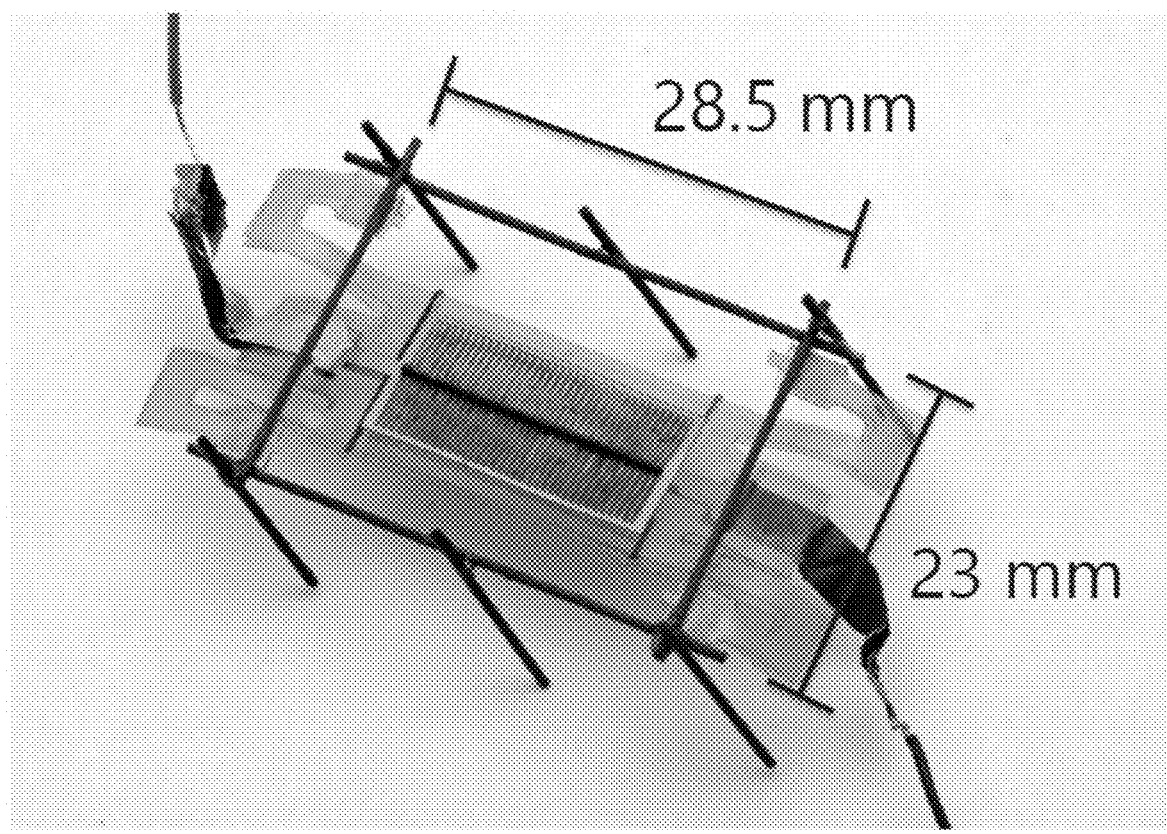
FIG. 57 shows a robot powered by a flexible repulsive force electrostatic actuator according to some embodiments of the invention.
Figure 58:
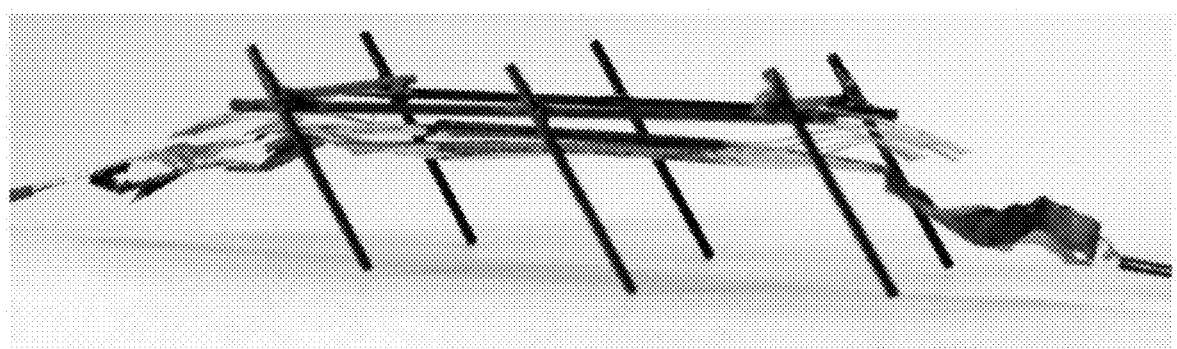
FIG. 58 shows a side view of the robot of FIG. 57.

According to some embodiments of the invention, a robotic device includes a plurality of repulsive-force electrostatic actuators 100 arranged to effect motion of the robotic device. An example robotic device according to some embodiments is shown in FIGS. 57 and 58.

According to some embodiments of the invention, a biological cell growth device includes a plurality of repulsive-force electrostatic actuators 100 arranged to effect motion of biological cells being grown or maintain therein. Examples of biological cell growth devices according to some embodiments are shown in FIG. 10.

The actuator electrode configuration disclosed herein can provide simple, cheap fabrication processes for physical actuators. We also demonstrate the first instance of fabrication of a dual double-sided layer repulsive force electrostatic actuators on planar substrates.

According to some embodiments, for a given configuration and voltage, the actuator force scales with the area of each layer (assuming uniform electrode pattern) and the actuator displacement or stroke-length scales with the number of layers.

This actuator electrode configuration can be employed anywhere that requires a small or low-force actuator, and can enable a number of special uses:
- Flexible actuators
- Printed actuators (on rigid or flexible substrates)
- Large arrays of actuators (a wall of independently controlled actuators, a large-area flexible display with many individual actuators, etc.)
- Large-area actuators (sheets of electrodes can be printed to compose a single actuator)
- Custom shape actuators (electrodes can fill a polygonal- or irregularly-shaped region, so long as cross-section of the electrodes locally mirrors the pattern in FIG. 1, for example)
- Micro-mirror positioners (for beam-steering of a laser)
- Tissue engineering and smart petri-dishes (for cell-scale forces and manipulation)

This actuator electrode configuration can enable a number of significant advantages over other repulsive-force actuators:
- Extremely high field strength/high voltage operation without insulator coatings or air breakdown (shorting), limited only by the dielectric strength of the substrate.
- Minimal failure modes: (only electrodes of same electric potential can touch each other)
  - Shorting prevented by a strong, stiff insulator between opposite polarity electrodes (won't thin and allow electrodes to move too close together, as in DEAs (dielectric elastomer actuators))
  - Repulsive actuator, minimizes likelihood of stiction/pull-in failure (as seen in attractive-force electrostatic actuators)
- Peak repulsive force at closest position (inherently stable)
- Multi-layer—stack layers to increase actuator displacement, without increasing risk of shorting layers.
- Multi-material—variety of conductors (copper film, conductive ink, etc.) on any printable or laminatible substrate.
- Flexible actuators when printed on flexible substrates with thin metal electrodes (MEMS versions are made of metal/silicon (very rigid))
- Bulk-fabrication—actuator layers can be mass-produced at very low cost with standard industry processes, like ink printing (roll-to-roll or screen printing with conductive ink) and PCB manufacturing (etch copper traces on flex-circuit/printed circuit boards). Existing repulsive actuators need clean-room manufacturing—bad for mass production.
- Greater forces and displacements than MEMS-fabricated repulsive electrostatic actuators.

Alignment of layers is required, but is feasible and easy to do with visual alignment features or pins/sockets, etc.

FIG. 1 provides a cross-section of a novel electrode configuration according to an embodiment of the current invention. This configuration is generalized and can be varied in a number of methods: the electrodes/substrate can have various dimensions and be made of various conductive (electrode)/insulating (substrate) materials. The applied voltage can be either positive or negative (ie. $V_+ > V_-$ or $V_+ < V_-$). The number of layers can be as small as (2) or stacked to (n) layers for greater displacement (with layers alternating between the Layer 1 and Layer 2 voltage configuration). The number of layers n is, in principle, not limited to a particular number. It could be any integer up to 10, or up to 100, or up to 1,000, for example. The electrodes can be rectangular traces (shown in FIG. 3), straight lines, lines that follow any irregular contour, or another geometric shape (concentric circles, chevrons, sinusoids, etc.), and can have the electrode cross-section pattern shown in FIG. 1. Two fabricated variations of the electrode pattern are shown in FIG. 3.

In all cases, the actuator can generate a net repulsive force between the 2+ device layers.

In some embodiments, methods of producing an actuator layer for a repulsive-force electrostatic actuator can include printing a conductive ink (including but not limited to silver ink, gold ink, graphene/carbon nanotube ink, or combination thereof) in the desired electrode pattern on an individual sheet of substrate (via screen printing or ink-jet printing processes, for example) or on a continuous sheet of substrate via a roll-to-roll printing process (including lithographic or gravure processes, for example).

In some embodiments, methods of producing an actuator layer further include deposition of conductive metals (gold, silver, aluminum, titanium, platinum, or a combination thereof), inorganic compound(s), or organic compound(s) onto a substrate via evaporation, electroplating, etc. The conductive material can be patterned in a number of ways:
- During deposition, the conductive material is evaporated through a pre-made mask (shadow mask) or onto a substrate with a pre-patterned coating (photolithographic mask, laser-cut film mask, etc.)
- After deposition, the conductive material is patterned via etching (wet or dry) using a mask (photolithographic mask, laser-cut film mask, etc.).
- Conductive films (metal, etc.) are laminated onto a substrate using a pressure- or thermoset adhesive, with the electrodes patterned either before lamination (via laser cutter) or after lamination (via a masking and etching process).

FIGS. 6-11 show some examples of various products that can use one or more repulsive-force electrostatic actuators according to some embodiments of the current invention.

Figure 6:
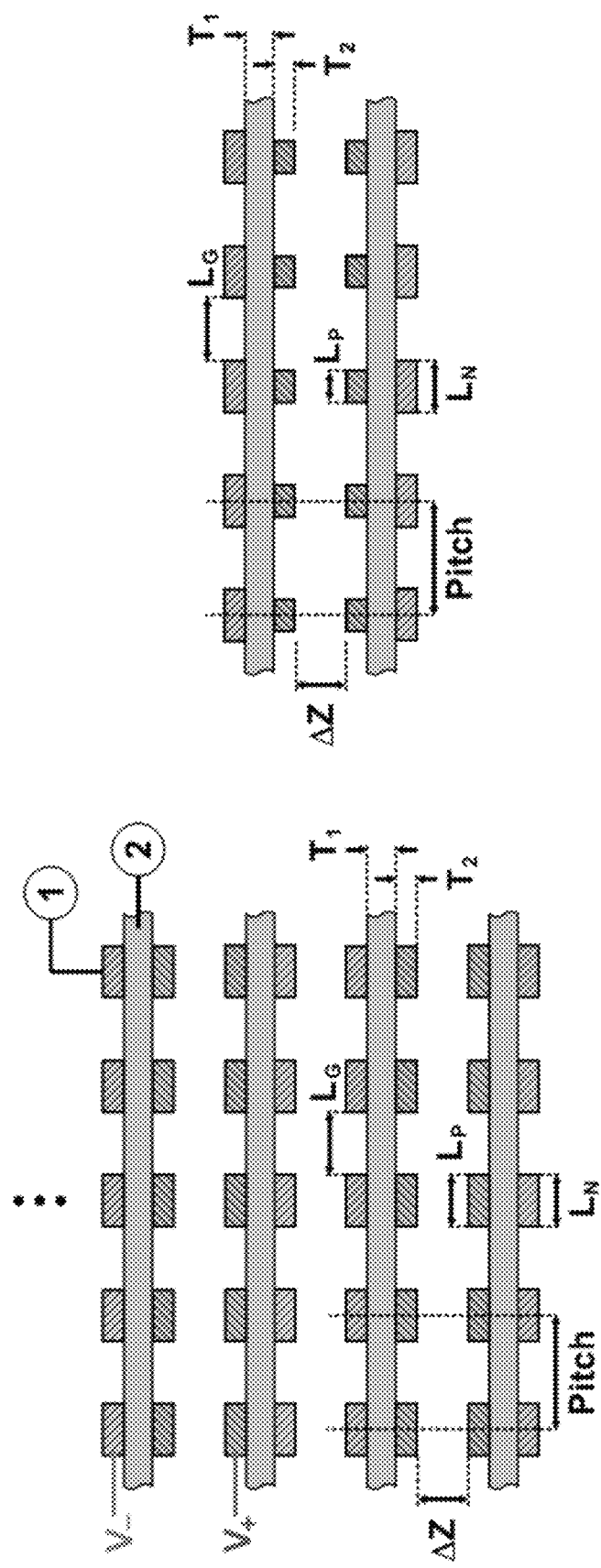
FIG. 6 shows, on the left, an embodiment of a multilayer device that shows arranging four actuator layers according to an embodiment of the current invention; and on the right, an alternative embodiment of electrode patterns.

The reference numerals in FIGS. 6-11 are as follows:
1—First Electrode Pattern
2—Substrate
3—Fixed actuator layer (e.g., second actuator layer)
4—Suspended, moveable actuator layer (e.g., first actuator layer)
5—Spring suspension (example of an actuator frame)
6—Film cover
7—Film backing or substrate
8—Mounting surface (surface the actuator array is attached to)
9—Fluid flow
10—Wing/airfoil
11—Sheet array of actuators (single element highlighted) attached to wing
12—Electromagnetic energy source
13—Sheet array of actuators attached to building exterior
14—Building
15—Petri dish
16—Array of actuators attached to petri dish
17—Biological media (cell culture)
18—Actuator array on top cover of petri dish
19—Actuator array on bottom of petri dish, covered in biological media
20—Cantilevered multi-layer actuator
21—Direction of cantilever motion
22—Mirror (with at least one degree of freedom)
23—Spring suspension
24—Pin support
25—Substrate
26—Pin anchor 27—Spacers
28—Mirror or reflective film/coating
29—Cantilevered actuator layer(s)
30—Fixed actuator layer FIG. 6 shows, on the left, an embodiment of a multilayer device that shows arranging four actuator layers according to an embodiment of the current invention; and on the right, an alternative embodiment of electrode patterns.

Figure 7:
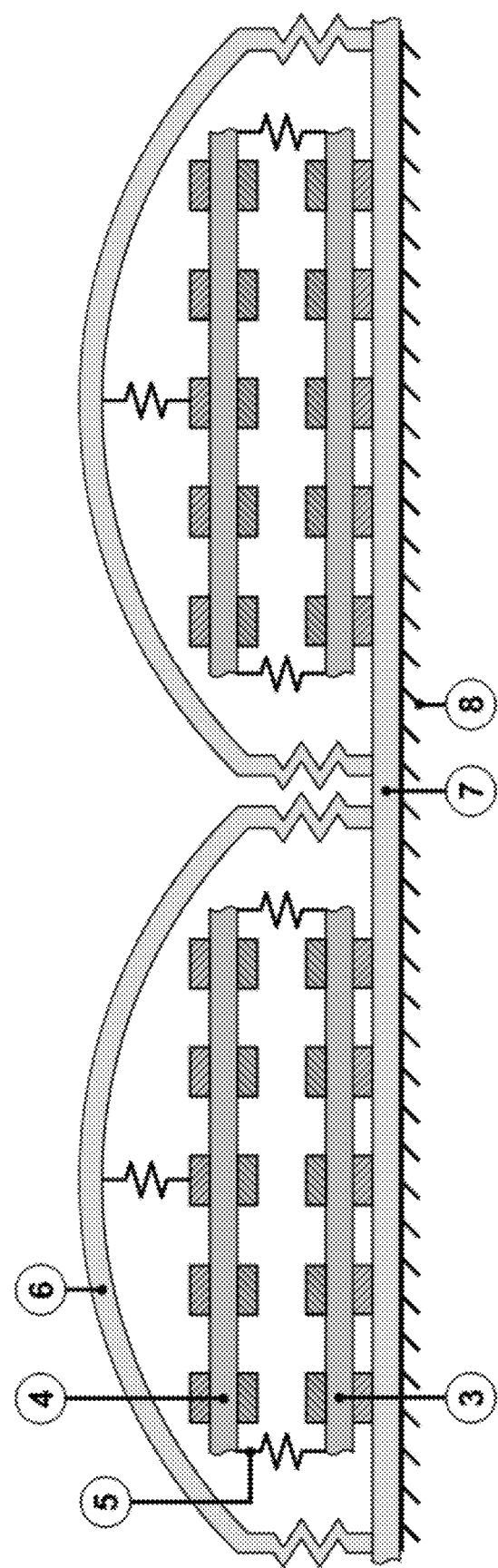
FIG. 7 show an embodiment in which each of a pair of repulsive-force electrostatic actuators is enclosed by a film cover, and attached to the surface of a structure.

FIG. 7 show an embodiment in which each of a pair of repulsive-force electrostatic actuators is enclosed by a film cover, such as film cover 6, and attached to a mounting surface 8.

Figure 8:
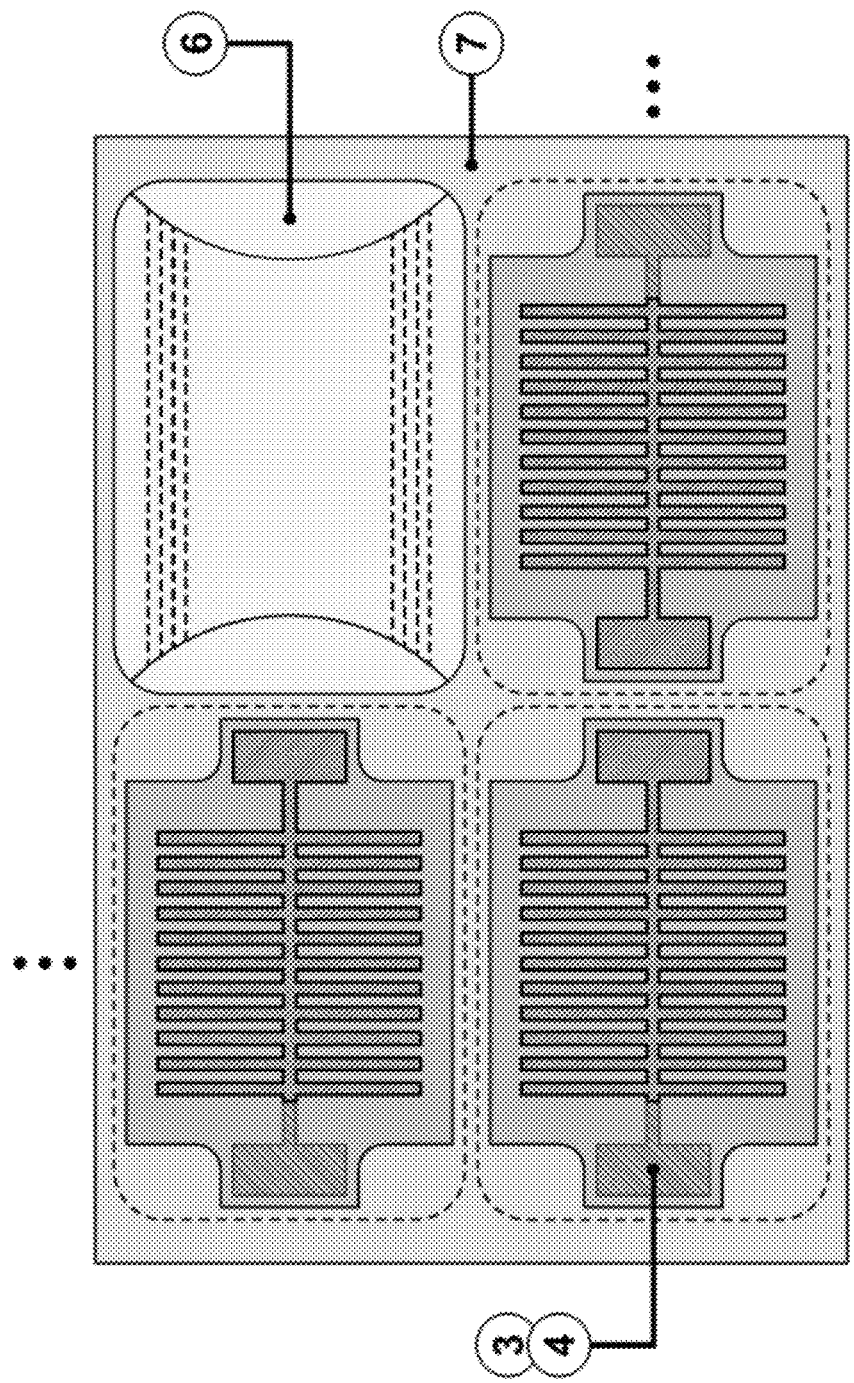
FIG. 8 is similar to FIG. 7, but shows four repulsive-force electrostatic actuators from a view looking down as an example of a type of array that could be extended to any desired size.

FIG. 8 is similar to FIG. 7, but shows four repulsive-force electrostatic actuators from a view looking down as an example of a type of array that could be extended to any desired size.

FIG. 9 shows two examples of surface actuator arrays according to some embodiments of the current invention. On the left, an airfoil or aircraft wing 10 has a surface with a sheet array of actuators 11 according to an embodiment of the current invention. The actuators could be used to alter the fluid flow, such as air, over the wing or airfoil. This could be for control or some other purpose. In some embodiments, the fluid could be a liquid for use on boats, submarines, and/or other water vehicles, for example. The right hand side of FIG. 9 illustrates an embodiment in which a sheet array of actuators 13 according to an embodiment of the current invention are attached to the surface of a building 14 to modify reflection, absorption, and/or scattering of electromagnetic energy 12, such as sunlight for example.

FIG. 10 is a schematic illustration of an embodiment of an array of actuators 16 according to an embodiment of the current invention attached to petri dish 15. The actuator array 16 can be used to agitate biological media to facilitate growth, for example. The right hand side of FIG. 10 shows some alternative embodiments.

FIG. 11 is a schematic illustration of an embodiment of mirror 22 or other optical component such as, but not limited to, a lens, diffraction grating, or frosted glass, that has at least one degree of freedom that is controlled by one or more actuators according to an embodiment of the current invention. The right hand side of FIG. 11 shows an alternative embodiment.

EXAMPLES

The following describes some concepts of the current invention with reference to particular embodiments. The general concepts of the current invention are not limited to the examples described.

Example 1

Advances in planar manufacturing have leveraged new processes and materials to develop a range of innovative robots and sensors [1-6]. Devices are composed of functional materials (films, fabrics, composites, inks, etc.) and use layering, patterning, folding, and bonding steps to form complex kinematic structures with integrated circuitry [3]. We apply these manufacturing steps to fabricate thin-film repulsive-force electrostatic actuators.

Our initial goal is to produce cm-scale planar actuators, capable of generating mN forces and mm displacements at ~30 Hz (video-compatible) frequencies, for applications in mobile robotics (i.e. a lightweight laser beam steering system) and beyond. Numerous viable actuator technologies exist at this scale: successful implementations of thermal/ shape memory [7, 8], piezoelectric [9], dielectric elastomer [10, 11], and (attractive-force) electrostatic [12-15] planar actuators have all been demonstrated, and the merits of each have been comprehensively discussed [16, 17]. Electrostatic actuators have the benefits of operating with larger displacements than piezoelectric actuators and higher speeds than thermal/shape memory actuators, and are well-suited for planar manufacturing. We focus specifically on repulsive-force electrostatic actuators, due to advantages in stability, controllability, and reliability over other electrostatic actuators.

Figure 12:
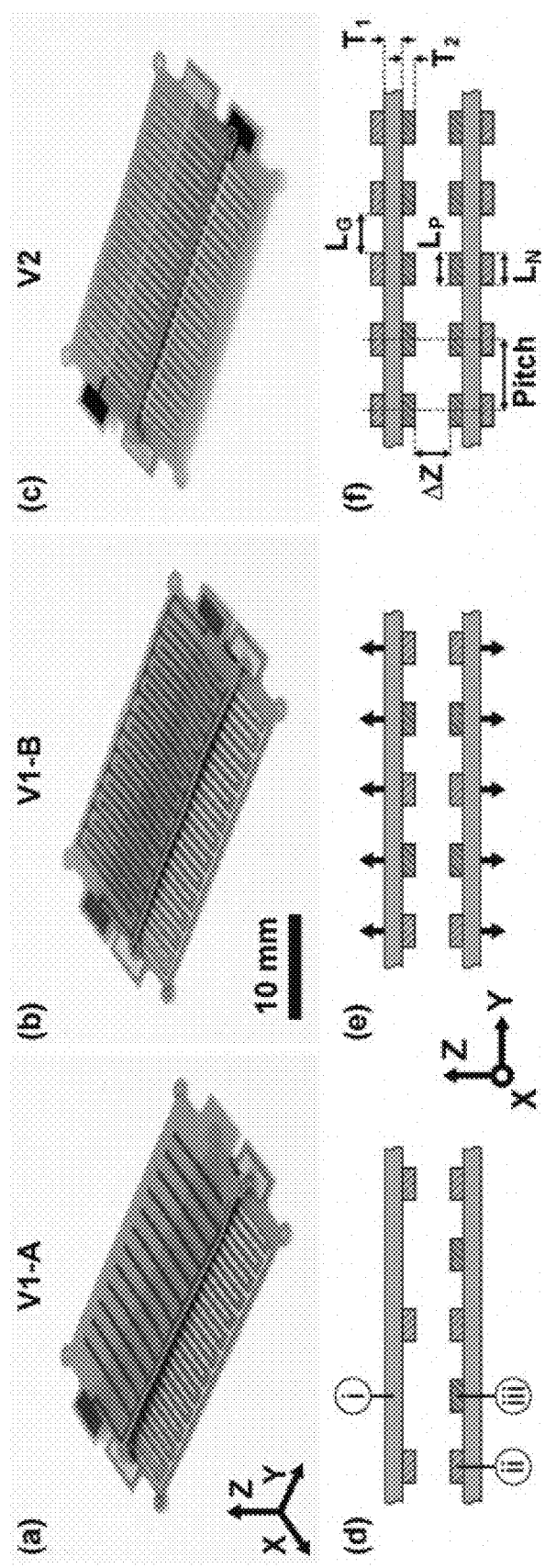
FIG. 12 shows flexible, two-layer repulsive force actuator designs evaluated in this work: (a) V1-A, the electrode design used by S. He, et al. [18], (b) V1-B, an improved design proposed by S. He, et al. [19], (c) V2, the electrode design used in this work. For each actuator electrode design, the two functional layers are photographed (a-c) and the cross-sections are illustrated (d-f). Each actuator layer is composed of a polyimide substrate (i) with negative (ii) and positive (iii) electrodes. Actuator layers experience a net repulsive electrostatic pressure, illustrated in (e). Actuator dimensions include the substrate ($T_1$=25 μm) and electrode ($T_2$=18 μm) thickness, positive ($L_P$=500 μm) and negative ($L_N$=500 μm) electrode width, gap between adjacent electrodes ($L_G$=500 μm), and inter-layer height ($\Delta Z$).

We demonstrate a new electrode geometry for planar repulsive-force electrostatic actuators (RFA)—see FIG. 12—that operates with increased forces, displacements, and field strengths as compared to existing RFA designs. Our new RFA is simulated to establish performance bounds, fabricated using a flex-circuit planar manufacturing process, and characterized as the driving actuator in one degree-of-freedom linear and rotational systems.

Electrostatic actuators typically consist of sets of moveable electrodes (conductive plates or combs) separated by an insulating dielectric, with electrostatic forces proportional to the charge accumulation on and electric fields between electrodes due to an applied electric potential. Operation of all electrostatic actuators is limited by electrical breakdown (shorting), which occurs when the electric field strength between electrodes exceeds the dielectric strength of the insulating medium (3-110·$10^6$ V/m in air and 154-303·$10^6$ V/m in polyimide) [24-27]. A comparison of meso-scale electrostatic actuators is provided in the table shown in FIG. 13.

At μm-scales, parallel plate actuators use electrodes arranged in pairs of parallel plates [28], and comb drive actuators use a pair of interdigitated combs [29]. To actuate, an applied voltage draws the electrodes together for gap-closing operation. To improve stroke length, the actuator output is often coupled to an inchworm mechanism [21]. At mm-scales, integrated force arrays [22, 30] and distributed electrostatic actuators [12] are massively-parallelized actuators with 100s-1000s of connected parallel plate electrode units. Actuators at this scale are micro-fabricated, have high force density, low strains, and the highly-parallelized designs have low yields [30].

At cm-scales, dielectric elastomer actuators (DEA) use compliant electrodes fabricated on each side of low modulus elastomer film [20, 31, 32]. DEAs generate large strains (60%) and high pressures (100 s kPa) during operation: applied voltages thin the elastomer (distance between the electrodes) and stretch the cross-sectional area. DEAs also exhibit significant viscoelastic behavior due to the compliant elastomer film. Gap-closing distributed electrostatic actuators [12], stacked electrostatic actuators [13], and zipper electrostatic actuators [14] generate mm to cm strokes, sub-N forces, and 100 s Pa pressures. Linear surface-drive electrostatic film actuators [23] and motors [33] are flex-circuit devices that generate up to 4.4 N forces and 100 s Pa pressures.

Repulsive force electrostatic actuators (RFA) are a subset of electrostatic actuators that generate a net repulsive force (instead of attractive force) through clever configuration of the 2+ sets of differentially polarized electrodes [34]. Similarly charged electrodes oppose one another on moveable layers to generate the inter-layer repulsive force. Oppositely charged electrodes establish the electric fields and potential gradients in the actuator, but minimize attractive forces between moveable layers by: spacing oppositely-charged electrodes further apart than like-charged electrodes to produce weaker out-of-plane attractive forces, using symmetry to minimize in-plane attractive forces, and having attractive forces act as internal body forces on noncompliant substrates.

RFAs in general have low complexity, generate peak force at the initial displacement, have linear or rotational outputs based on suspension design (minimizing transmission requirements), and avoid many common failure modes of electrostatic actuators—RFAs have no pull-in limit, no increased likelihood of breakdown as electrodes displace normally, and no stiction problem.

RFAs were first reported by W. Tang, et al. [34]: electrodes patterned below a comb drive linear lateral resonator were used as a tunable electrostatic spring to control the height of the combs translating over the substrate, with measured out-of-plane displacements of 0.4-2 μm (from an initial 2 μm offset) at 30 V [35]. RFAs were further developed as a MEMS actuator for controllable 1-DoF [19, 36-38] and 3-DoF [18, 39] micro-mirrors. Modeling of two- and three-layer actuators and optimization of the electrode geometry show that maximum force is achieved when electrodes have equal width and spacing ($L_G=L_P=L_N$), and maximum out-of-plane displacement is proportional to in-plane electrode pitch [36, 37]. Multiple RFAs were successfully fabricated with PolyMUMPs, including a 3-DoF micro-mirror system capable of out-of-plane translation (86 μm) and roll/pitch rotation (±1.5°) at 200 V [18].

We successfully scale up these RFAs for operation at the meso-scale. The V1 designs (FIG. 12, panels (d) and (e)) employ the same electrode configurations as prior works: alternating positive- and negative-voltage electrodes on one side of a shared substrate, with multiple layers aligning similarly-polarized electrodes on the common side. The new V2 design (FIG. 12, panel (f)) reconfigures the electrodes: rows of positive- and negative-voltage electrodes are aligned on opposite sides of a shared substrate, with multiple layers aligning similarly-polarized electrodes on the common side. In V1, maximal electric fields are directed between adjacent electrodes, so peak voltage, field, and force are all limited by the dielectric strength of air, the inter-electrode spacing ($L_G$), and any layer misalignment ($\Delta Y$). In V2, maximal electric fields are directed through the substrate, so these properties are independent of electrode geometry or layer alignment, and limited only by the dielectric strength of the substrate. Relatedly, the principle failure modes in V1 are shorting between adjacent electrodes (due to manufacturing defects) or layers (due to layer misalignment during set-up or operation)—problematic in dynamic systems; in V2, shorting is only possible through the more resilient substrate.

Simulation & Results

We developed a 2D numerical simulation of the RFA in MATLAB. The actuator electrostatics (charge distribution, electric potential, and forces) are solved using an explicit finite differences method, with a high-fidelity, non-uniform rectangular mesh and iterated to convergence.

Analytical models for two-layer RFA systems were derived by S. He, et al. [19, 37], using conformal transformations to map unit cells of the RFA electrode configuration into a parallel plate electrode configuration for ease of calculation. This transformation, however, assumes unit cells with perfectly aligned, symmetric electrodes—two design requirements not guaranteed when designing these actuators for manufacturing. Agreement between analytical models and numerical simulations has been verified [19], thus only numerical simulations are used herein.

The constitutive equations at each node ($\underline{x}_j$) of the simulation, relating electric potential (V), electric field ($\underline{E}$), displacement field (D), and polarization density ($\underline{P}$), are defined as:

$$\underline{E}=-\nabla V \quad (1)$$

$$\underline{D}=\varepsilon_r\varepsilon_0\underline{E}=\varepsilon_0\underline{E}+\underline{P} \quad (2)$$

$$\underline{P}=(\varepsilon-\varepsilon_0)\underline{E}, \text{ with } \varepsilon=\varepsilon_r\varepsilon_0 \quad (3)$$

Net charge density (ρ) in the system consists of bound ($\rho_b$) and free ($\rho_f$) charge densities, related by:

$$\rho=\rho_f+\rho_b \quad (4)$$

$$\rho_f=\nabla\cdot\underline{D} \quad (5)$$

$$\rho_b=-\nabla\cdot\underline{P} \quad (6)$$

Combining (1), (2) and (5), and applying partial differentials:

$$\nabla\cdot\varepsilon\nabla V=-\rho_f \quad (7)$$

$$\varepsilon_y V_y+\varepsilon V_{yy}+\varepsilon_z V_z+\varepsilon V_{zz}=-\rho_f \quad (8)$$

Figure 21:
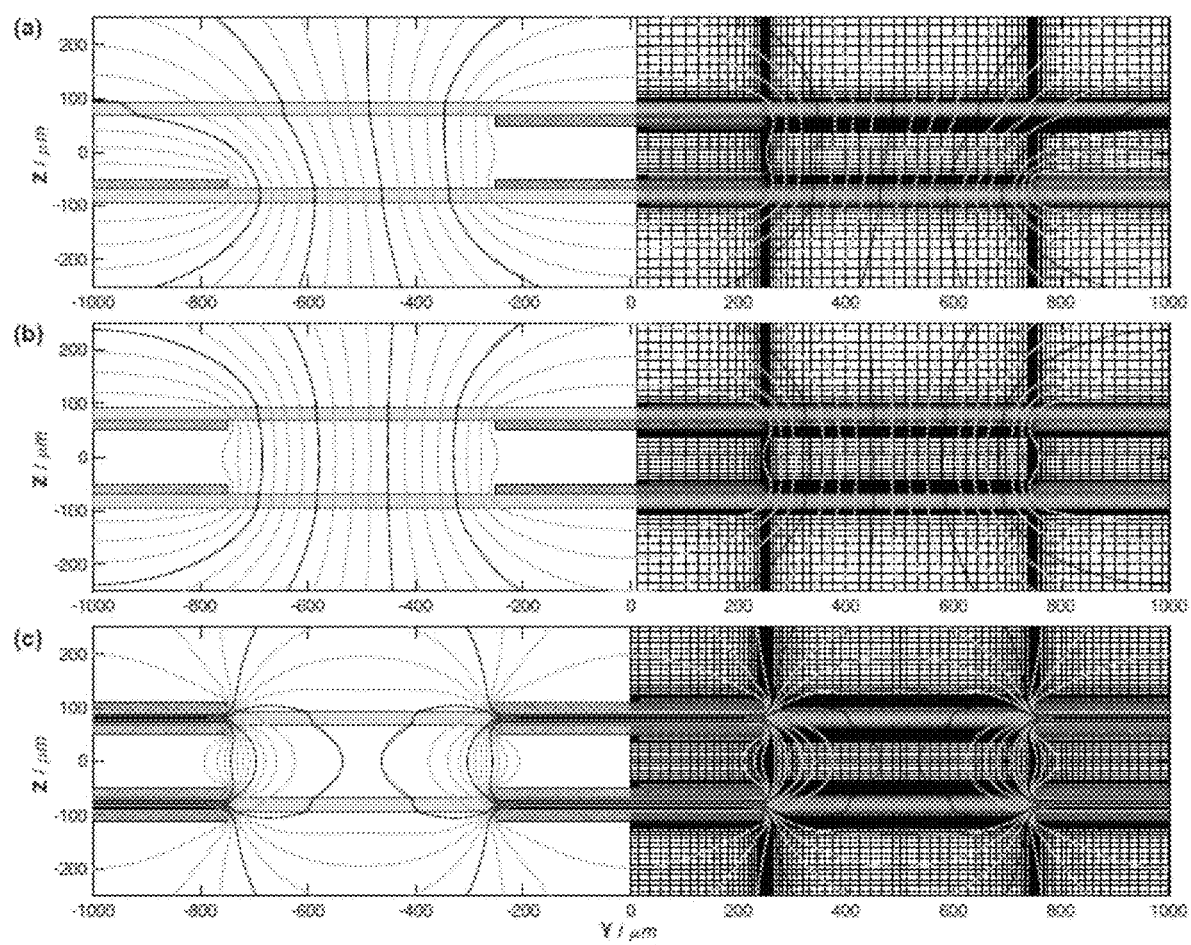
FIG. 21 shows a sample mesh grid for simulations of Designs V1-A (a), V1-B (b), and V2 (c). A rectangular mesh is used, with increased density—minimum grid spacing is 1 μm—around material interfaces (electrode/substrate edges).

The partial derivatives have a finite differences formulation (2nd order, using Lagrangian polynomials for non-uniform grid interpolation) [40] centered at $\underline{x}_j$ of:

$$\varepsilon_{y,i}=a_{y,i}\varepsilon(\underline{x}_{i-1})+b_{y,i}\varepsilon(\underline{x}_i)+c_{y,i}\varepsilon(\underline{x}_{i+1})$$

$$V_{y,i}=a_{y,i}V(\underline{x}_{i-1})+b_{y,i}V(\underline{x}_i)+c_{y,i}V(\underline{x}_{i+1})$$

$$V_{yy,i}=a_{yy,i}V(\underline{x}_{i-1})+b_{yy,i}V(\underline{x}_i)+c_{yy,i}V(\underline{x}_{i+1}) \quad (9)$$

with $a_i$, $b_i$, $c_i$ defined in [40]. Dirichlet boundary conditions at the electrodes—$V_-=0$ and $V_+=V_{Applied}$—mimic the voltage source powering the actuator. Neumann boundary conditions are defined along the system perimeter $-\partial V/\partial \underline{n}=0$. Boundaries of the simulation space are at least 5 times the dimensions of the actuator-containing space, to mitigate computation artifacts due to the finite boundaries. Meshing of the simulation space uses a non-uniform rectangular mesh, with highest mesh density at electrode and substrate surfaces to capture the electric fringing field behavior (FIG. 21).

The voltage distribution in this system is calculated by solving for $V(\underline{x}_j)$ in (8) and (9) (assuming $\rho_f=0$ outside electrodes), reimposing boundary conditions, and iterating to convergence. Once V converges, $\underline{E}$, $\underline{P}$, and ρ can be calculated directly.

The electrostatic force on a region of the actuator is:

$$\underline{F}=\iiint_{V_\mathbb{E}}(\rho_f\underline{E})d\mathbb{V}+\iiint_{V_\mathbb{D}}(\rho_b\underline{E})d\mathbb{V}+\iint_\mathbb{S}(1/2(\sigma_f+\sigma_b)\underline{E}\cdot\hat{n})d\mathbb{S} \quad (10)$$

with force contributions from the electrode ($\mathbb{V}_\mathbb{E}$) and dielectric ($\mathbb{V}_\mathbb{D}$) volume interiors and the interfacing surfaces between these regions ($\mathbb{S}$), and with corresponding free ($\sigma_f$) and bound ($\sigma_b$) surface charge densities. To accurately quantify the net repulsive force between layers—which is roughly 2-orders of magnitude smaller than the attractive body forces between electrodes on each side of a dielectric substrate—the simulation is assumed to converge when forces on each electrode change by less than 0.05% over 500 iterations.

Figure 14:
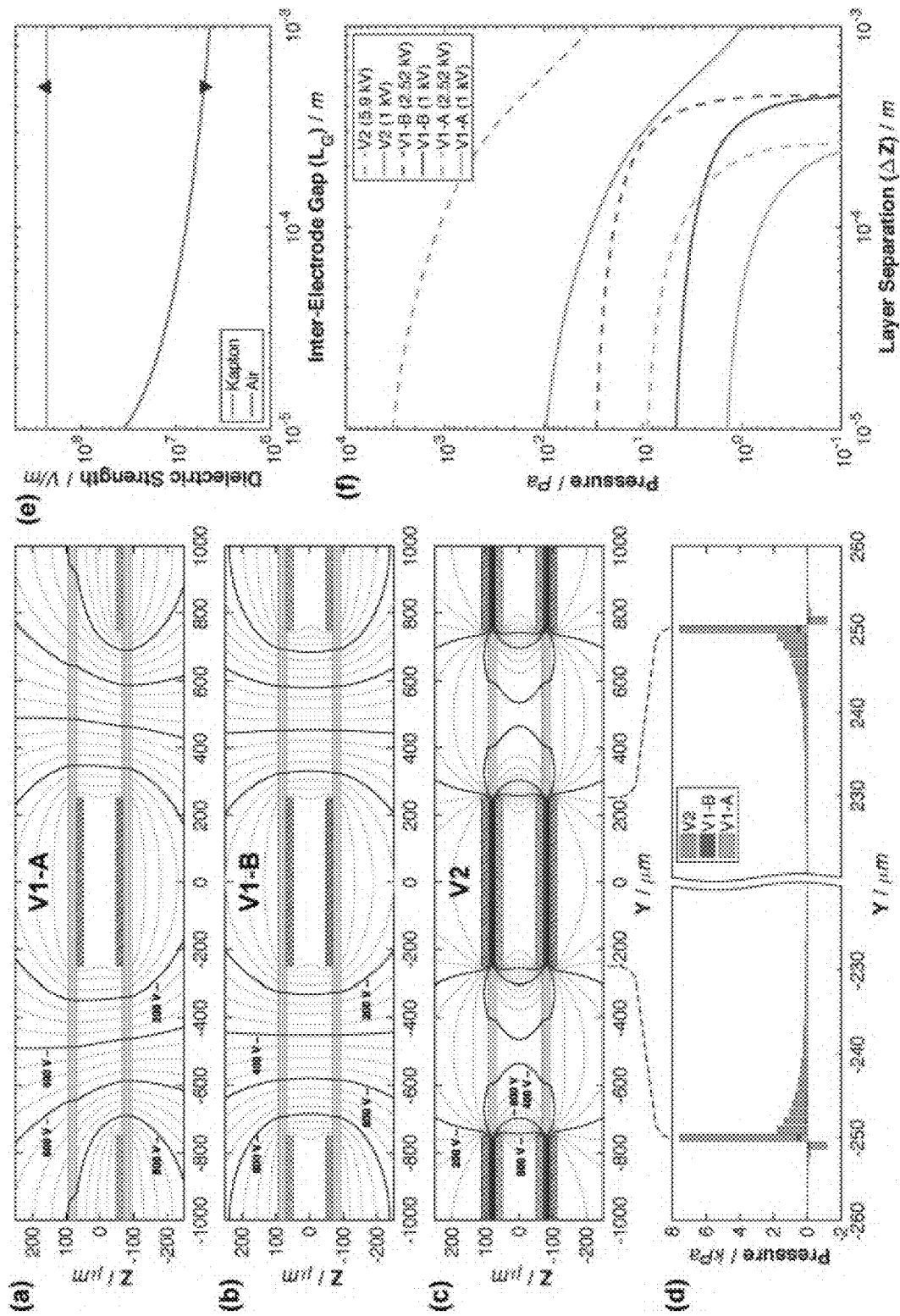
FIG. 14 shows simulation results for the repulsive-force electrostatic actuator. Electrostatic potential (V) for designs V1-A (a), V1-B (b), and V2 (c), with electrodes operating at 0 V (blue)/1000 V (red) and dielectric substrate (orange). (d) Net electrostatic pressure across the top layer of each design, focusing on the center electrode and with 1 μm mesh size. (e) Dielectric strength at breakdown versus inter-electrode gap ($L_G$) in polyimide [26, 27] and air [24, 25]. Manufactured V1-A/B actuators (with $L_G$=500 μm) are limited by air breakdown at 5.0~$10^6$ V/m (▼); V2 actuators are limited by polyimide breakdown at 2.4~$10^8$ V/m (▲). Note that in V2 actuators, the field strength around the electrodes can exceed the dielectric strength of air without breakdown, as all shorting paths between positive/negative electrodes must pass through the more robust polyimide substrate. (f) Net electrostatic pressure produced by a complete actuator versus layer separation ($\Delta Z$) in each design. Operating voltage (in legend) is either 1 kV or maximum voltage corresponding to predicted electrostatic breakdown field strength from (e).

The simulation results presented in FIG. 14 demonstrate that meso-scale actuators (2.5 cm² area with 500 μm electrode widths and gaps) can generate mN-range forces with >500 µm gaps at 1 kV potentials. The electric potential distributions for the three actuator designs are shown in FIG. 14, panels (a)-(c).

From FIG. 14, panel (e), the V1 designs have a maximum electric field strength limited by the air dielectric to $5.0 \cdot 10^6$ V/m (for $L_G$=500 µm) and a corresponding maximum voltage of 2.5 kV [24]. The V2 design uses a polyimide substrate instead of air as the insulating dielectric between oppositely-polarized electrodes, which increases the maximum electric field strength to $236 \cdot 10^6$ V/m (47× increase) and maximum voltage to 5.9 kV (2.3× increase). Note that in the V2 design, the field strength in air around the electrodes can exceed the dielectric strength of air—indeed, fields above $5.0 \cdot 10^6$ V/m extend approximately 50 µm from the edges of electrodes at 1000 V. This can cause localized air ionization—without breakdown—as all shorting paths between positive/negative electrodes must still pass through the more robust polyimide substrate.

From FIG. 14, panel (f), the new V2 electrode design generates consistently greater electrostatic pressures and forces than comparable V1-A/B designs. For actuators with equivalent configurations ($L_G$, $L_P$, $L_N$=500 µm, H=50 µm, 2.5 cm² actuator area) and operating at V=1 kV, V2 produces estimated forces of 13.1 mN, compared to 0.934 mN for V1-B (14× decrease) and 0.249 mN for V1-A (53× decrease). Operating at their respective breakdown voltages, V2 generates forces of 455 mN, compared to 5.95 mN for V1-B (76× decrease) and 1.59 mN for V1-A (286× decrease). Interestingly, above certain inter-layer heights, V1-A and V1-B actuators transition to a net attractive force between layers, while V2 does not exhibit this behavior and always produces a net repulsive force. Finally, the significance of the fringing fields is highlighted in FIG. 14, panel (d), where 90% of the actuator's force is generated by the 20 µm of electrode area nearest each edge—4% of total actuator area. Future fabricated actuators can thus generate greater electrostatic pressure via increasing electrode density (reduced electrode width ($L_P$, $L_N$) and pitch) up to manufacturing limits.

Fabrication

Figure 15:
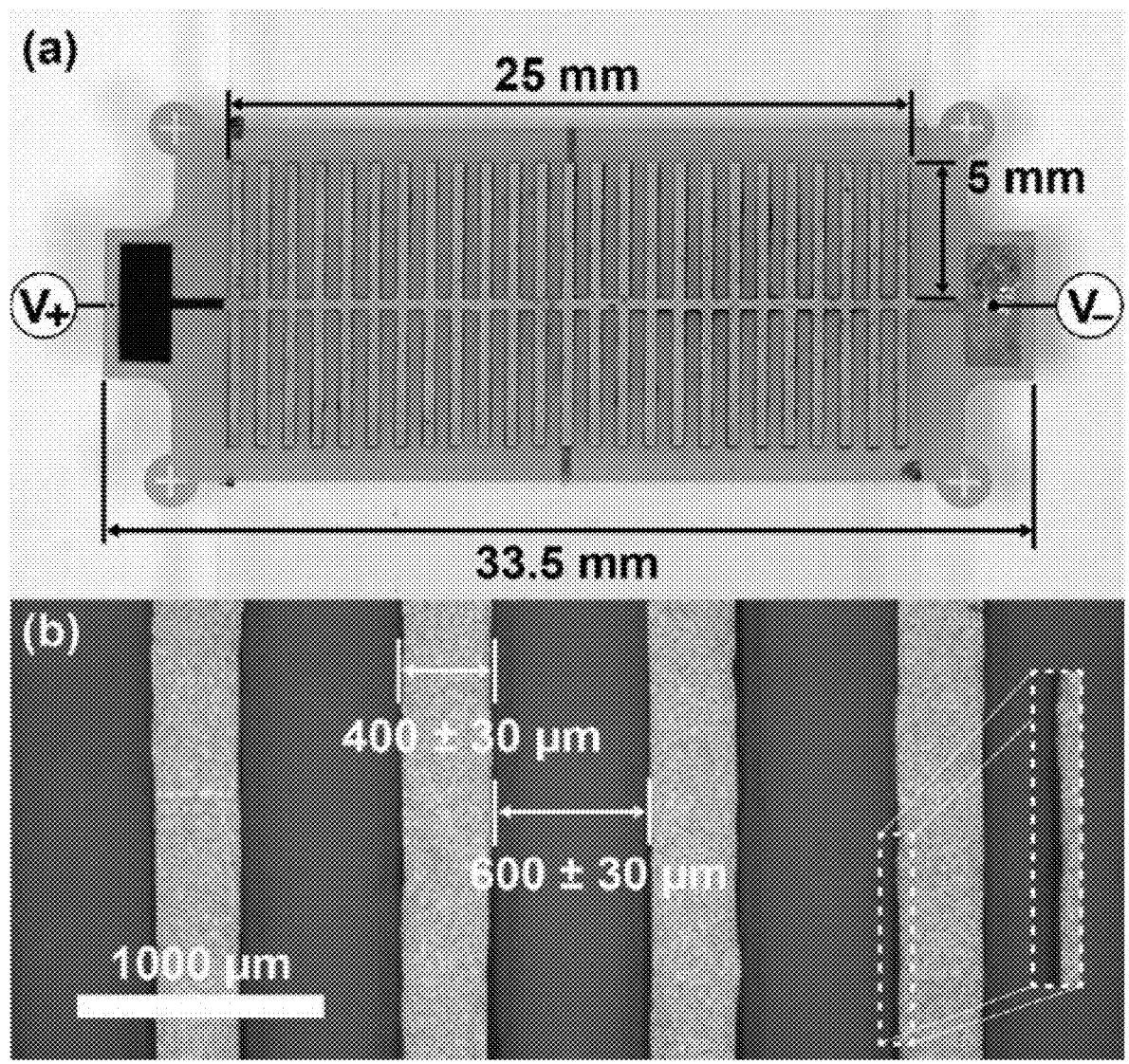
FIG. 15 shows a photo of fabricated two-sided, design V2 actuator layer (a), with magnified view of electrodes (b). Dashed region highlights minor variation between widths of front-side (copper) and back-side (dark region) electrodes; over-etching results in $L_P$, $L_N$≈400 μm. Also note visual alignment marks (+) at actuator corners.

A flex-circuit manufacturing process is used to produce planar repulsive-force electrostatic actuators patterned with the V1-A/B and V2 electrode designs introduced above. The fabrication process is illustrated in FIG. 22; fabricated actuator layers are shown in FIG. 12 and a magnified view of V2 is provided in FIG. 15.

RFA layers are fabricated out of Pyralux (DuPont, AP 8515E)—a double-sided laminate composed of copper foil (18 µm) electro-deposited on a polyimide substrate (25 µm) that is designed for high-voltage and flex-circuit applications.

The polyimide substrate provides resilience to electrical breakdown (236 V/um dielectric strength at 25 µm thick), operation up to 6 kV, low dielectric losses (dissipation factor under 0.003), trivial mechanical creep at sub-MPa loading, and high folding endurance (285,000 cycles) [26], although time-to-failure decreases with faster charging/discharging rates and higher peak-to-peak voltages [41, 42]. The Cu foil is ductile, has good flexural endurance (>6000 cycles), and is resistant to delamination (1.6 N/mm peel strength) [27]. Thus, the actuators are mechanically resilient to the physical impulses (drops, collisions, etc.) that would be common during use in a mobile robot platform.

Figure 22:
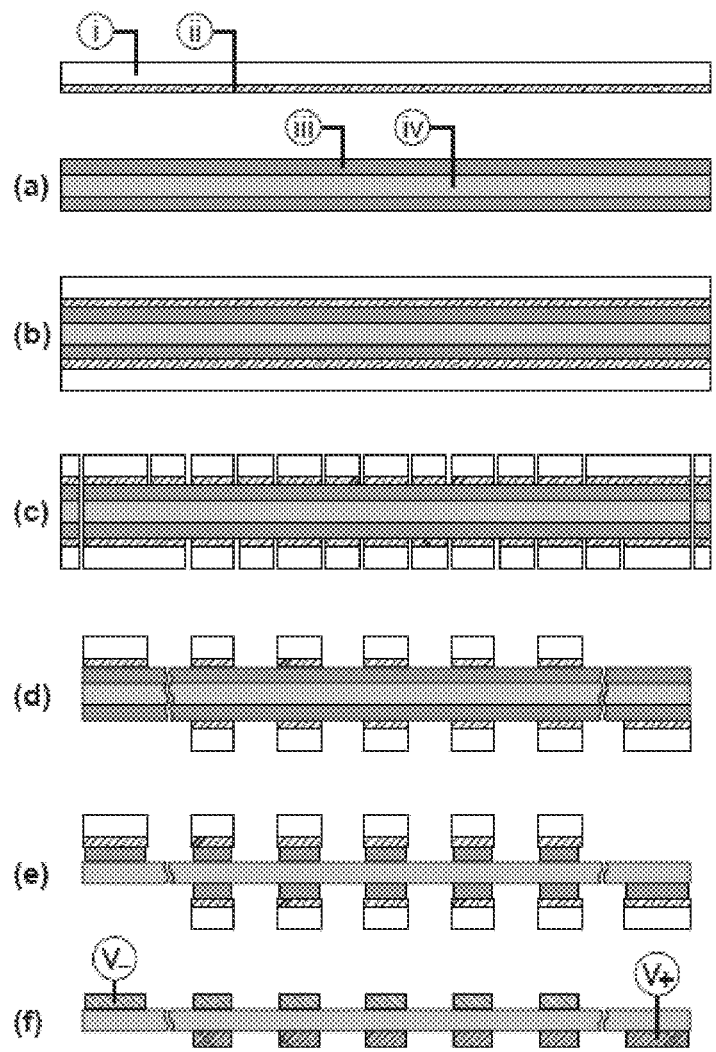
FIG. 22 shows a fabrication process for each actuator layer: (a) Preparation of two mask layers—polyimide film (i) with a thermal adhesive (ii) laminate—and a Pyralux® device layer—a double-sided laminate of Cu-foil (iii) on a polyimide substrate (iv). (b) Placement of mask layers on the device layer. (c) Cutting (via laser cutter) the electrode patterns into the mask layers and actuator extents through the device layer. (d) Removal of excess mask and substrate. (e) Etching the Cu. (f) Release of mask layers and soldering of power lines.

Actuator layers are fabricated using a positive wet etching process, shown in FIG. 22. Device layers are fabricated from Pyralux (DuPont, Pyralux AP 8515E), and mask layers include polyimide sheets (American Durafilm, Kapton 100HN (25 µm)) with thermal adhesive (GBC, Octavia Hot Mount Adhesive) laminated onto one side. Mask layers are secured to both sides of a device layer. The actuator electrode pattern is cut into the mask layers (positive mask) and the actuator substrate extents are cut through all mask/device layers using a UV laser cutter (PhotoMachining Inc., 355 nm). Excess mask and substrate material are removed manually. The mask/device layers are run through a laminator to set the thermal adhesive and provide an etch barrier. Any exposed thermal adhesive is removed with acetone (Fischer Scientific). The device layer is selectively etched with ferric chloride (MG Chemicals, $FeCl_3$) to pattern the Cu electrodes. Mask layers are released with acetone and the device layer is cleaned with water. Production time is approximately 4 hours per sheet of actuator layers.

Final assembly of the actuator layers can be performed multiple ways: laminating the layers to substrates, attaching the layers to a flexible suspension, or folding pre-connected layers over one another. In each instance, power wires are directly soldered to electrode pads on each layer, and visual alignment marks (+) at the actuator corners are used to ensure precise alignment between layers.

From a manufacturing perspective, this thin-film process enables cheaper fabrication of actuator layers with greater surface area, and provides significant design freedoms over conventional MEMS processes. The fabrication uses 2-3 patterning steps and 1 etch step to fabricate batches of complete V1 or V2 actuator layers. Actuators with +2 layers can be assembled by stacking discrete layers or folding up a sheet of connected units. Within each layer, the substrate provides all necessary mechanical structure and electrical insulation for the positive/negative voltage traces (no extra laminates required). For each device, interface leads can be directly soldered to electrodes without compromising the substrate (no wire-bonder needed). MEMS processes, in comparison, require numerous deposition, masking, and etching steps to produce a single spring-suspended device layer with routing for positive/negative lines on a floating dielectric. As a result, the V1-A design is simple to produce with PolyMUMPS, while the V1-B design is more complex and our new V2 design is entirely incompatible.

Characterization & Results

Figure 16:
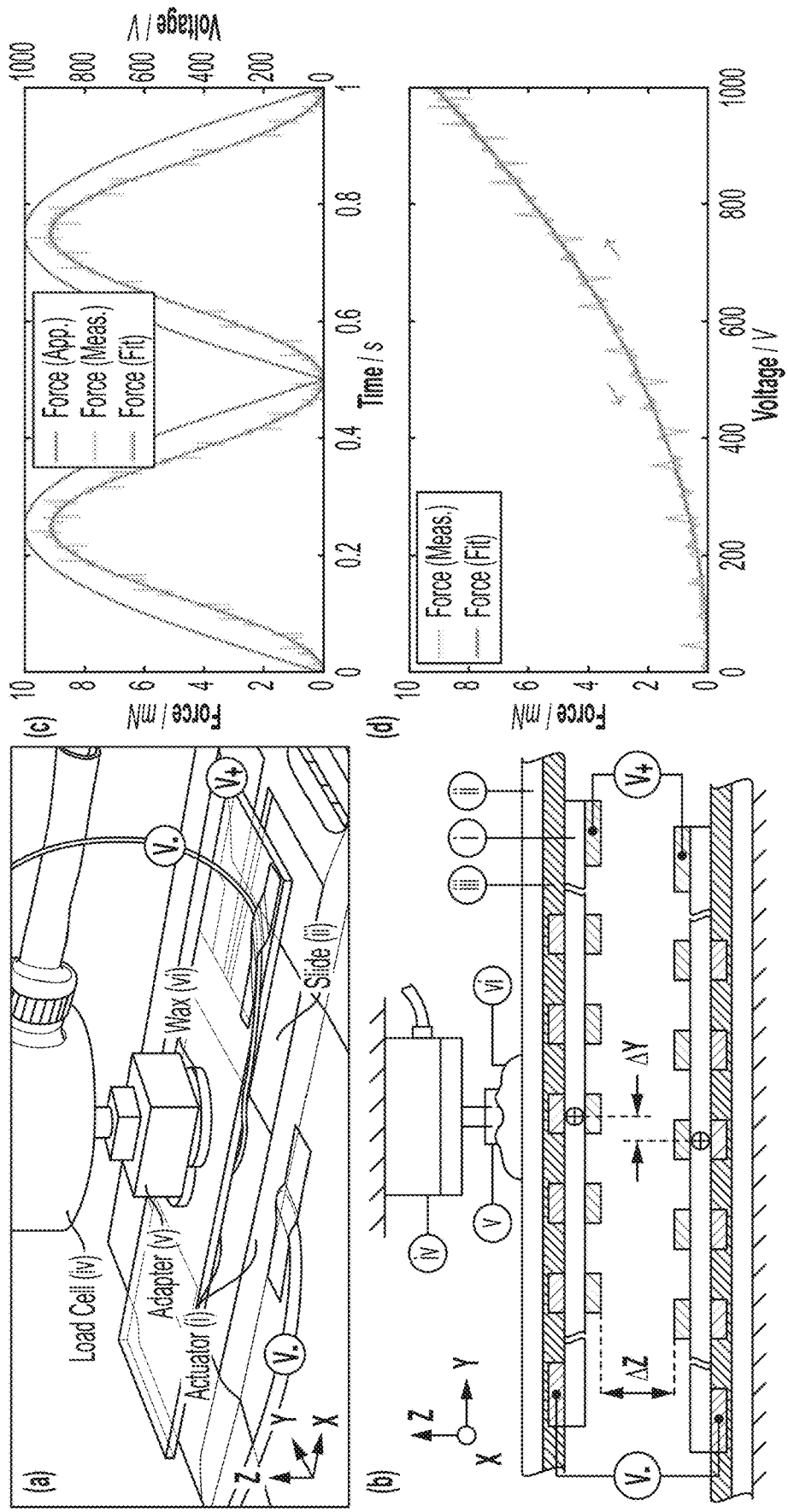
FIG. 16 shows a testing setup for blocked force characterization (a) with mechanical diagram (b) (electrical diagram in FIG. 23). Two actuator layers (i) are bonded to glass slides (ii) with thermal adhesive (iii). The bottom layer sits on a multi-DoF stage; the top layer connects to a load cell (iv) via an adapter (v) and wax (vi), and is aligned parallel to the bottom layer. (c-d) Force characterization at $\Delta X$, $\Delta Y$=0 μm and $\Delta Z$=50 μm. Applied voltage is the square-root of a sinusoid at 2 Hz and 1000 V peak-to-peak. (c) Force (measured and sinusoidal fit) and applied voltage versus time; (d) force (measured and quadratic fit) versus voltage. Force data is unfiltered, and periodic peaks are 60 Hz noise.
Figure 17:
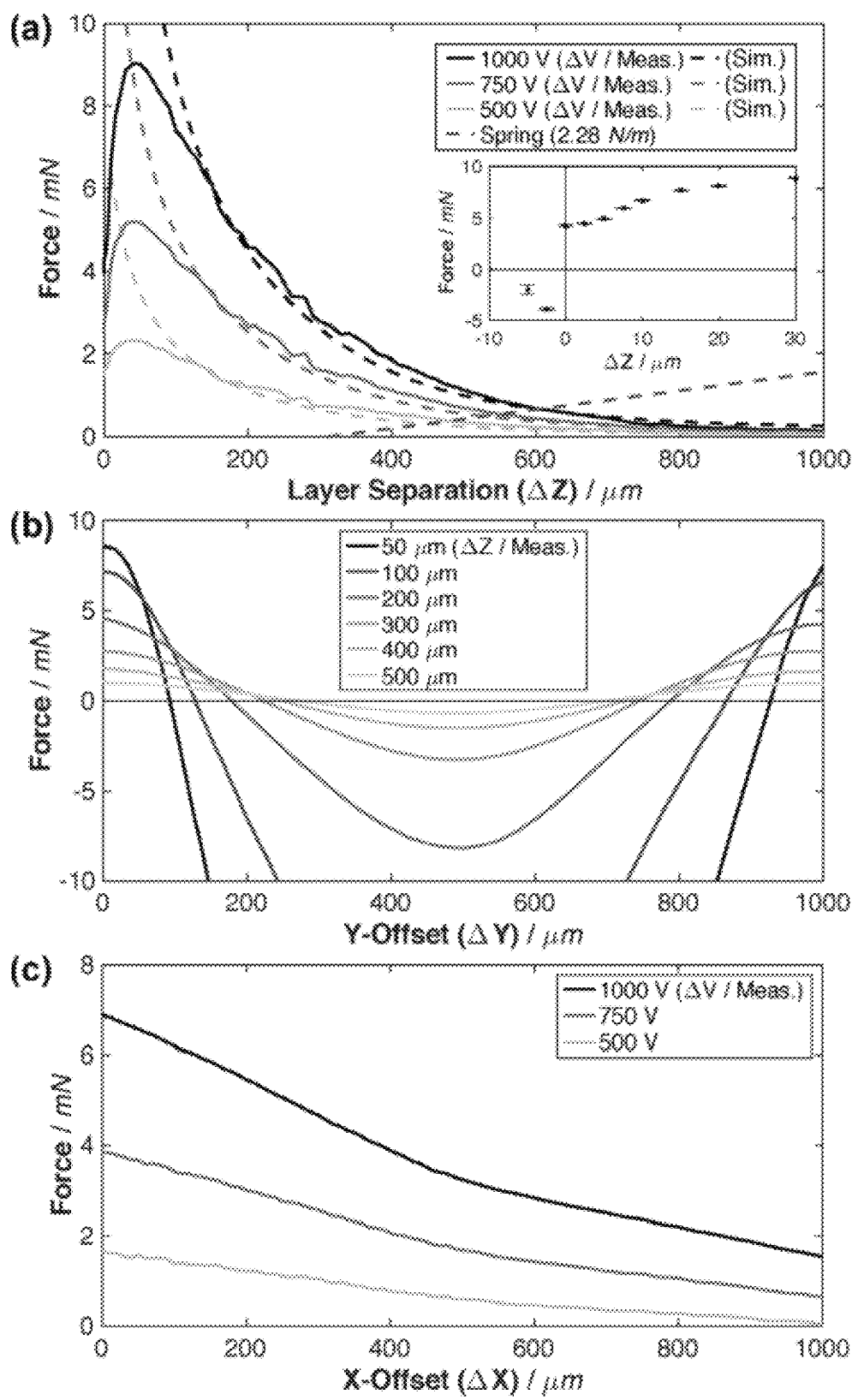
FIG. 17 shows repulsive normal force characterization for the V2 actuator at a range of $\Delta X$, $\Delta Y$, and $\Delta Z$ offsets, with square-root of sinusoid inputs at 2 Hz/1000 V peak-to-peak. (a) Measured (Meas.) and simulated (Sim.) force versus $\Delta Z$ ($\Delta X$, $\Delta Y$=0 μm, $\overline{\sigma}$=0.042 mN) at three voltages, and suspension spring force ($k_S$=2.28 N/m). Inset figure shows near-/in-contact behavior, with mechanical contact force removed. (b) Force versus Y-axis offsets ($\Delta Z$=50-500 μm, $\Delta X$=0 μm, $\overline{\sigma}$=0.127 mN). (c) Force versus X-axis offsets ($\Delta Z$=100 μm, $\Delta Y$=0 μm, $\overline{\sigma}$=0.045 mN).

Blocked force measurements of the RFAs were performed using the experimental set-up shown in FIG. 16. Alignment sensitivity of the actuator layers is measured by translating the two layers relative to one another in discrete X-, Y-, and Z-axis offsets (ΔX, ΔY, ΔZ), as shown in FIG. 17.

Two actuator layers are laminated to individual glass microscope slides (Fischer Scientific, 75×25×1 mm) with thermal adhesive. One glass slide is mounted on a stack of two linear stages (Newport, 423 Series) to provide X-/Y-axis offsets, with the actuator layer face-up. A single-axis load cell (Omega, LCFA-50G) is mounted to a third linear stage providing Z-axis offsets, suspended over the other stages, and an interface block is secured to the end of the load cell input shaft. The second glass slide, with actuator face-down, is placed and aligned on top of the first actuator layer. Liquid paraffin wax is poured on the top side of the glass slide, and the load cell with interface block is lowered into the liquid wax and allowed to solidify. The wax provides mechanical connection between the actuator and load cell while guaranteeing the two actuator layers are parallel. The top actuator layer can then be raised away from the bottom layer.

Figure 23:
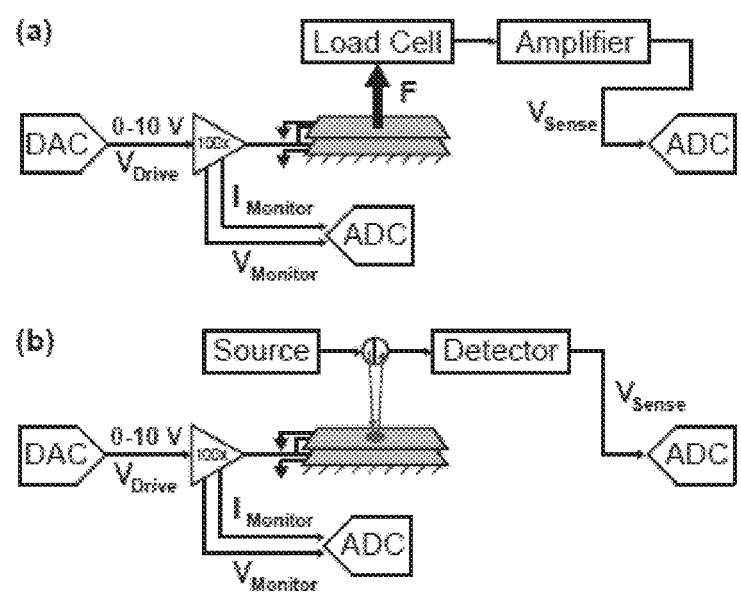
FIG. 23 shows electrical diagrams for measuring blocked force (a) and free displacement (b). $V_{Drive}$ is amplified using a Trek Piezo Driver/Amplifier. Forces are measured with a single-axis load cell (Omega, LCFA-50G) and strain gauge amplifier (Techkor Instrumentation, MEPTS-9000). Displacements are measured using custom optical sensors [43].

A LabView interface controls the experiment (FIG. 23). A low-voltage drive signal ($V_{Drive}$)—in this case a 2 Hz, 0-10 V square-root of sinusoid waveform—is generated by a DAQ (National Instruments, NI USB 6341) and supplied to a high-voltage amplifier (Trek, PZD700 Piezo Driver/Amplifier). The amplifier provides 100× gain to $V_{Drive}$, and this signal then powers the actuator. Voltage ($V_{VP}$) and Current ($V_{CP}$) probes provide measurement of the actuator's electrical properties during testing. The load cell—a full Wheatstone bridge strain gauge circuit—measures the electrostatic normal force applied to the top actuator layer and a strain gauge amplifier (Techkor Instrumentation, MEPTS-9000) boosts this signal ($V_{Sense}$) by 100×. $V_{Sense}$ is then logged by the DAQ.

Maximum repulsive force (9.03 mN) is generated by a two-layer V2 actuator in a ($\Delta X$, $\Delta Y=0$ μm, $\Delta Z=50$ μm) configuration at 1000 V. Recorded actuator behavior in this configuration is provided in FIG. 4, panels (c) and (d), and shows the quadratic relationship between the applied voltage and blocked force. Operation of a well-aligned (in the X/Y-plane) actuator will apply purely normal (Z-axis) force to the top layer. Repulsive force increases with the inverse square of Z-axis offsets (FIG. 17, panel (a)), to a maximum of 9.03 mN (at $\Delta Z=50$ μm), and has good agreement with the simulated forces. Closer than this ($\Delta Z<50$ μm), electrode imperfections produce non-uniformities in the electric field that reduce the repulsive force. Upon contact ($\Delta Z=0$ μm), the internal ($V_-$) electrodes act as a single conductive body, which redistributes the surface charge and generates a net attractive force between the actuator layers (FIG. 17, panel (a), Inset).

Y-axis offsets (FIG. 17, panel (b), $\Delta Y>0$ μm) between the layers reduce the repulsive normal force, and sufficient lateral offsets can actually transition the net repulsive force to an attractive force. The $\Delta Y$ transition from repulsive to attractive force varies with $\Delta Z$: $\Delta Y_{Trans.}=92, 128, 178, 275$ μm (9.2-27.5% phase offset, given the 1 mm pitch electrodes) for $\Delta Z=50, 100, 200, 500$ μm, respectively, so closely spaced layers tolerate less $\Delta Y$ misalignment. Maximum attractive force occurs at $\Delta Y=500$ μm (50% phase offset) and maximum repulsive force occurs at 0%/100% phase offsets. A Y-axis shear force is also produced during the transition from pure repulsive to pure attractive modes. This behavior demonstrates the need to assemble RFAs with precise lateral alignment to ensure maximum repulsive forces are generated (and attractive forces are avoided).

X-axis offsets (FIG. 17, panel (c), $\Delta X>0$ μm) reduce the overlap between electrode traces on each layer and proportionally reduce the repulsive normal force. The slope changes at $\Delta X=500$ μm when the centerline trace no longer overlaps (see FIG. 15). Electrode traces remain well-aligned with respect to the Y-axis, avoiding a transition from repulsive to attractive force.

Figure 18:
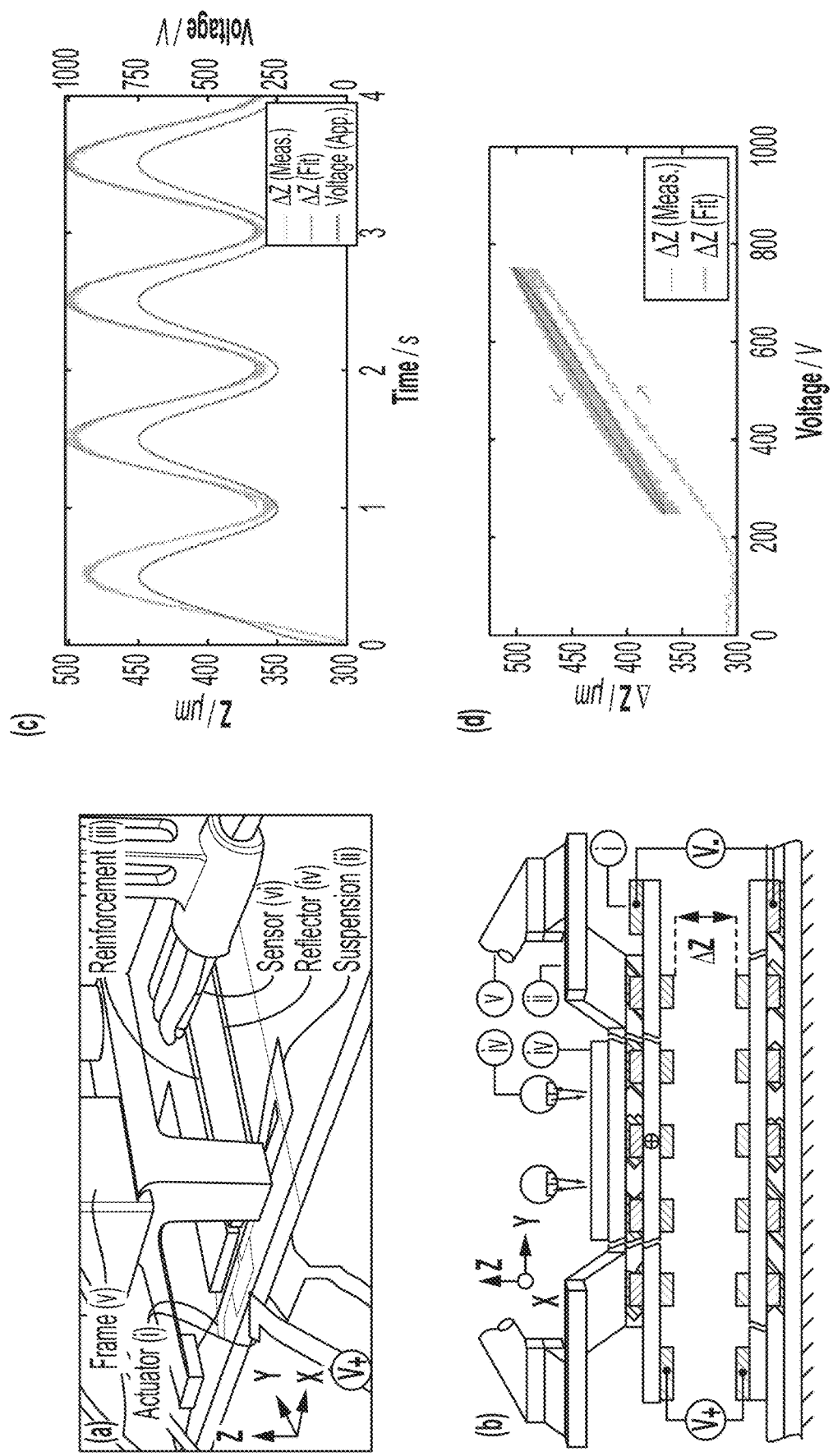
FIG. 18 shows a testing setup for free displacement characterization (a) with mechanical diagram (b) (electrical diagram in FIG. 23). Of the two actuator layers (i), the bottom layer is bonded to a glass slide, and the top layer is reinforced with carbon fiber rods (iii) and connected to a 3D-printed frame (v) via a film cantilever spring suspension (ii, outlined in white). Displacement is monitored by optical emitter/detector sensors (vi) at two locations, reflected off a paper reflector (iv). Power is supplied by copper foil wires (V+/V−). (c-d) Displacement characterization with an applied sinusoid input voltage at 1 Hz/500±250 V peak-to-peak. (c) Measured actuator $\Delta Z$ and actuator voltage versus time, with fit shown; (d) measured actuator $\Delta Z$ versus actuator voltage, with fit shown.
Figure 19:
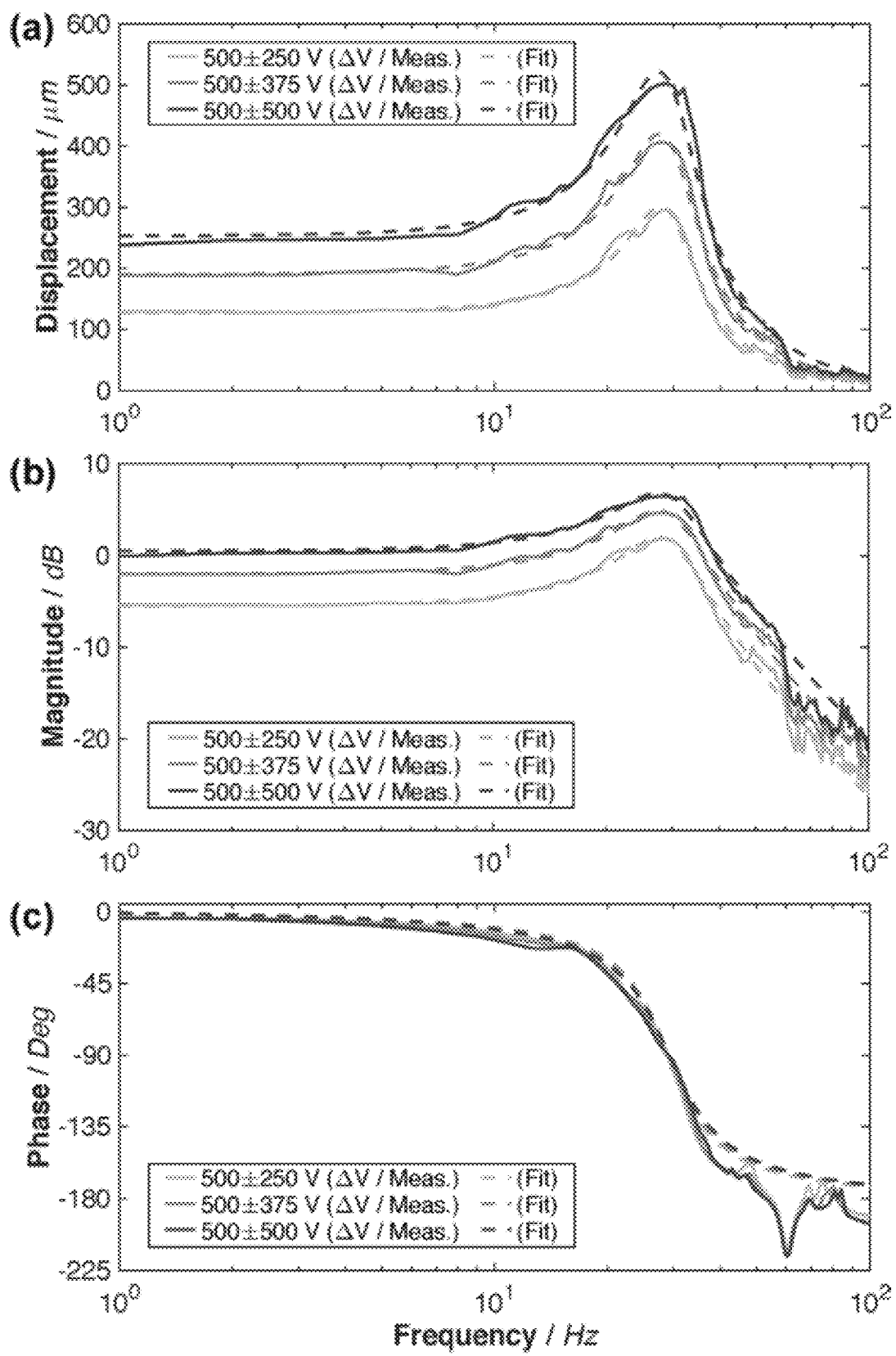
FIG. 19 shows actuator displacement (peak-to-peak) (a), magnitude (b), and phase (c) versus frequency. Applied sinusoid input voltage at 1-100 Hz and 500±250/375/500 V peak-to-peak. Data is fit with second-order linear systems. The actuator has stable 240-260 μm peak-to-peak displacements at sub-10 Hz frequencies, 511 μm displacements at 29 Hz resonance, and a 43 Hz open-loop bandwidth. The resonant peak has a quality factor of 1.59 (−3 dB from peak at 17.3 and 35.5 Hz).
Figure 24:
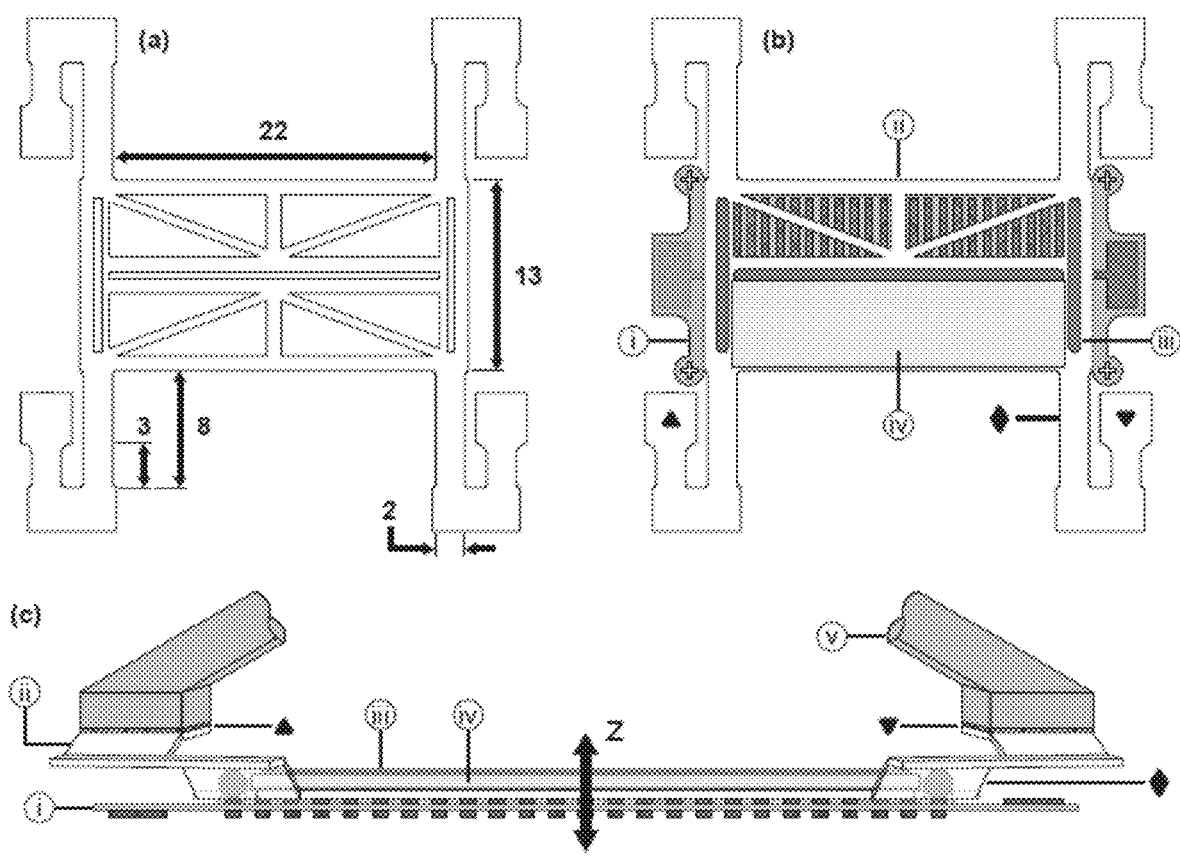
FIG. 24 shows a suspension design and assembly for the top actuator layer in the free displacement measurement experiment. (a) Design for the parallel four-bar suspension, with four folded spring elements (units in mm). (b) Top view of assembly containing the actuator layer (i) adhered to the film suspension (ii), carbon fiber rod reinforcement (iii), and an optical reflector (iv). The suspension is cut from a single PET film (25 μm thick). The carbon fiber rods fit into pre-cut slots in the suspension aligned on top of existing electrode traces (to prevent modifying the electrical field distribution). (c) Cross-section view of actuator assembly mounted to the 3D-printed frame (v). Markers (▲/▼/♦) show suspension alignment between top and side view. Suspension allows Z-axis translation of the actuator layer.

Free displacement measurements of the RFAs were performed using the set-up shown in FIG. 18, with results in FIG. 19. The actuator top layer is suspended on a parallel 4-bar suspension (FIG. 24) that provides orientation, Z-axis compliance for large displacements, and X-/Y-axis stiffness to maintain alignment. The actuator layers have an initial offset of $\Delta Z_0=310$ μm to prevent operation near $\Delta Z=50$ μm, where repulsive force markedly decreases (see FIG. 17).

The actuator bottom layer is laminated onto a glass slide and secured to a 1-DoF rotational stage (Newport, MT-RS Series). The actuator top layer is suspended from a 3D-printed mount (FormLabs, Form 2) on a 3-DoF linear stage (Newport, M-461 Series) to align the top layer over the bottom layer. The spring suspension (FIG. 24) includes four sets of cantilevered beams—compliant in Z, stiff in X/Y—laser-cut from PET film (American Durafilm, 25 μm) as a single unit and adhered to the top layer with thermal adhesive. Two fiberoptic optical sensors—developed by E. Steltz [43]—provide displacement measurements of the actuator's top layer, and distinguish between Z-axis translational and X-axis rotational or flexing modes. The sensors are mounted parallel to one another in a 3D-printed clamp on an independent 3-DoF stage; sensor light is reflected off of matte paper sheets adhered onto the actuator top layer. The actuator is controlled from LabView, driven by a square-root of sinusoid signal supplied from the high-voltage amplifier, and monitored with voltage and current probes. The displacement is measured by the fiberoptic sensors and logged by the DAQ.

For testing at different pressures, the full testing set-up is placed in a vacuum chamber (Abbess Instruments) and pumped down to the desired pressure using a vacuum pump (Pittsburgh Automotive, Two Stage Vacuum Pump). Vacuum feedthroughs for electricity and fiber-optic cables are used to drive the actuator and measure displacements.

Figure 25:
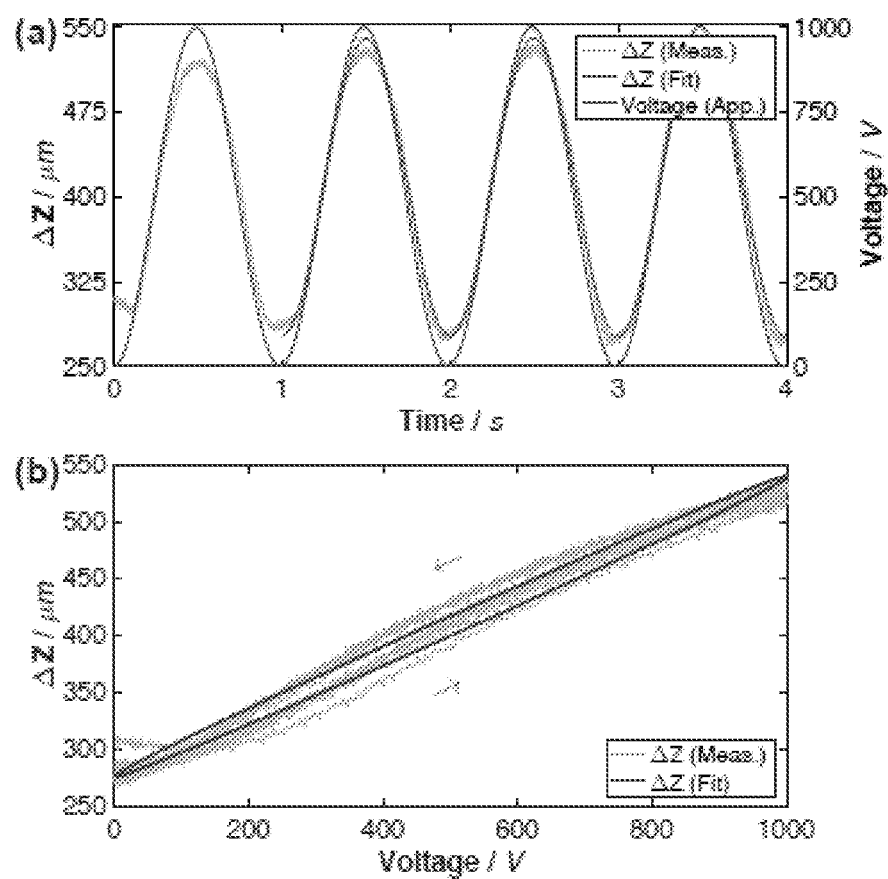
FIG. 25 shows displacement characterization with an applied sinusoid input voltage at 1 Hz/500±500 V peak-to-peak. (a) Actuator ΔZ (measured and sinusoid fit) and actuator voltage versus time; (b) actuator ΔZ (measured and sinusoid fit) versus actuator voltage. Deviations from pure sinusoidal displacement are visible around peaks.

The actuator's measured displacement at low-frequency operation is shown in FIG. 18. A sinusoidal voltage (500 V bias and ±250 V amplitude) is applied to generate sinusoidal displacements of 132 μm peak-to-peak, after initial transients subside. Applying 500±500 V generates larger 242 μm peak-to-peak displacements (FIG. 25), at the cost of increased non-linear behavior and hysteresis—likely caused by viscoelastic behavior in the PET suspension or residual charge in the polyimide substrate.

Figure 26:
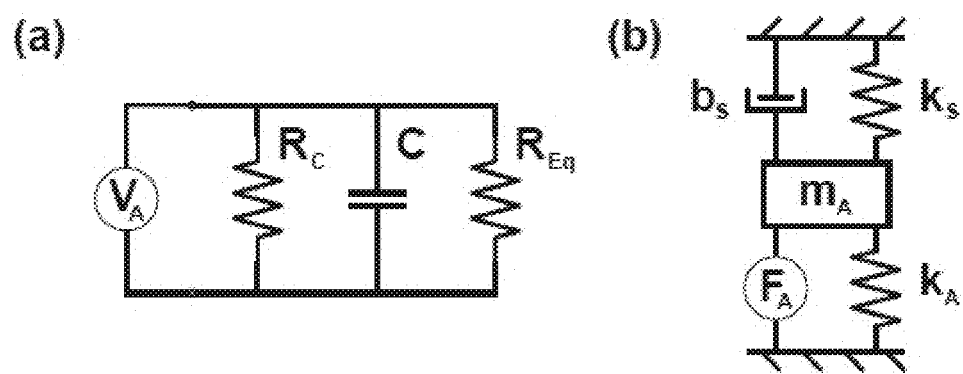
FIG. 26 shows electrical (a) and mechanical (b) models for the actuator. Electrical components include: voltage source ($V_A$) and actuator capacitance (C=840 $p_F$), leakage resistance ($R_C$=350 GΩ), and equivalent resistance ($R_{Eq}$=3.5 GΩ, at resonance) due to mechanical load. At resonance, $R_{Eq}=b_S/T^2$, with the linear approximation of T=ΔF/ΔV=2.11·$10^6$ N/V (electro-mechanical transformation ratio) determined using ±250 V deviations around the 500 V and ΔZ=425 μm operating point in FIG. 17, panel (a). Mechanical components include: actuator force source ($F_A$), actuator electrostatic spring ($k_A$=2.2 N/m), actuator mass ($m_A$=0.135 g), suspension spring ($k_S$=2.28 N/m), and suspension damping ($b_S$=0.0155 $N_{s/m}$).

The actuator's frequency-dependent displacement, magnitude, and phase behavior is shown in FIG. 19, and exhibits second-order behavior as modeled in FIG. 26. Displacement is measured peak-to-peak during stable operation after transients subside. The actuator has a −3 dB bandwidth of 43 Hz. A stable Z-axis resonant mode at $f_0=29$ Hz has a peak displacement of $\Delta Zf_0=511$ μm and quality factor of $Q=1.59$ (17.3-35.5 Hz). From resonant behavior:

$$Q=\omega_0/\Delta\omega \tag{11}$$

$$\omega_0=\sqrt{(k_A+k_S)/m_A} \tag{12}$$

$$b_S=(m_A\omega_0)/Q \tag{13}$$

Figure 27:
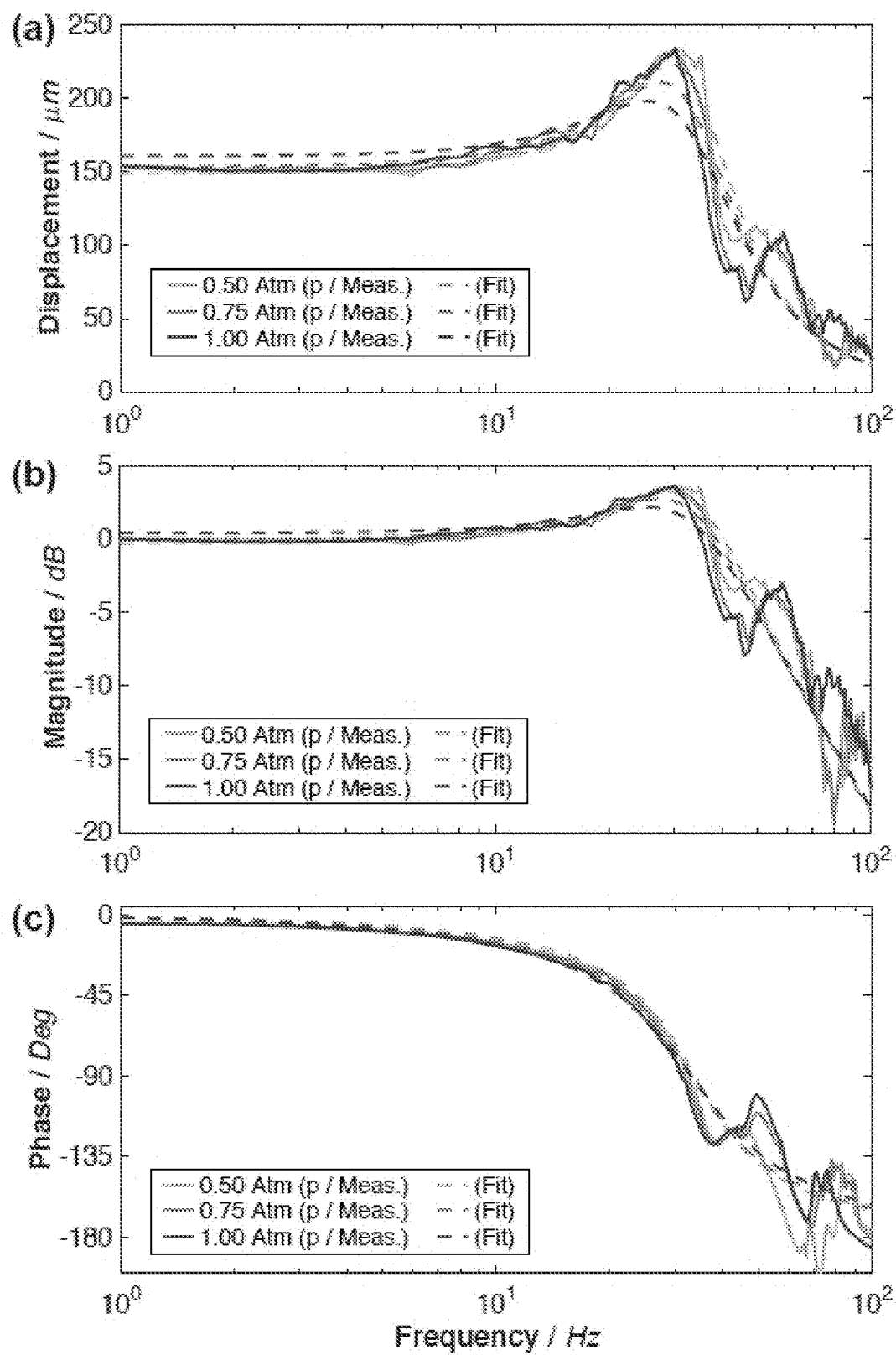
FIG. 27 shows actuator displacement (peak-to-peak) (a), magnitude (b), and phase (c) versus frequency, at three environmental pressures (0.50, 0.75, and 1.00 Atm). Actuator is driven by an applied sinusoid input voltage at 1-100 Hz and 500±250 V peak-to-peak, and layers have an initial gap of ΔZ=114 μm. Data is fit with 2-pole linear system model. Air damping has minimal effect on actuator operation: peak displacement is a near-constant 230-234 μm at 30 Hz across the three pressures (increased amplitude would be expected at lower pressures).

Given the measured mass ($m_A=135$ mg) and suspension stiffness ($k_S=2.28$ N/m), the calculated net stiffness is 4.5 N/m ($k_A+k_S$) and the parallel effective electrostatic spring stiffness is 2.2 N/m ($k_A$). This agrees with the direct estimation of $k_A$ from FIG. 17, panel (a):

$$k_A=dF/dZ\approx\Delta F/\Delta Z=2.36 \text{ N/m} \tag{14}$$

around the average operating point of $\Delta Z=425$ μm and 500 V; the effect of $k_S$ is also plotted in FIG. 17, panel (a). Damping ($b_S=0.0155$ Ns/m) is generated predominantly by the structure as opposed to air, as seen in FIG. 27. X-axis rotational modes are predicted at 0.34 Hz and 5.8 kHz, and an X-axis bending mode predicted at 51 Hz is increased to above 200 Hz with stiffeners (reflectors and the carbon fiber reinforcing rods).

Mechanical power is calculated from the actuator's resonant behavior. Assuming a second-order system:

$$P=\frac{F^2}{2b_S}, \text{ with } F=(k_S+k_A)\cdot\Delta Z_{f_{DC}} \tag{15}$$

$\Delta Z$ at $f_{DC}=1$ Hz is provided in FIG. 19; the stiffnesses ($k_A$, $k_S$) and damping ($b_S$) are provided in FIG. 26. Calculated mechanical power for the actuator at resonance is 38.0 μW.

Figure 28:
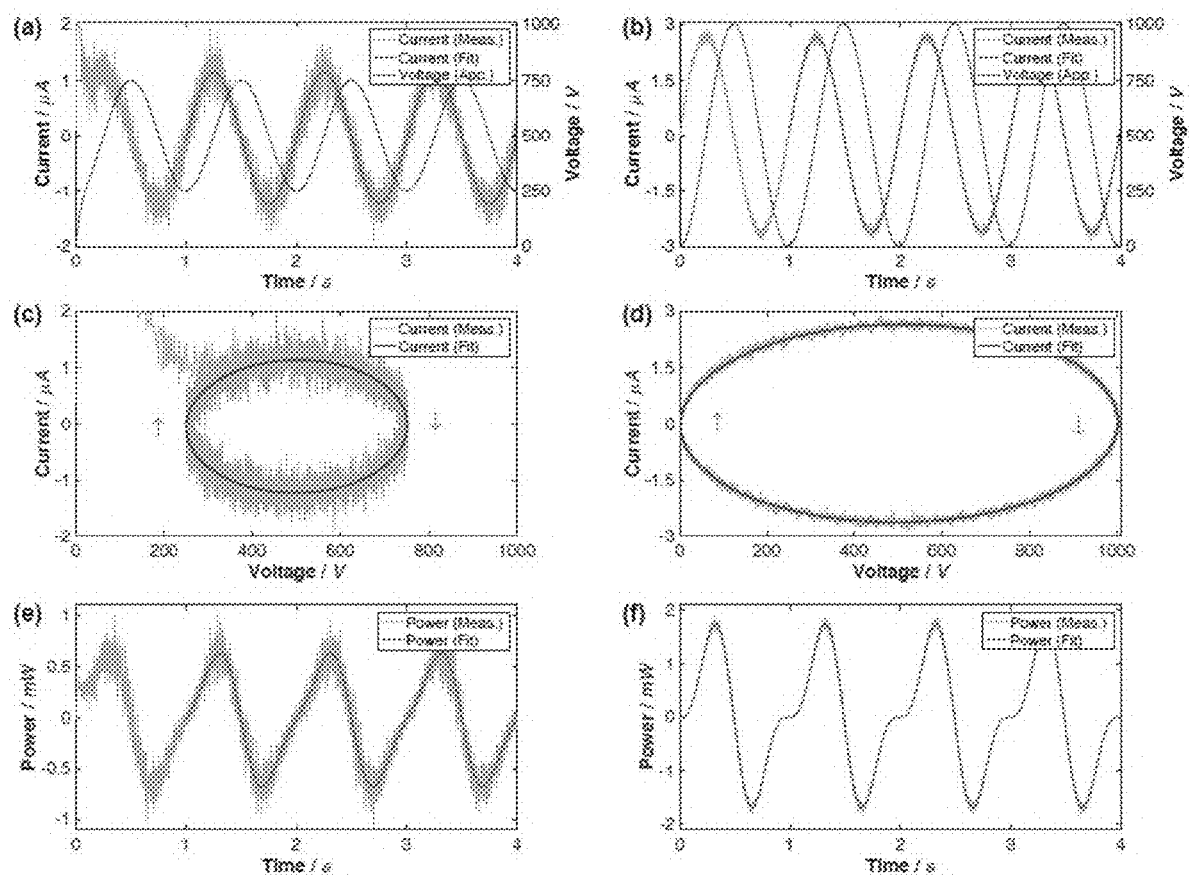
FIG. 28 shows actuator applied voltage, measured current, and calculated input electrical power versus time, recorded during operation of displacement experiments. Applied voltage is a sinusoid input at 1 Hz/500±250 V peak-to-peak (a/c/e) and 1 Hz/500±500 V peak-to-peak (b/d/f). (a/b) Current (measured and sinusoid fit) and voltage versus time; (c/d) current (measured and sinusoid fit) versus voltage; (e/f) calculated input power versus time, with fit. The actuator's measured electrical behavior is consistent with an 840 pF capacitance; current due to parallel resistances (350 GΩ leakage and 3.5 GΩ equivalent resistance) are below the measurement resolution. The I-V plot is elliptical, and current leads voltage by 89.1-89.3, based on fits in (a/b). Resistance was measured directly with an electrometer (Keithley Instruments, 610C). Note that the initial ramp up in applied voltage from 0 V to the 500±250 V sinusoid in (a/c) results in a current spike to 4.7 μA that settles to steady state within 0.15 s. (a/c/e) is unfiltered data; (b/d/f) has a 3-point moving median filter applied.
Figure 29:
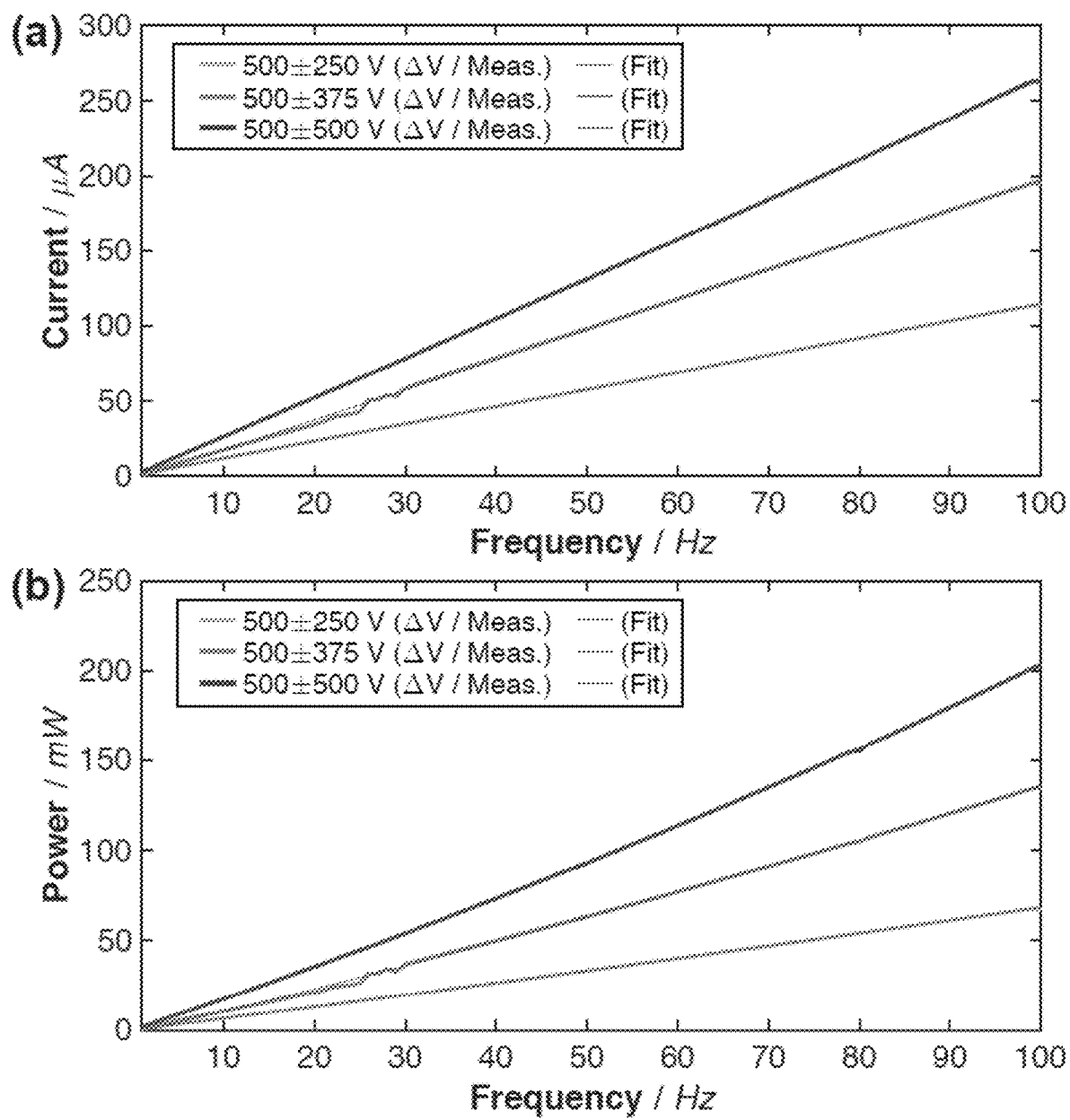
FIG. 29 shows actuator electrical performance: (a) peak current versus frequency, with linear fit; (b) peak power versus frequency, with quadratic fit. Applied voltage is a sinusoid input, at 1-100 Hz and 500±250/375/500 V peak-to-peak. Current consumption is expected to be linear (with frequency) in a non-ideal capacitor model, with slope proportional to capacitance (840 pF) and vertical offset due to parallel resistances (below the measurement noise and resolution). Power consumption is expected to be quadratic (with frequency) in a non-ideal capacitor model.
Figure 30:
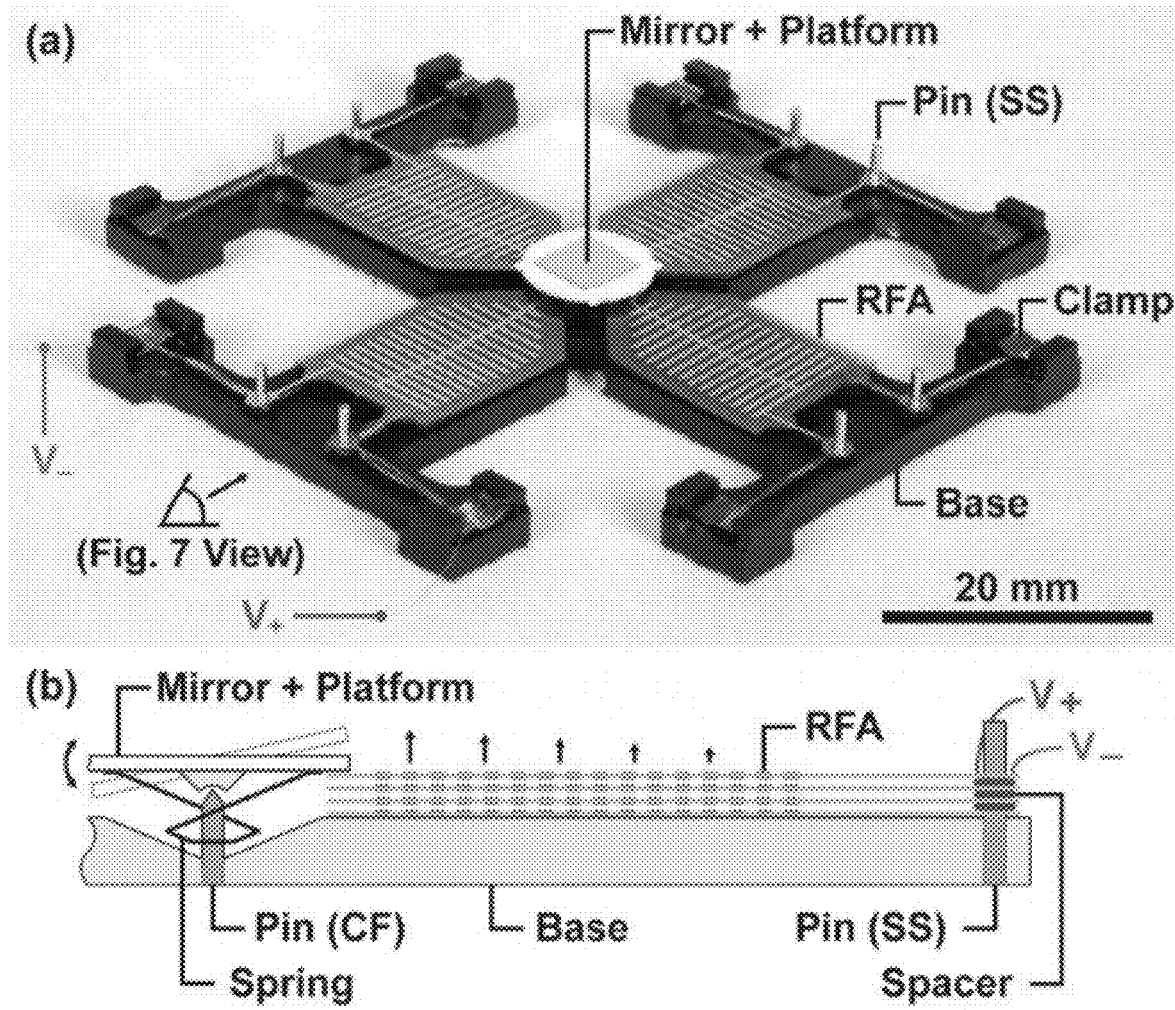
FIG. 30 shows a fabricated 2-DoF micro-mirror system according to some embodiments of the invention. Image (a) and cross-section diagram (b), with 3D-printed base, four 4-layer RFAs, and spring-loaded mirror.
Figure 31:
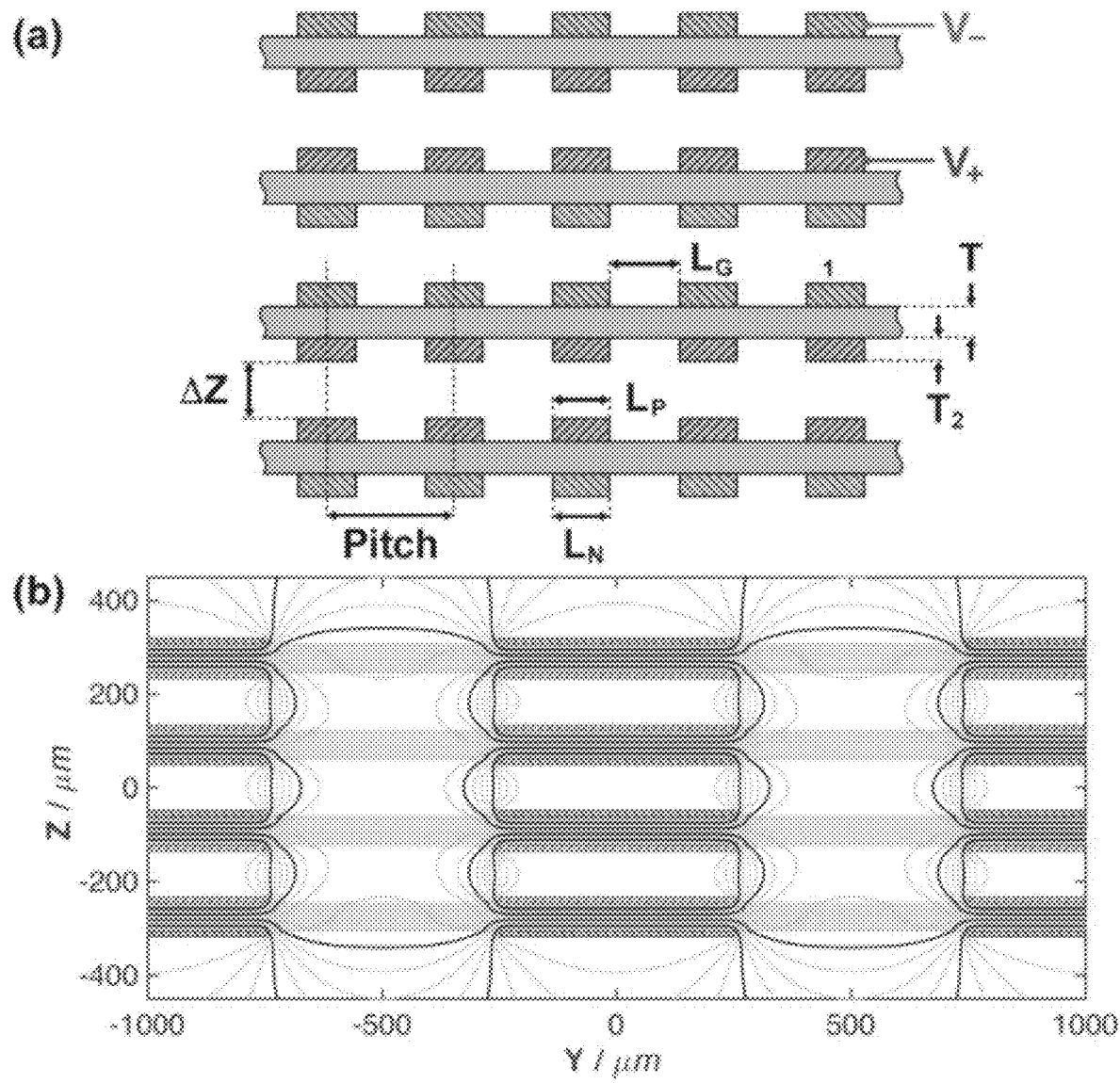
FIG. 31 shows a cross-section diagram (a) and electrostatic simulation (b) of the multi-layer RFA showing equipotential lines, with $L_P$, $L_N$, $L_G$=500 μm, Pitch=1000 μm, $T_1$=60 μm, $T_2$=12.5 μm. Exterior layers experience the largest electrostatic force imbalance and net repulsive forces, as seen in FIG. 34.

Electrical power is calculated directly from the voltage and current probe measurements. The actuator behaves electrically as a non-ideal capacitor (FIG. 28)—with parallel capacitance (C=840 pF), leak resistance ($R_C$=350 GΩ), and equivalent resistance ($R_{Eq}$=3.5 GΩ, at resonance) due to mechanical work—and is modeled in FIG. 26. Electrical input power increases quadratically (1.78 mW at 1 Hz to 52.3 mW at 29 Hz resonance) and current increases linearly (2.73 μA to 75.5 μA) with frequency (FIG. 29), using a 500±500 V sinusoidal driving voltage.

The actuator has an electromechanical coupling factor of 1.8% (1 Hz)-3.7% (29 Hz), based on:

$$\kappa = \sqrt{\frac{W_{Mech.}}{W_{Ele.}}} = \sqrt{\frac{(k_A + k_S)\Delta Z^2}{C\Delta V^2}} \tag{16}$$

The low coupling factor results from the actuator's large parallel plate capacitance between oppositely-charged electrodes in the V2 design.

Application Example

Figure 20:
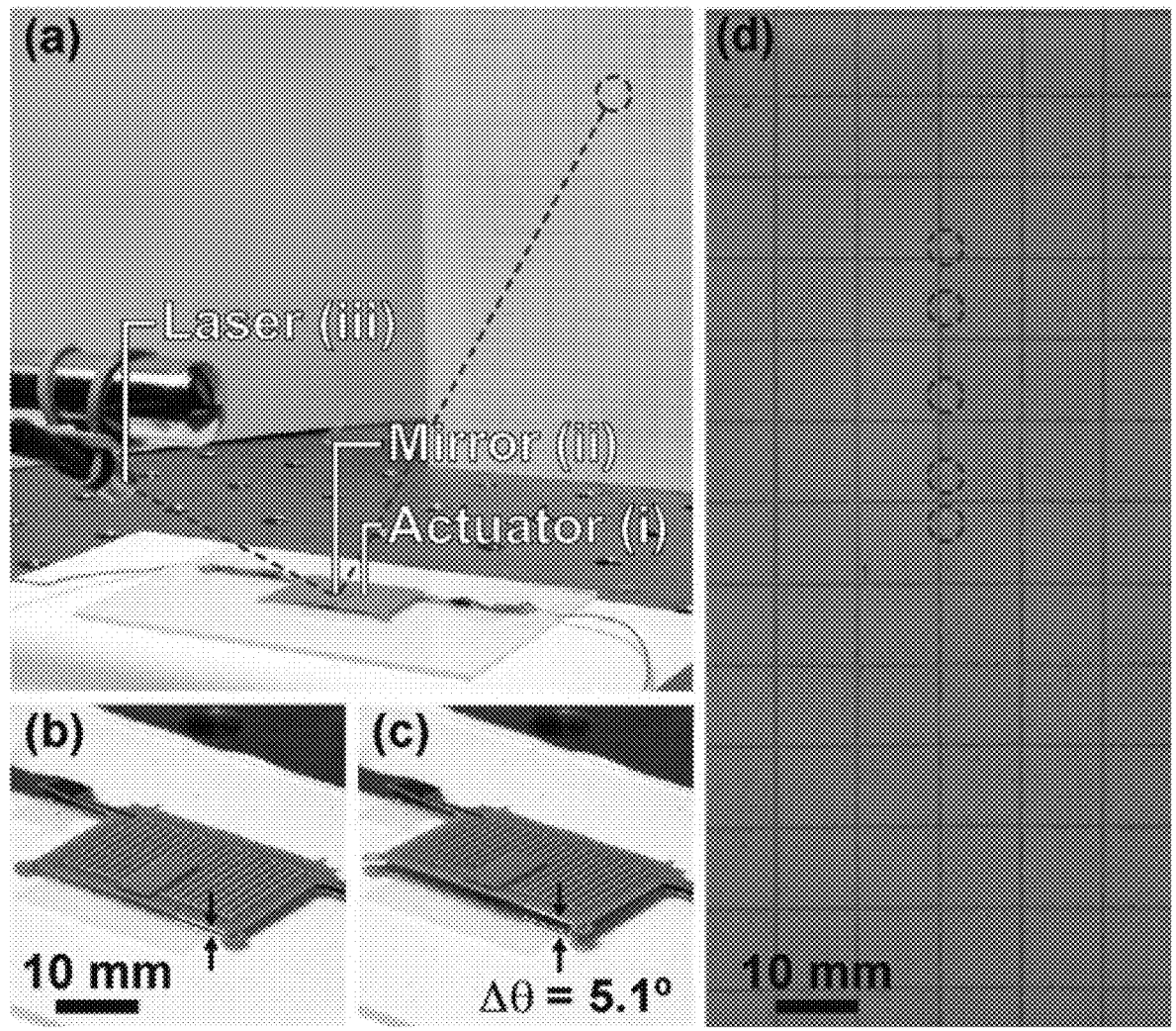
FIG. 20 shows (a) 1-DoF micro-mirror composed of a 2-layer RFA (i) and a metallized glass coverslip mirror (ii) controllably steers a laser beam (iii). Resonant performance at 16 Hz and 1000 V peak-to-peak, with: (b-c) actuation of RFA and (d) movement of laser dot at resonance (approx. 5.1).

We demonstrate a low-cost, 1-DOF micro-mirror driven by a flexible actuator for beam-steering applications (FIG. 20), such as laser mapping (on mobile robots) and laser engraving/marking. The micro-mirror system is self-contained (no extra transmission required), compact (45×15 mm, with 20×10 mm of active actuator area), and lightweight (290 mg, including a 14 mg 13×6 mm mirror).

The micro-mirror system according to some embodiments includes a 2-layer rotational RFA: The electrodes are fabricated from a single sheet of Pyralux AP that is folded in half to form the two layers. The bottom layer is adhered to a glass slide; the top layer is aligned/suspended by two polyimide torsional springs. The two layers are connected at the spring anchors, and share common V−/V−terminals at these locations. Power to the top layer is supplied by copper traces on the spring suspension. The mirror is a metallized glass coverslip (100 μm thick), cut to size and placed on the top layer. The mirror reflects the beam from a laser diode mounted over the micro-mirror system.

The micro-mirror operates stably with open-loop control: applied voltages of 0-1000 V generate angular displacements of 2.2° (at low-frequencies) up to 5.1° (at 16 Hz resonance). The micro-mirror has peak input power of 2.57-41.0 mW and current of 3.81-60.4 μA at 1-16 Hz, respectively. Further, as the actuator displacement is proportional to its applied voltage, the micro-mirror can deflect controllably to any intermediate angles, unlike many commercial two-state (on/off) micro-mirrors.

Future applications of this actuator technology could also include large-area actuators (changing reflectivity/transparency for building thermal regulation [44]) and actuation on robot platforms that already employ high-voltage electrostatic grippers/adhesives [45].

Herein, we have demonstrated meso-scale repulsive force electrostatic actuators that employ a redesigned electrode geometry and are made using a flex-circuit planar manufacturing process. The electrode design changes enable actuators that operate at 20 times greater field strength and generate 8.6-10.5× greater electrostatic pressure (over previous RFA electrode designs) at the same operating voltage and electrode feature size. At the same time, our actuators are extremely robust—individual actuators have been tested without failure for >700,000 cycles at up to 1000 V, 0.1-100 Hz, and 0.25-1.00 Atm—since electrode defects or layer misalignment during operation reduce the repulsive force rather than causing a destructive shorting failure. This actuator design has other notable advantages:

Stable operation with no pull-in behavior (unlike attractive force electrostatic actuators)

Peak force generated at rest configuration (unlike attractive force electrostatic actuators)

Voltage-controlled force and displacement, with no measured maximum ΔZ at which repulsive force becomes attractive (unlike prior RFA designs)

Low mechanical hysteresis (unlike piezoelectric actuators and DEAs)

Simple suspension for moving layers, since only one axis requires high stiffness and precise alignment No shorting failures if electrodes have manufacturing defects or if actuator layers are misaligned or touch, since oppositely-polarized electrodes are insulated by a resilient, incompressible dielectric substrate instead of air gaps (unlike prior RFA designs) The fabrication process is comparable to conventional flexible PCB manufacturing processes, so cm-scale actuators can be immediately and inexpensively mass-produced. PCB vendors can even use the same Pyralux substrates we employ in this research to produce one- or two-sided actuator layers with higher density traces—100 μm traces or gaps, compared to the 500 μm traces tested in-lab.

Fabricated actuators were observed to generate maximum repulsive forces up to 9.03 mN (36.1 Pa) and displacements of 242-511 μm across an open-loop stable bandwidth of 43 Hz with a 29 Hz resonant peak. A 290 mg micro-mirror system driven by an RFA was demonstrated to produce 5.1° rotations at 16 Hz resonance, and controllably steer a laser beam.

References—Example 1

1. K. Pister, M. Judy, S. Burgett, R. Fearing, Microfabricated hinges, Sens. Actuators. A Phys. 33 (3) (1992) 249.
2. A. M. Hoover, R. S. Fearing, Fast scale prototyping for folded millirobots, in: IEEE ICRA, 886, 2008.
3. D. W. Haldane, C. Casarez, J. Karras, J. Lee, C. Li, A. Pullin, E. Schaler, D. Yun, A. Javey, R. S. Fearing, Integrated manufacture of exoskeleton and sensing for folded millirobots, J. Mech. Robot. 7 (2) (2015) 19.
4. R. J. Wood, S. Avadhanula, R. Sahai, E. Steltz, R. S. Fearing, Microrobot design using fiber reinforced composites, J. Mech. Des. 130 (5) (2008) 052304.
5. J. P. Whitney, P. S. Sreetharan, K. Y. Ma, R. J. Wood, Pop-up book MEMS, J. Micromech. Microeng. 21 (11) (2011) 115021.
6. T. Takahashi, K. Takei, A. G. Gillies, R. S. Fearing, A. Javey, Carbon nanotube active-matrix backplanes for conformal electronics and sensors, Nano Letters 11 (12) (2011) 5408.
7. M. T. Tolley, S. M. Felton, S. Miyashita, D. Aukes, D. Rus, R. J. Wood, Self-folding origami: shape memory composites activated by uniform heating, Smart Mater. Struct. 23 (9) (2014) 094006.
8. M. M. Hamedi, V. E. Campbell, P. Rothemund, F. Güder, D. C. Christodouleas, J.-F. Bloch, G. M. Whitesides, Electrically activated paper actuators, Adv. Funct. Mater. 26 (15) (2016) 2446-2453.
9. N. T. Jafferis, M. Lok, N. Winey, G.-Y. Wei, R. J. Wood, Multilayer laminated piezoelectric bending actuators: design and manufacturing for optimum power density and efficiency, Smart Mater. Struct. 25 (5) (2016) 055033.

10. J. Shintake, S. Rosset, B. Schubert, D. Floreano, H. Shea, Versatile soft grippers with intrinsic electroadhesion based on multifunctional polymer actuators, Adv. Mater. 28 (2) (2016) 231-238.
11. S. Shian, K. Bertoldi, D. R. Clarke, Dielectric elastomer based "grippers" for soft robotics, Adv. Mater. 27 (43) (2015) 6814.
12. K. Minami, S. Kawamura, M. Esashi, Fabrication of distributed electrostatic micro actuator (DEMA), J. Microelectromech. Syst. 2 (3) (1993) 121-127.
13. M. Ito, K. Saneyoshi, Development of large-scale stacked-type electrostatic actuators for use as artificial muscles, Adv. Robotics 1864 (March) (2014) 1-9.
14. A. S. Chen, H. Zhu, Y. Li, L. Hu, S. Bergbreiter, A paper-based electrostatic zipper actuator for printable robots, in: IEEE ICRA, 5038, 2014.
15. H. Shigemune, S. Maeda, V. Cacucciolo, Y. Iwata, E. Iwase, S. Hashimoto, S. Sugano, Printed paper robot driven by electrostatic actuator, IEEE Robot. Autom. Lett. 2 (2) (2017) 1001.
16. I. Hunter, S. Lafontaine, A comparison of muscle with artificial actuators, in: IEEE Solid-State Sens. Actuators, 178-185, 1992.
17. M. Karpelson, R. J. Wood, A review of actuation and power electronics options for flapping-wing robotic insects, in: IEEE ICRA, 779-786, 2008.
18. S. He, R. Ben Mrad, J. Chong, Repulsive-force out-of-plane large stroke translation micro electrostatic actuator, J. Micromech. Microeng. 21 (7) (2011) 075002.
19. S. He, R. Ben Mrad, Large-stroke microelectrostatic actuators for vertical translation of micromirrors used in adaptive optics, IEEE Trans. Ind. Electron. 52 (4) (2005) 974-983.
20. K. Meijer, M. S. Rosenthal, R. J. Full, Muscle-like actuators? A comparison between three electroactive polymers, Proc. SPIE 4329 (2001) 7.
21. I. Penskiy, S. Bergbreiter, Optimized electrostatic inchworm motors using a flexible driving arm, J. Micromech. Microeng. 23 (1) (2013) 015018.
22. S. H. Goodwin-Johansson, S. M. Bobbio, C. Bartlett, N. Eleyan, J. Jacobson, J. E. Mancusi, L. Yadon, C. Ball, T. D. DuBois, W. D. Palmer, D. G. Vellenga, F. M. Tranjan, Measured forces and displacements of integrated force arrays, Proc. SPIE 2642 (1995) 52.
23. T. Niino, S. Egawa, T. Higuchi, High-power and high-efficiency electrostatic actuator, in: Proc. of IEEE MEMS, IEEE, 236-241, 1993.
24. E. Husain, R. S. Nema, Analysis of Paschen curves for Air, N2, and SF6 using the Townsend breakdown equation, IEEE Trans. Electrical Insulation EI-17 (4) (1982) 350-353.
25. P. Slade, E. Taylor, Electrical breakdown in atmospheric air between closely spaced (0.2 μm-40 μm) electrical contacts, IEEE Trans. Comp. Pack. Tech. 25 (3) (2002) 390-396.
26. DuPont, DuPont Kapton®, Tech. Rep., 2012.
27. DuPont, DuPont Pyralux AP, Tech. Rep., 2016.
28. R. Yeh, S. Hollar, K. Pister, Single mask, large force, and large displacement electrostatic linear inchworm motors, J. Microelectromech. Syst. 11 (4) (2002) 330-336.
29. W. C. Tang, T.-C. Nguyen, R. Howe, Laterally driven polysilicon resonant microstructures, in: IEEE MEMS, vol. 20, 53-59, 1989.
30. S. Bobbio, M. Kellam, B. Dudley, S. Goodwin-Johansson, S. Jones, J. Jacobson, F. Tranjan, T. DuBois, Integrated force arrays, in: IEEE MEMS, 149, 1993.
31. R. E. Pelrine, R. D. Kornbluh, J. P. Joseph, Electrostriction of polymer dielectrics with compliant electrodes as a means of actuation, Sens. Actuators. A Phys. 64 (1) (1998) 77-85.
32. R. Pelrine, R. Kornbluh, Q. Pei, J. Joseph, High-speed electrically actuated elastomers with strain greater than 100%, Science 287 (5454) (2000) 836-839.
33. H. Wang, A. Yamamoto, T. Higuchi, Electrostatic-motor-driven electroadhesive robot, in: IEEE/RSJ IROS, 914, 2012.
34. W. C. Tang, Electrostatic comb drive for resonant sensor and actuator applications, Ph.D. thesis, University of California, Berkeley, 1990.
35. W. C. Tang, M. G. Lim, R. T. Howe, Electrostatic comb drive levitation and control method, J. Microelectromech. Syst. 1 (4) (1992) 170-178.
36. S. He, R. Ben Mrad, Performance assessment of a multi-level repulsive-force out-of-plane microelectrostatic actuator, Can. J. Elect. Comput. Eng. 31 (2) (2006) 71-75.
37. S. He, R. Ben Mrad, Design, modeling, and demonstration of a MEMS repulsive-force out-of-plane electrostatic micro actuator, J. Microelectromech. Syst. 17 (3) (2008) 532-547.
38. S. He, R. Ben Mrad, J. S. Chang, Development of a high-performance microelectrostatic repulsive-force rotation actuator, J. Microelectromech. Syst. 19 (3) (2010) 561-569.
39. S. Towfighian, S. He, R. Ben Mrad, A low voltage electrostatic micro actuator for large out-of-plane displacement, in: ASME IDETC/CIE, 1-7, 2014.
40. J. Batterson, Second order finite difference schemes for non-uniform grid spacing, Auburn University, 10, 2014.
41. T. Lebey, P. Castelan, G. Montanari, I. Ghinello, Influence of PWM-type voltage waveforms on reliability of machine insulation system, in: IEEE ICHQP, vol. 2, 994-998, 1998.
42. D. Fabiani, G. C. Montanari, A. Cavallini, G. Mazzanti, Relation between space charge accumulation and partial discharge activity in enameled wires under PWM-like voltage waveforms, IEEE Trans. Dielectr. Electr. Insul. 11 (3) (2004) 393-405.
43. E. Steltz, Optical position sensing for characterization of the micromechanical flying insect, M.s. thesis, University of California, Berkeley, 2006.
44. X. Zhang, Z. Yu, C. Wang, D. Zarrouk, J.-W. T. Seo, J. C. Cheng, A. D. Buchan, K. Takei, Y. Zhao, J. W. Ager, J. Zhang, M. Hettick, M. C. Hersam, A. P. Pisano, R. S. Fearing, A. Javey, Photoactuators and motors based on carbon nanotubes with selective chirality distributions, Nature Communications 5 (2014) 1-8.
45. E. Schaler, D. Ruffatto III, P. Glick, V. White, A. Parness, An Electrostatic Gripper for Flexible Objects, in: IEEE IROS, 1172-1179, 2017.

Example 2

Two complementary electrostatic actuator technologies have rapidly advanced in recent years: 2-layer MEMS repulsive-force actuators [1]-[4] and multi-layer, thin-film attractive-force actuators [5], [6]. Thin-film actuators are lightweight, cheap, and easily fabricated (compared to MEMS actuators); multi-layer actuators generate greater strokes than two-layer actuators. Repulsive-force actuators have open-loop stable operation and generate peak force at initial configurations [7]. These characteristics make a multi-layer, thin-film repulsive-force actuator (RFA) ideal for sensor platforms on meso-scale robots [8], [9].

[2], [3] demonstrate 3-DoF micro-mirrors that are fabricated via PolyMUMPs and driven by 2-layer repulsive-force actuators, with no pull-in and stable actuation over the full stroke length (±1.5°/86 μm). Other micro-mirror systems have been produced in large arrays (±12° 1-DoF deflection) [10] and using micro-assembly (3.5°/0.5 μm 3-DoF deflection at resonance) [11].

[6] demonstrates the feasibility of a 50-layer thin-film actuator (400 μm stroke) with unstable gap-closing actuation and a pull-in limit, while [4] models (without fabrication) a 3-layer MEMS RFA.

[7] introduces 2-layer thin-film RFAs and presented: the electrode pattern used in this paper, an out-of-plane translational actuator (511 μm stroke), and a 1-DoF rotational micro-mirror system (5.1° deflection at resonance). Other 2-layer thin-film electrostatic actuators at the meso-scale have been shown that use attractive, rather than repulsive, actuation modes, including: a linear surface-drive actuator [12], an electrostatic film motor in a 49 gram electroadhesive robot [13], and an electrostatic vibrator in a 47 mg crawling robot [14].

Fabrication

Figure 32:
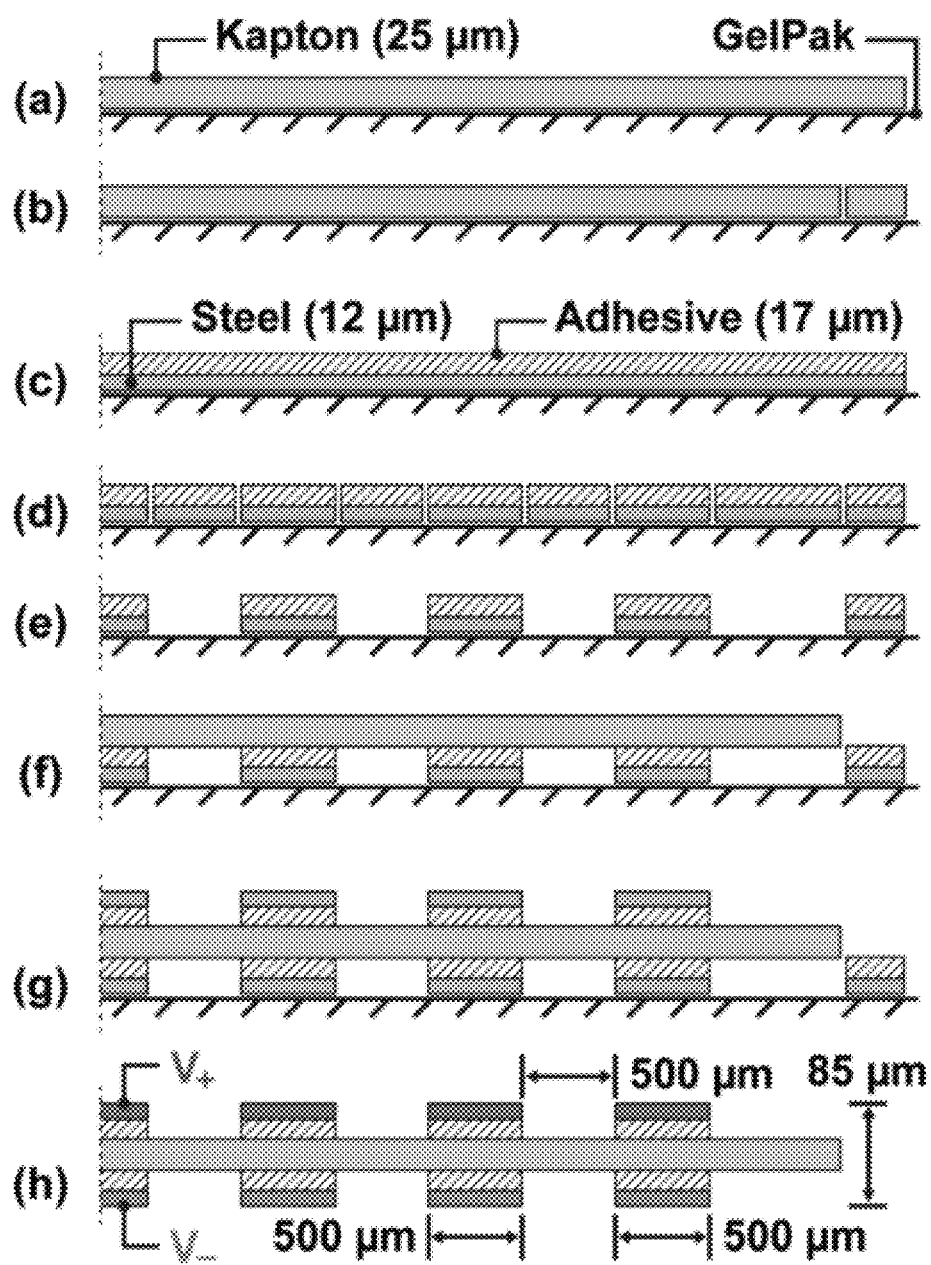
FIG. 32 shows a fabrication process for RFA layers according to some embodiments. (a-b) Substrate is laser-cut from Kapton film (25 μm) secured on GelPak. (c-d) Electrodes are laser-cut from stainless steel foil (12 μm) bonded to thermally-activated sheet adhesive (17 μm) and secured on GelPak. (e) Excess foil is removed from the patterned electrodes. (f-g) Kapton substrate is visually aligned over one set of patterned electrodes, bonded (with heat), removed, flipped over, and repeated on a second set of electrodes. (h) Electrodes are powered (V+/V−), with opposite sides charged differentially.

Multi-layer RFAs can be fabricated by stacking multiple thin-film actuator layers; we demonstrate 4 to 8-layer stacks. The fabrication process for individual layers according to some embodiments is shown in FIG. 32. Each layer includes two stainless steel foil electrodes (Trinity Brand Industries, 12 μm thick) adhered to each side of a polyimide (Dupont Kapton, 25 μm) substrate with thermally-activated sheet adhesive (GBC Octiva Hot Mount, 17.5 μm). The electrodes and the substrate are laser-micromachined with a UV laser (PhotoMachining Inc., 355 nm), visually aligned, and laminated to form a composite.

Figure 33:
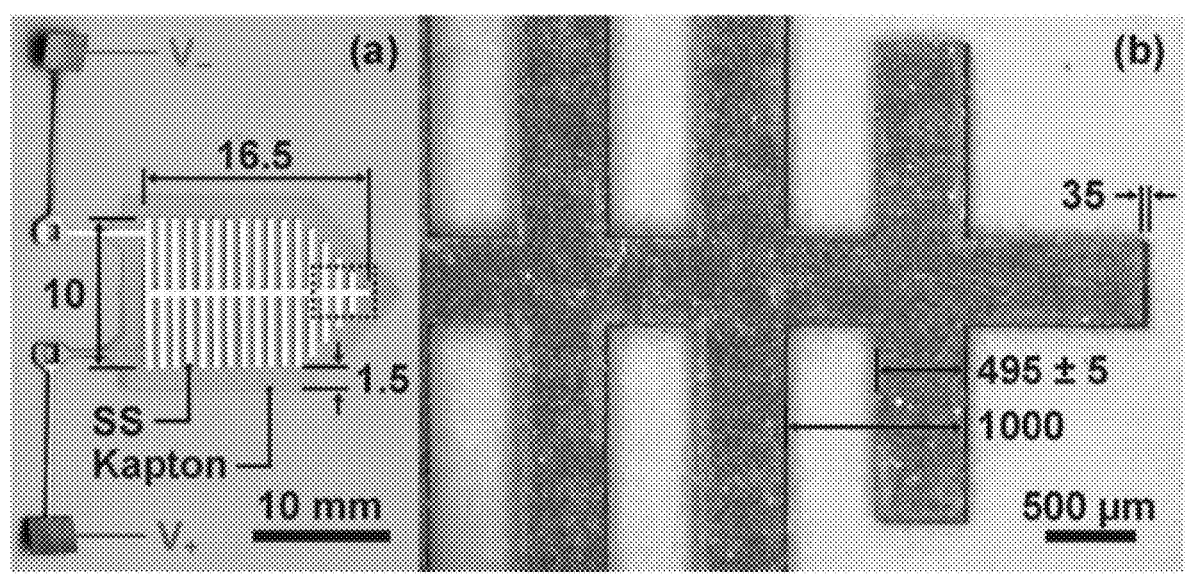
FIG. 33 shows an RFA layer (a) with magnified view of outlined area (b).
Figure 34:
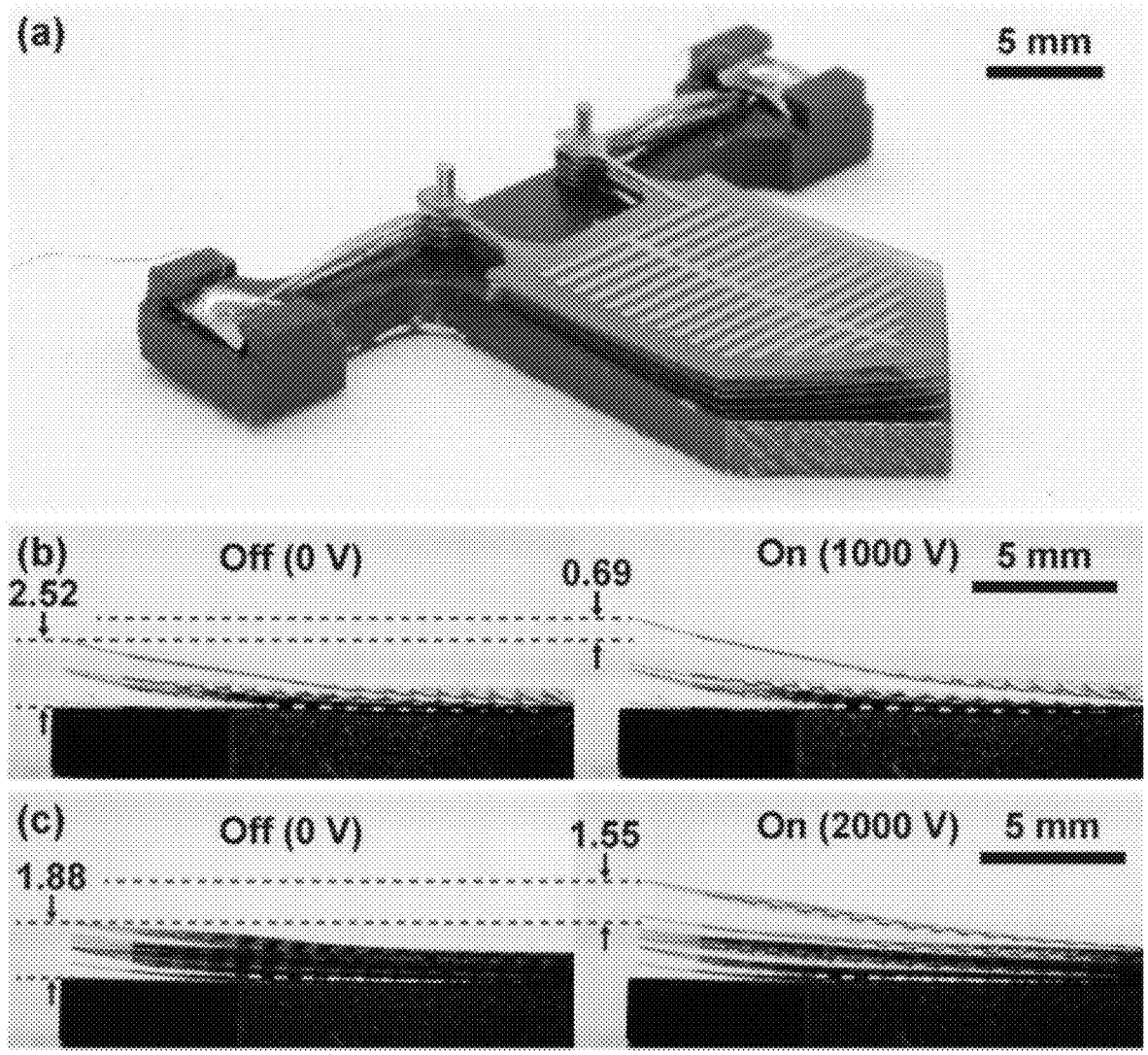
FIG. 34 shows an isometric view (a) of an 8-layer RFA, and side views of a 4-layer (b) and 8-layer (c) RFA operating at 0 to 1000/2000 V, respectively.

FIG. 33 shows an individual RFA layer and a magnified view highlighting alignment quality between electrodes on each side of the dielectric substrate (minor 35 μm misalignment is visible at the tip). The electrode dimensions in the fabricated actuator layers correspond to those defined in FIG. 31.

RFA layers are stacked to form actuators (FIGS. 30, 34): pins on a 3D-printed base and spacers (100 μm) provide exact alignment constraints between layers; spring suspension (k=2.3 N/m) from cantilevered beams and residual curvature of individual layers provides a gravity offset and restoring force. This electrode pattern is scalable to sub-100 μm features with other manufacturing processes.

Characterization

Figure 35:
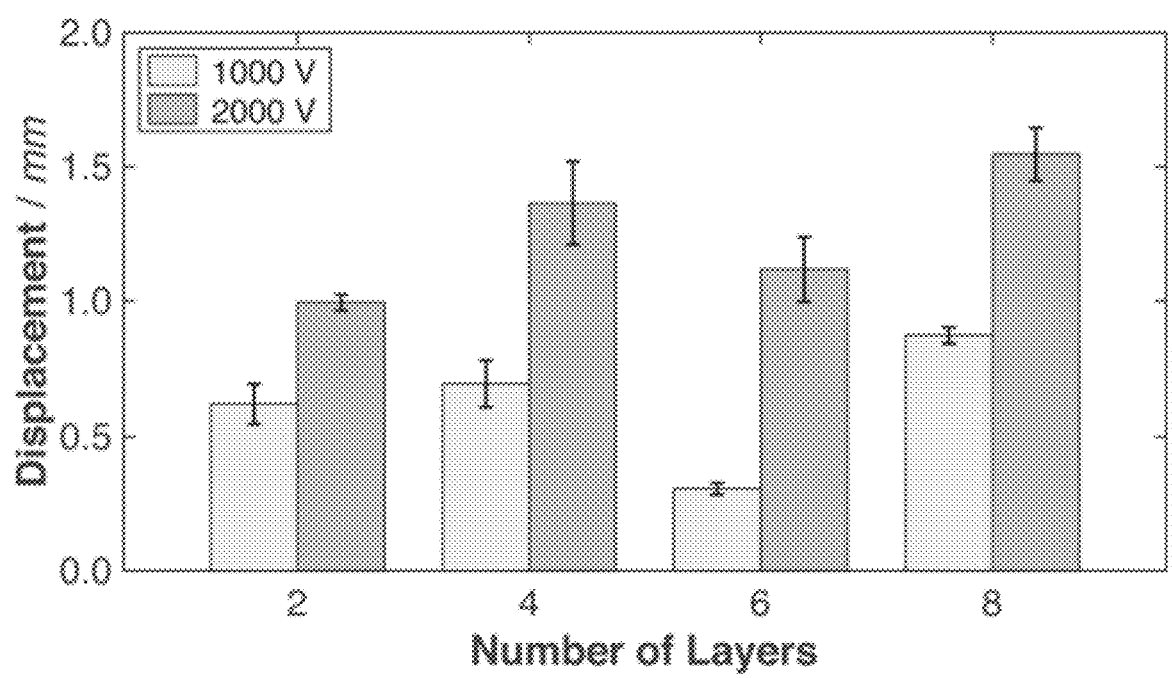
FIG. 35 shows RFA displacement versus number of layers at 0 to 1000/2000 V, with error bars for 6 cycles of a single RFA stack. Static charging of the polyimide substrate reduced displacement in the 6-layer test.

A multi-layer RFA was assembled (FIG. 34) and the actuator's free displacement dependence on number of layers was measured at two operating voltages (FIG. 35). The RFA, with 2-8 layers, is driven by a square-root of sinusoid signal (0-1000 or 2000 V peak-to-peak at 0.25 Hz) for 6 cycles. The peak RFA heights each cycle are recorded by camera and measured in ImageJ. Layers are added in pairs to ensure the outermost electrodes are grounded.

RFA displacement is correlated with both number of layers and voltage: from 0.62 mm (2 layers/1000 V) to 1.55 mm (8 layers/2000 V)—a 2.5× increase. Displacement can thus be increased by operating at higher voltages (shown in [7]) or adding extra layers for a fixed maximum operating voltage. However, continually increasing the number of layers also increases the stack weight and therefore provides diminishing displacement returns.

RFA displacement can also be negatively affected by substrate electrostatic charging, which causes individual layers to stick together and reduces the net stack displacement. This behavior is seen in the 6-layer test with displacements of 0.30 mm at 1000 V and 1.12 mm at 2000 V (the increased repulsive force partially overcomes adhesion from residual charge). Electrostatic charging of polyimide has been reported in literature [15], [16], and minimized using an $O_2$ plasma etch [17].

Micro-Mirror

The micro-mirror assembly (FIG. 30) according to some embodiments uses four stacks of 4-layer RFAs arranged symmetrically around a spring-loaded mirror platform. The four RFAs operate in antagonistic pairs to increase the mirror deflection about each of the two axes of rotation. The RFAs push against, but are not bonded to, the mirror platform. This creates a sliding contact point that decouples the impact of actuators operating orthogonally to one another.

The metallized glass coverslip mirror (100 μm thick) sits on a mirror platform containing a pin-and-socket joint for smooth 2-DoF pivoting with a polyimide helical spring suspension (12 μm thick) providing restoring forces. The pin is a sharpened 0.5 mm carbon-fiber rod; the socket is 3D-printed (Formlabs, Form 2).

Figure 36:
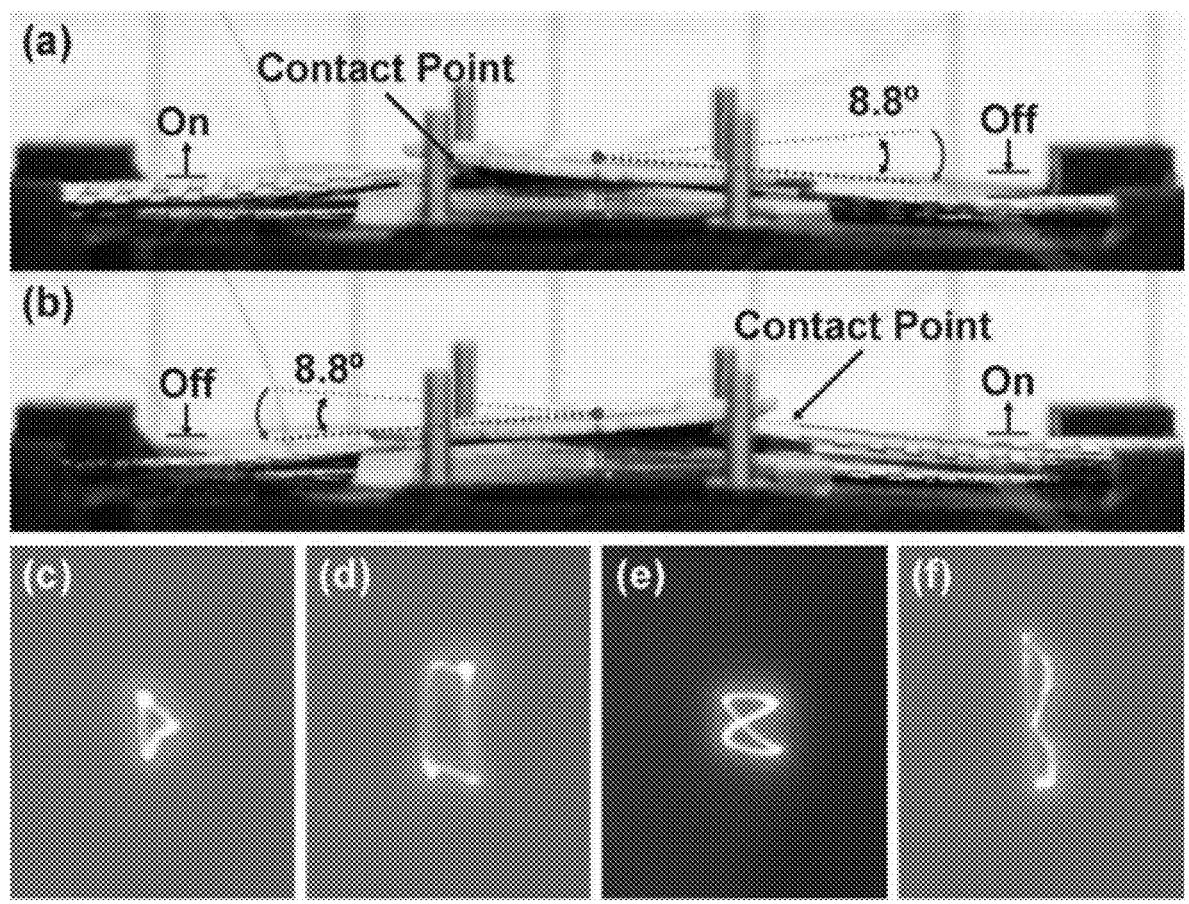
FIG. 36 shows steerable mirror deflections (a-b) along one axis at 1 Hz/2000 V. 2-DoF laser patterns (c-f) with actuators operating at controlled waveforms between 0-2000 V to form (left to right): triangle, rectangle, lissajous, and 'B'.

FIG. 36 shows the 2-DoF micro-mirror in operation, steering a laser beam to repeatably draw multiple patterns using open-loop control. Each actuator is driven by an individual high-voltage amplifier—Trek PZD700 for high frequency, 1000 V tests, and XP Power GP60 for low frequency, 2000 V tests—and opposing actuators are supplied inverted signals (with an offset bias of 50% peak voltage).

Figure 37:
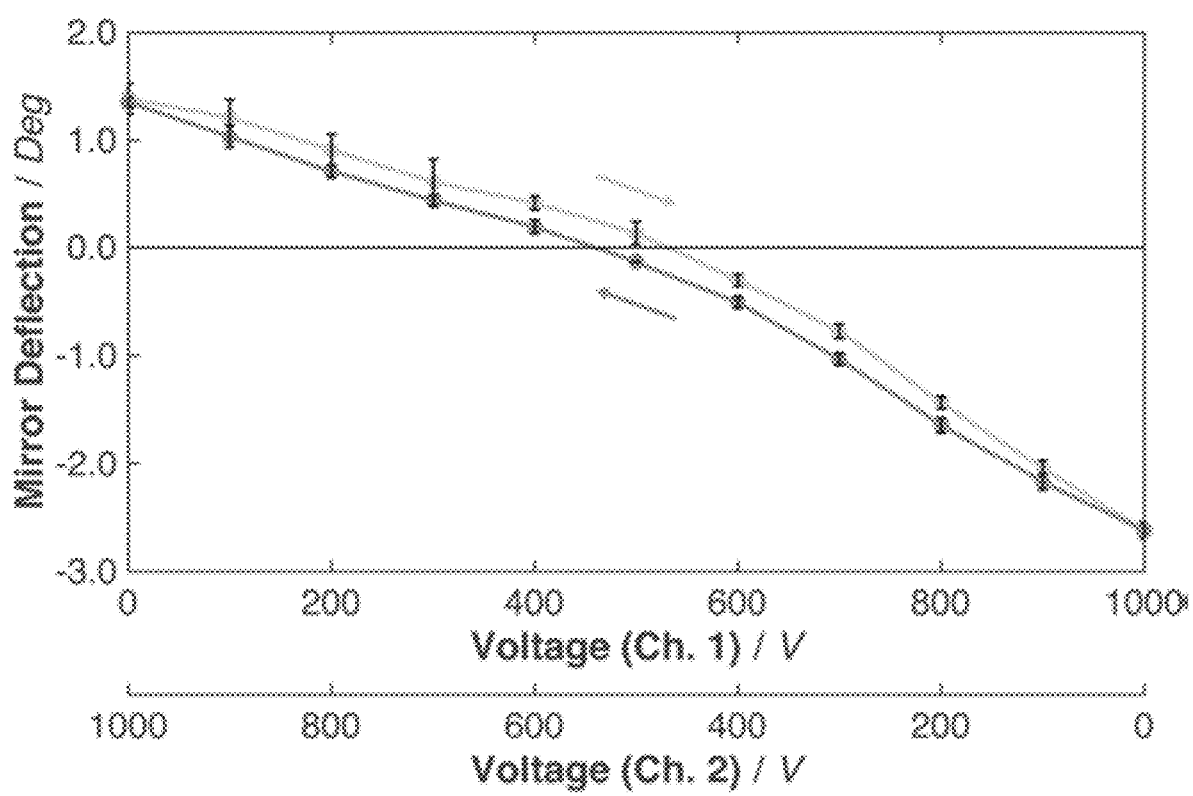
FIG. 37 shows angular displacement of mirror versus applied voltages (0-1000 V) of two antagonistic actuators. Average and standard deviation for 5 cycles with 0.5 sec ramp and hold in 100 V increments.

FIG. 37 shows the angular displacement of the mirror due to two antagonistic actuators operating on one axis of the 2-DoF micro-mirror. The actuators are driven in 100 V steps from 0-1000 V, with measured mirror deflections of +1.4° to −2.6° (over 5 cycles). Deflections up to 8.8° (FIG. 36) were measured when operating at 2000 V. Hysteresis is visible between forward- and back-driving the actuator −0.27° at 500 V, the neutral position where both actuators operate at equal voltage. Discrepancy between the peak positive/negative displacement is likely due to variation in layer manufacturing, alignment, or stacking that enable one actuator to generate greater forces than the other.

Figure 38:
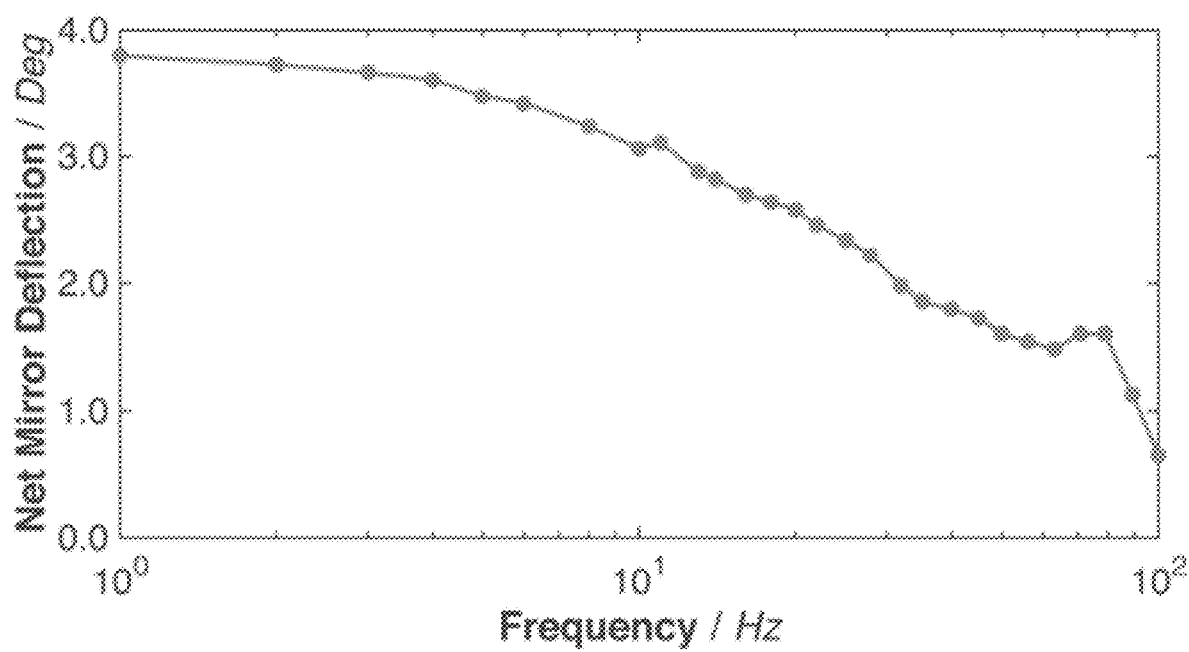
FIG. 38 shows angular displacement of mirror (net) versus operating frequency, for actuators operating with an applied sinusoidal voltage at 0-1000 V.

FIG. 38 shows the frequency response for the same axis of the 2-DoF micro-mirror, with actuators now driven by 0-1000 V sinusoids. The mirror has a low frequency (1 Hz) net displacement of 3.8° and a bandwidth of 35 Hz (−3 dB).

The measured operating properties and peak angular displacement of the micro-mirror are presented in the table in FIG. 39, along with the performance of published micro-mirror systems. Compared to existing 3-DoF systems in [2], [3], [11]: this 2-DoF system generates larger angular displacements (up to 8.8° and 7.6° at 2000 V along the two axes) and higher field strength (33 MV/m), but a lower bandwidth (35 Hz) and minimal out-of-plane translation.

We have demonstrated multi-layer, thin-film repulsive-force electrostatic actuators that generate greater displacements than conventional 2-layer RFAs. A simple manufacturing process using laser-cut metal foil enables rapid fabrication of many RFA layers. A 2-DoF micro-mirror system was then developed, which employs four 4-layer RFAs to stably tilt a spring-loaded mirror up to 8.8° and 7.6° on its two axes with a 35 Hz bandwidth. Prior MEMS devices were limited to angular deflections of ±1.5° [2] (stable) and 3.5° [11] (unstable).

References—Example 2

1. W. C. Tang, M. G. Lim, and R. T. Howe, "Electrostatic comb drive levitation and control method," J. Microelectromech. Syst. 1, 4 (1992), 170-178.
2. S. He, R. Ben Mrad, and J. Chong, "Repulsive-force out-of-plane large stroke translation micro electrostatic actuator," J. Micromech. Microeng. 21, 7 (2011), 75002.
3. S. Towfighian, S. He, and R. Ben Mrad, "A low voltage electrostatic micro actuator for large out-of-plane displacement," in ASME IDETC/CIE (2014), 1-7.
4. S. He and R. Ben Mrad, "Performance assessment of a multi-level repulsive-force out-of-plane microelectrostatic actuator," Can. J. Elect. Comput. Eng. 31, 2 (2006), 71-75.
5. K. Minami, S. Kawamura, and M. Esashi, "Fabrication of distributed electrostatic micro actuator (DEMA)," J. Microelectromech. Syst. 2, 3 (1993), 121-127.
6. M. Ito and K. Saneyoshi, "Development of large-scale stacked-type electrostatic actuators for use as artificial muscles," Adv. Robot., 1864 (2014), 1-9.
7. E. W. Schaler, T. I. Zohdi, and R. S. Fearing, "Thin-film repulsive-force electrostatic actuators," Sensors Actuators A Phys., 270 (2018), 252-261.
8. D. W. Haldane, C. Casarez, J. Karras, J. Lee, C. Li, A. Pullin, E. Schaler, D. Yun, A. Javey, and R. S. Fearing, "Integrated manufacture of exoskeleton and sensing for folded millirobots," J. Mech. Robot. 7, 2 (2015), 19.
9. A. Buchan, "Towards Cooperative SLAM for Low-Cost Biomimetic Robots," EECS Department, University of California, Berkeley (2017).
10. Texas Instruments, "DMD 101: Introduction to Digital Micromirror Device (DMD)," (2013).
11. Z. Yang, B. Jeong, A. Vakakis, and S. Kim, "A tip-tilt-piston micromirror with an elastomeric universal joint fabricated via micromasonry," J. Microelectro-mech. Syst. 24, 2 (2015), 262-264.
12. T. Niino, S. Egawa, and T. Higuchi, "High-power and high-efficiency electrostatic actuator," in IEEE MEMS (1993), 236-241.
13. H. Wang, A. Yamamoto, and T. Higuchi, "Electrostatic-motor-driven electroadhesive robot," in IEEE/RSJ IROS (2012), 914.
14. M. Qi, Y. Zhu, Z. Liu, X. Zhang, X. Yan, and L. Lin, "A fast-moving electrostatic crawling insect," in MEMS (2017), 761-764.
15. M. J. Duck, "Surface charging and its prevention," in The Behavior of Systems in the Space Environment, R. N. DeWitt, D. Duston, and A. K. Hyder, Eds. Dordrecht: Springer Netherlands (1993), 867-872.
16. D. Verdin, "Electrostatic discharging behaviour of Kapton irradiated with electrons," Spacecr. Charg. Technol. (1981), 96-114.
17. J. H. Lee and H. C. Jeong, "Removal of static electricity on polyimide film surface by O2 or Ar cold plasma etching," Fibers Polym. 5, 2 (2004), 151-155.

Example 3

In recent years, a new class of planar, repulsive-force electrostatic actuators have been designed in the millimeter to centimeter scale. These actuators include layers with two conductive electrodes separated by an insulating film. By stacking multiple layers and charging to high voltages (1000-5000V), these layers produce a repulsive force and separate. Previous fabrication methods use a relatively expensive and time consuming flex-PCB manufacturing process, which entails etching copper-coated plastics into the desired electrode patterns. We can create the same actuators using a faster, easier, and more cost-effective process for assembling the layers: laser cutting the electrodes from a metallized plastic film or metal sheet and laminating them onto an insulating film substrate. Fabricated actuators successfully generated >4 mN of force at 1000V, and are then used to power a cm-sized mobile robot.

Figure 40:
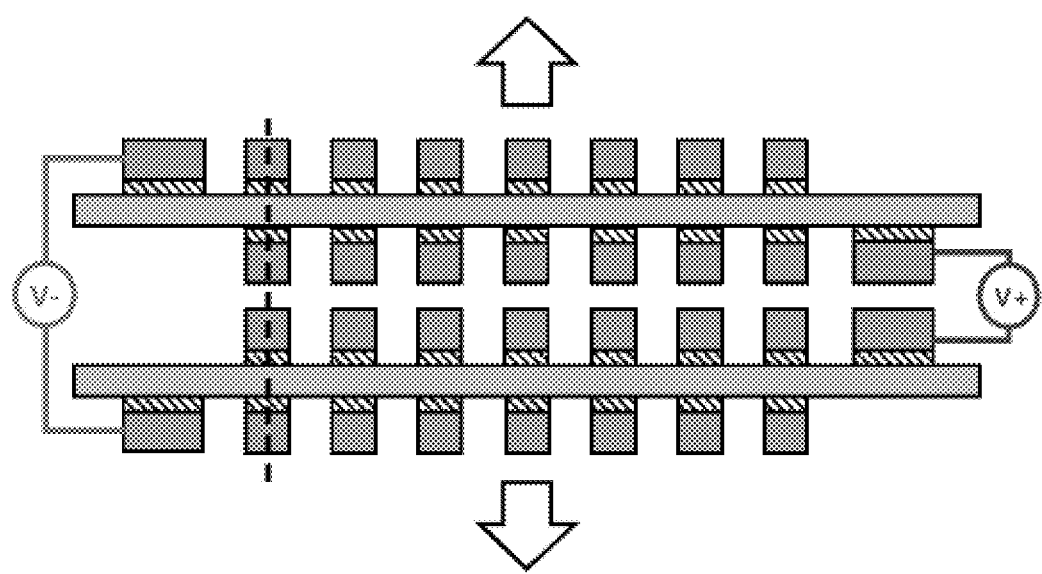
FIG. 40 shows two actuator layers according to some embodiments of the invention.
Figure 41:
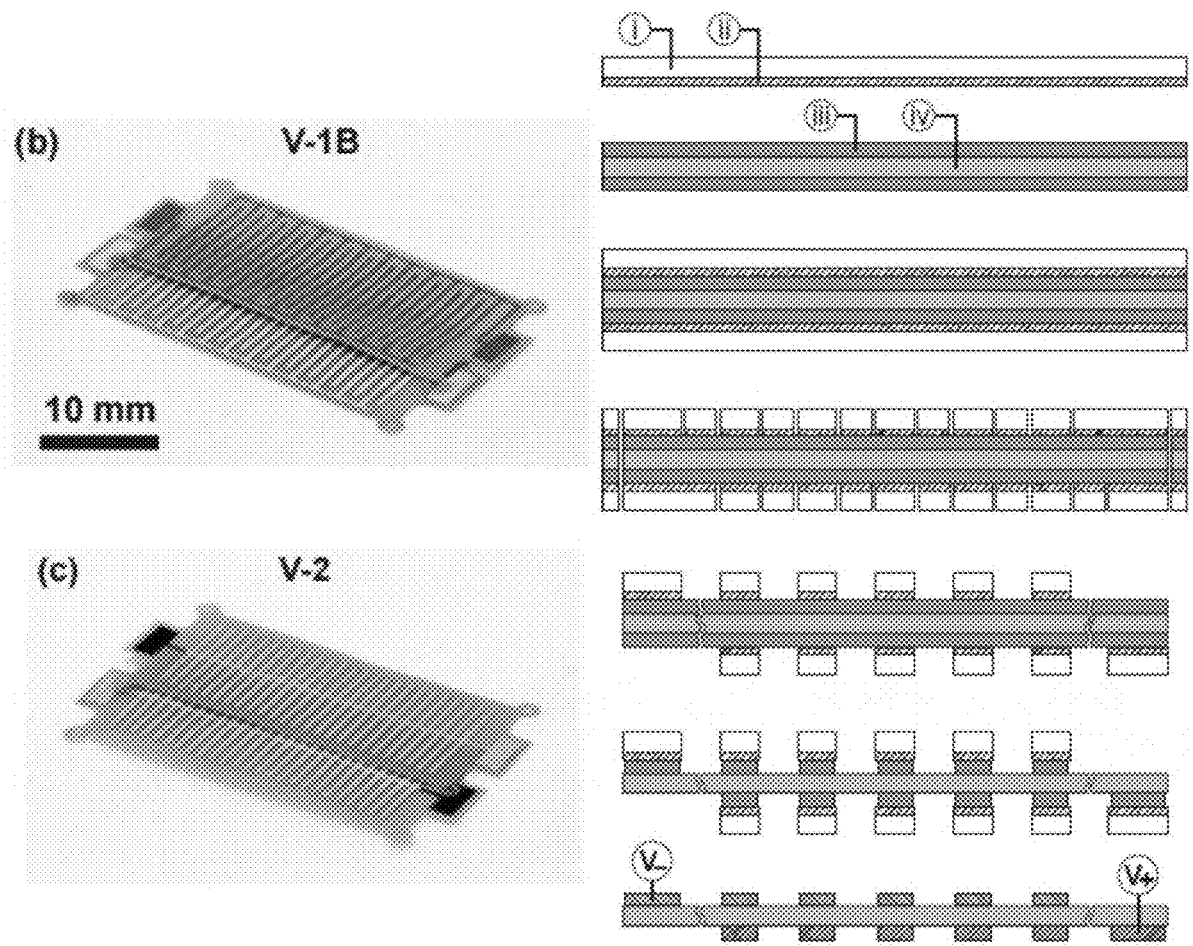
FIG. 41 shows on the right-hand side a flex circuit manufacturing process that etches an electrode design onto copper foil using ferric chloride ($FeCl_3$), and the left-hand side actuators manufactured according to embodiments of the invention.

FIG. 40 shows two actuator layers according to some embodiments. Each actuator layer includes two conductive films with desired electrode patterns, and one insulating dielectric film substrate. By stacking multiple layers and charging to 1000-5000V, the layers produce a repulsive force. FIG. 41 shows on the right-hand side a flex circuit manufacturing process that etches an electrode design onto copper foil using ferric chloride ($FeCl_3$). Embodiments of the invention provide a faster, cheaper process for manufacturing actuators, such as those shown on the lift-hand side of FIG. 41. The method enables prototyping and is useful for low-force actuation, for sensing, and for applications in mobile robots.

Figure 42:
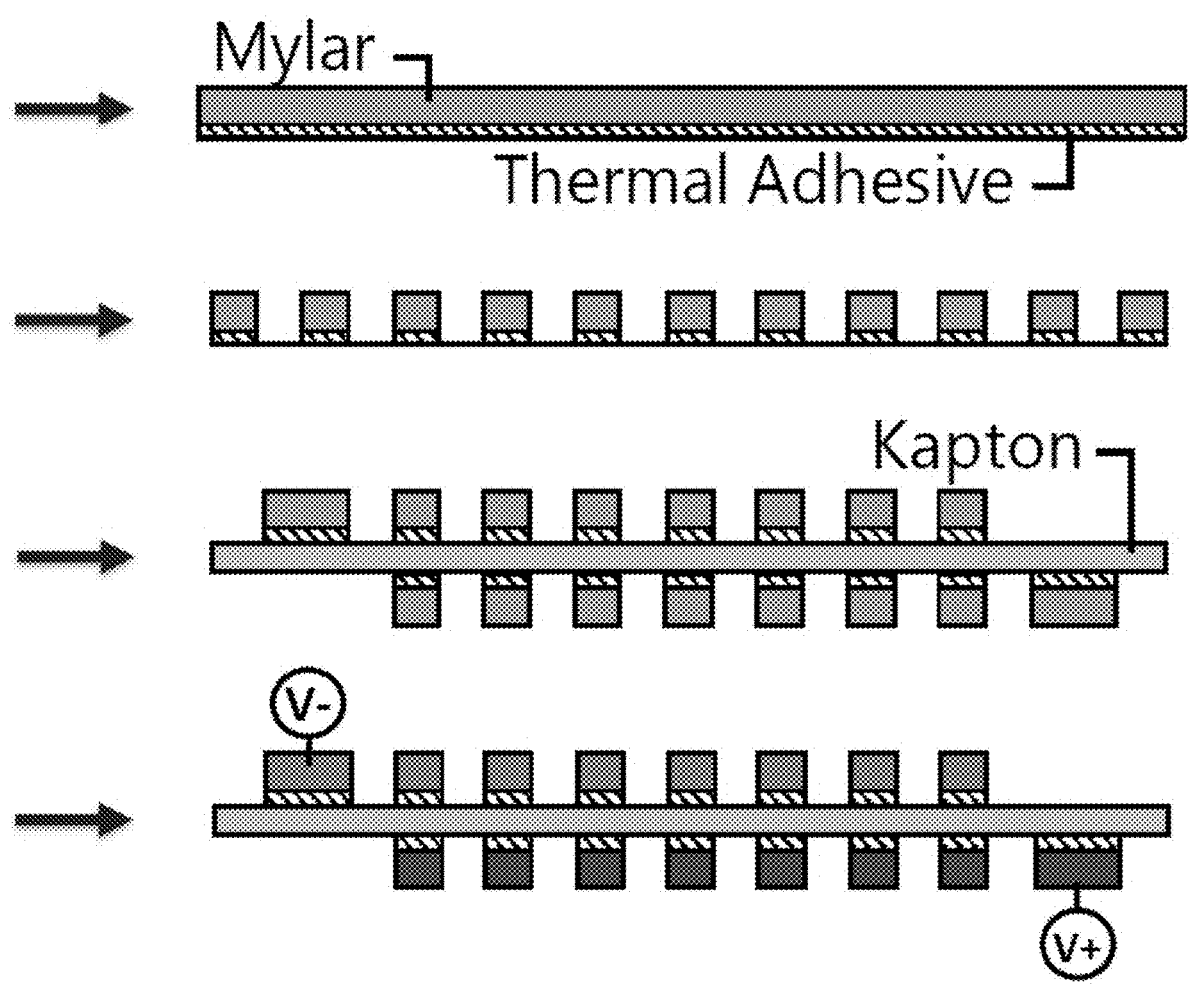
FIG. 42 shows a method for fabricating an actuator layer according to some embodiments.
Figure 43:
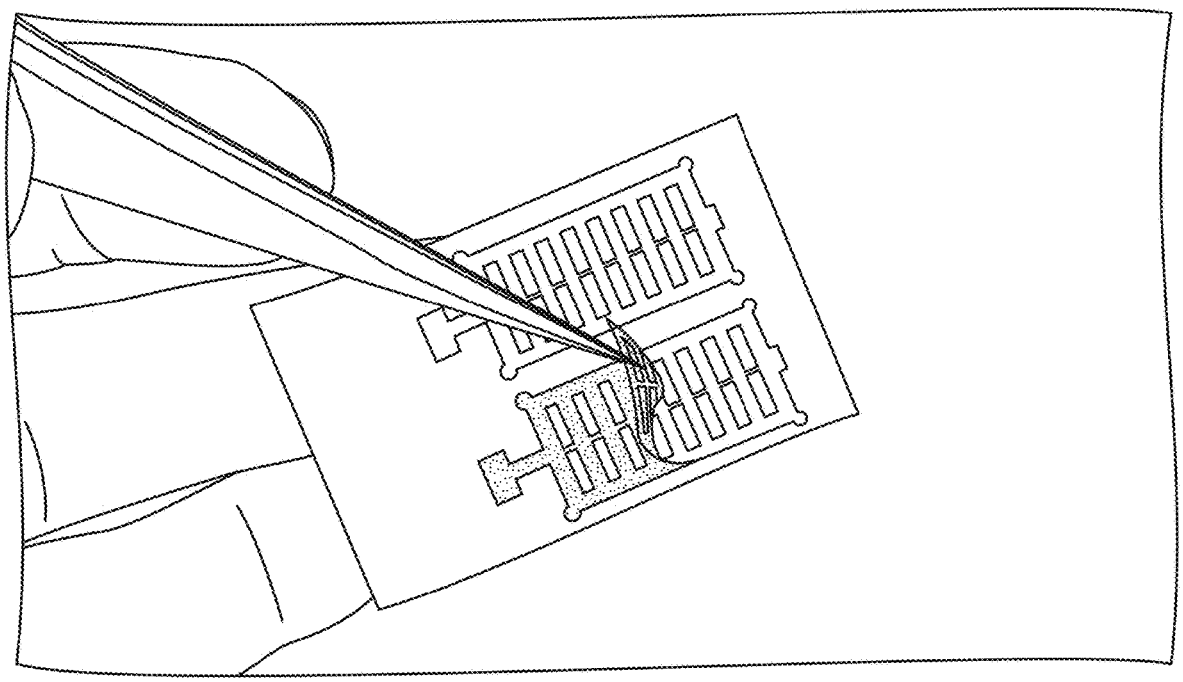
FIG. 43 shows peeling of an electrode pattern.
Figure 44:
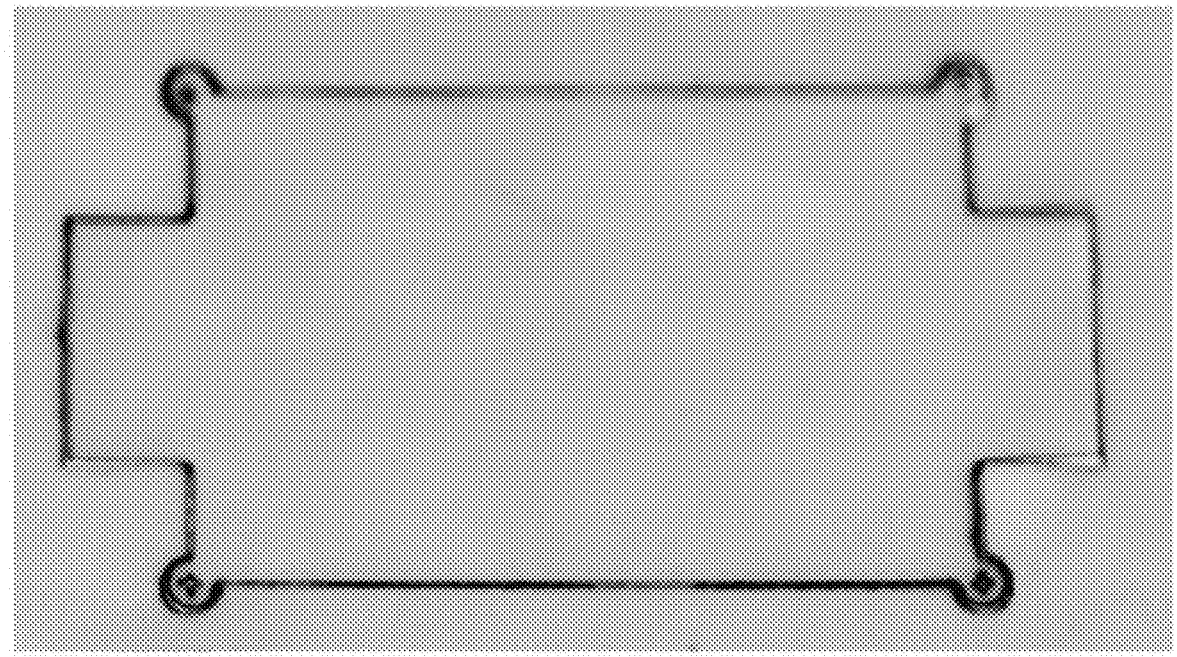
FIG. 44 shows a 25 μm Kapton film.

FIG. 42 shows a method for fabricating an actuator layer according to some embodiments. A thermal adhesive is laminated onto an AL-coated Mylar (for example, 25 μm thick) or stainless steel (for example, 12 μm) sheet. An electrode pattern is laser cut in the Al-coated Mylar or stainless steel. The electrode pattern is peeled, as shown in FIG. 43, and placed on a first side of an insulator layer, for example, Kapton. FIG. 44 shows a 25 μm Kapton film. A second electrode pattern is placed on the opposite side of the insulator layer, aligned with the first electrode pattern. The actuator layer can be laminated and attached to a voltage source.

Figure 45:
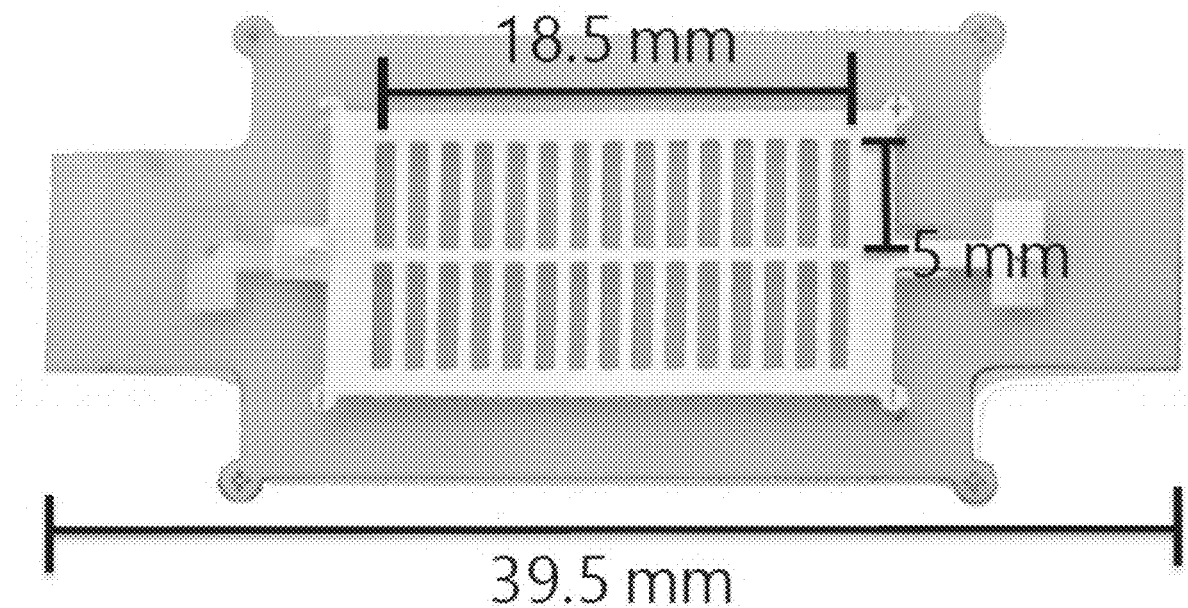
FIG. 45 shows an Al-coated Mylar actuator according to some embodiments.
Figure 46:
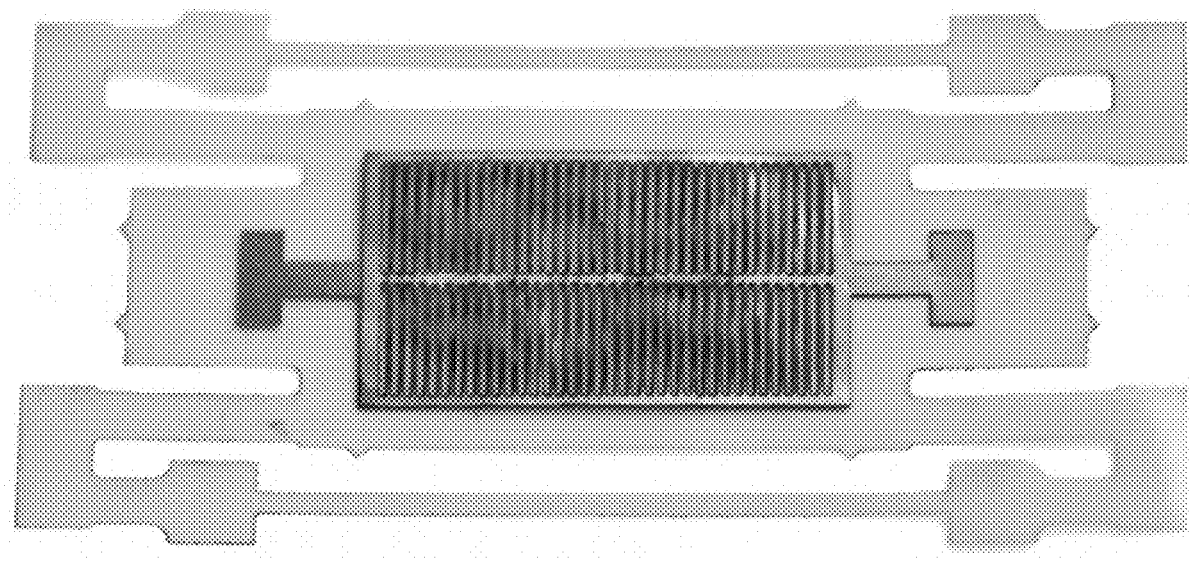
FIG. 46 shows a stainless steel actuator according to some embodiments.
Figure 47:
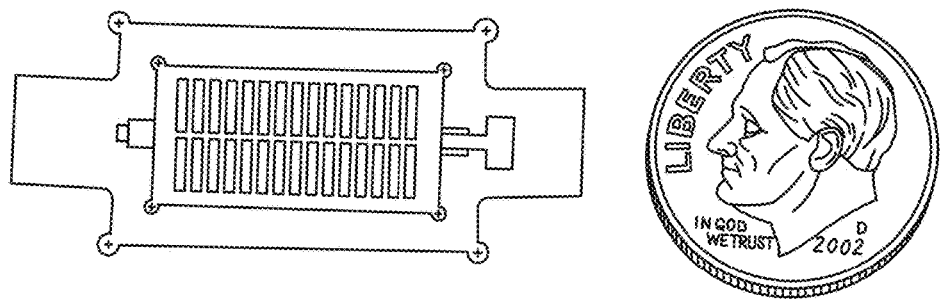
FIG. 47 shows the Al-coated Mylar actuator and a dime for comparison.
Figure 48:
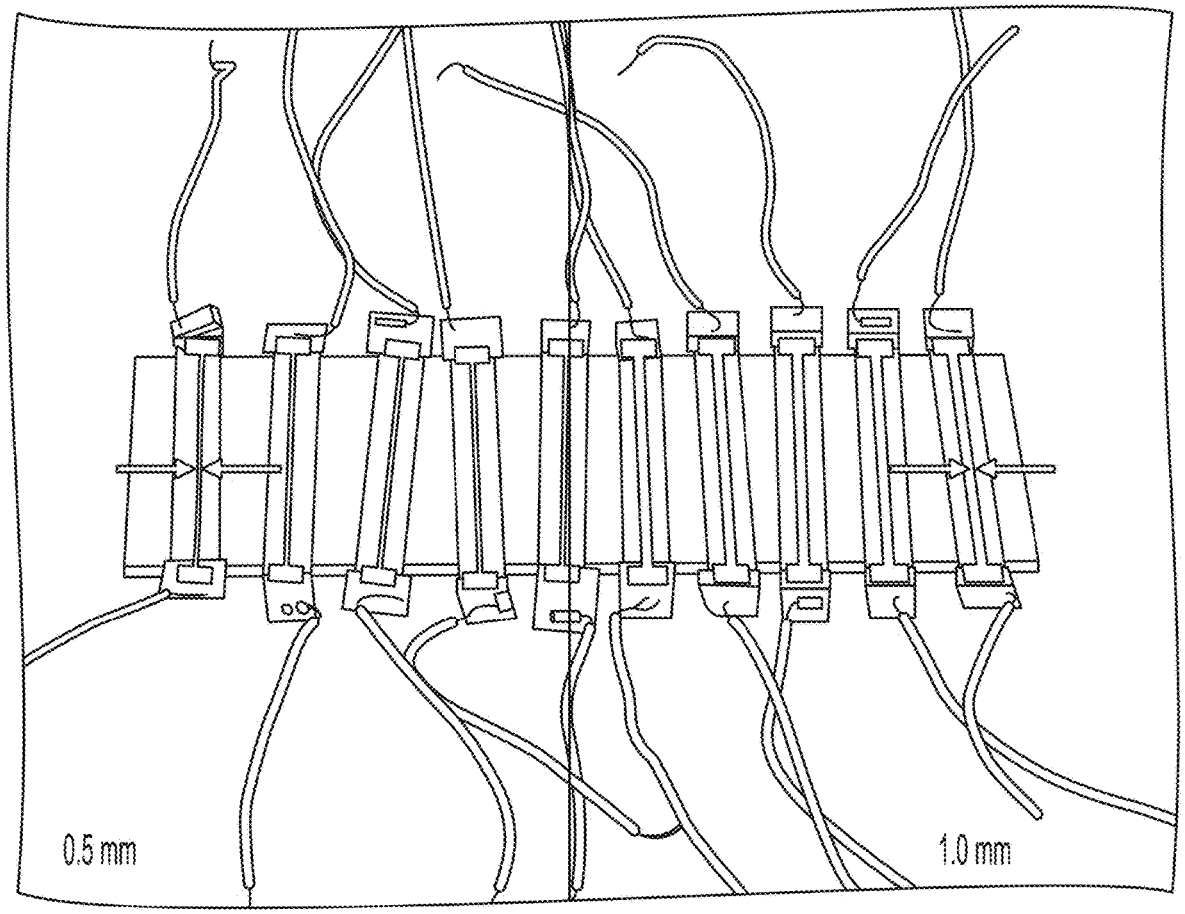
FIG. 48 shows a plurality of 25 μm metalized Mylar actuators having 0.5 mm bars (left side) and 1.0 mm bars (right side).

FIG. 45 shows an Al-coated Mylar actuator according to some embodiments, and FIG. 46 shows a stainless steel actuator according to some embodiments. FIG. 47 shows the Al-coated Mylar actuator and a dime for comparison. FIG. 48 shows a plurality of 25 μm metalized Mylar actuators having 0.5 mm bars (left side) and 1.0 mm bars (right side). 0/5 of the 0.5 mm bars were conductive (likely due to breaks in the wire), and 3/5 of the 1.0 mm bars were conductive (1200Ω average). It appears that aluminum coated Mylar is susceptible to scratches and breaks that reduce conductivity.

Figure 49:
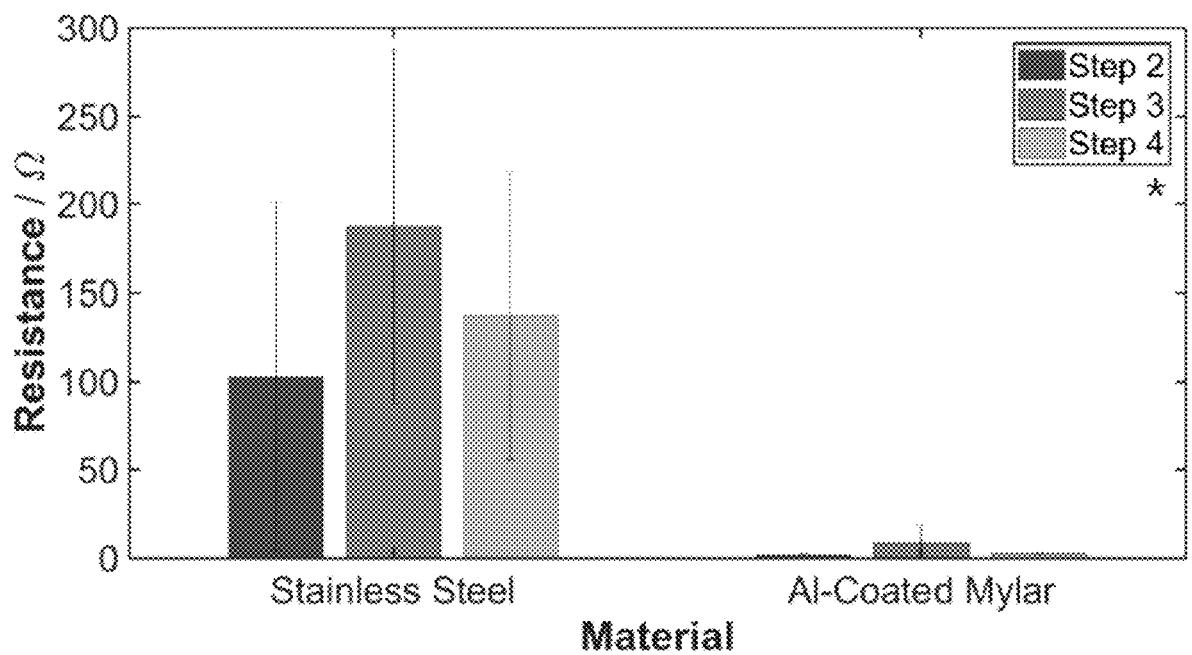
FIG. 49 shows resistance measurements for stainless steel and Al-coated Mylar actuators.
Figure 50:
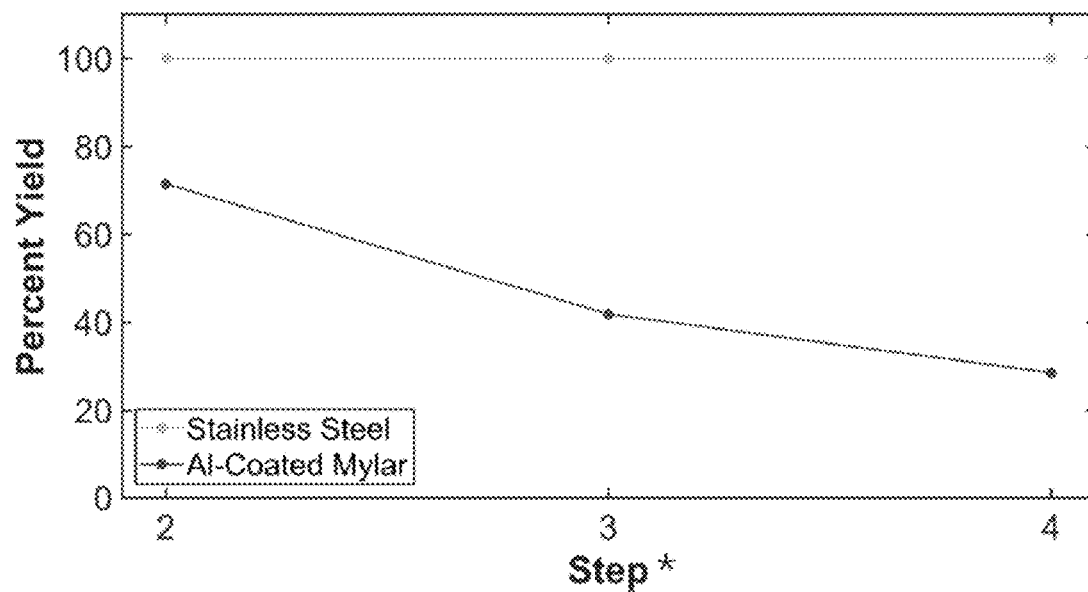
FIG. 50 shows resistance yield for stainless steel and Al-coated Mylar actuators.

FIGS. 49 and 50 show resistance measurements (FIG. 49) and resistance yield (FIG. 50) for stainless steel and Al-coated Mylar actuators. Stainless Steel actuators have superior conductivity and yield to Al-coated Mylar actuators. The steps refer to the four panels in FIG. 42 and the description thereof.

Figure 51:
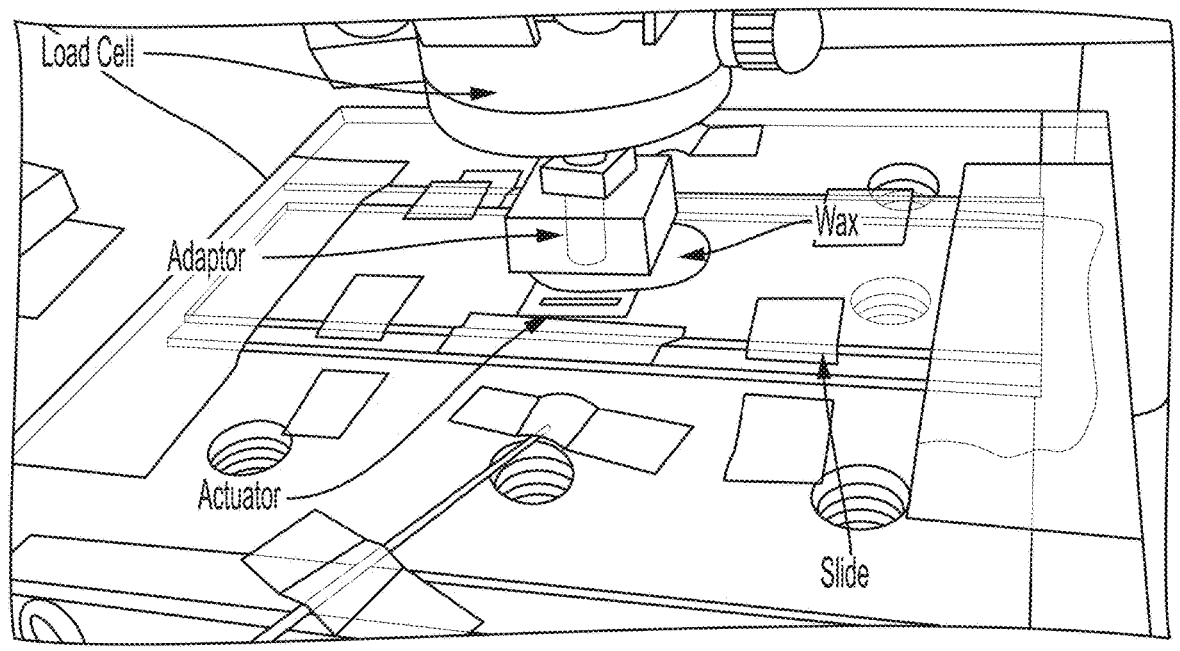
FIG. 51 shows a setup for blocked force characterization.
Figure 52:
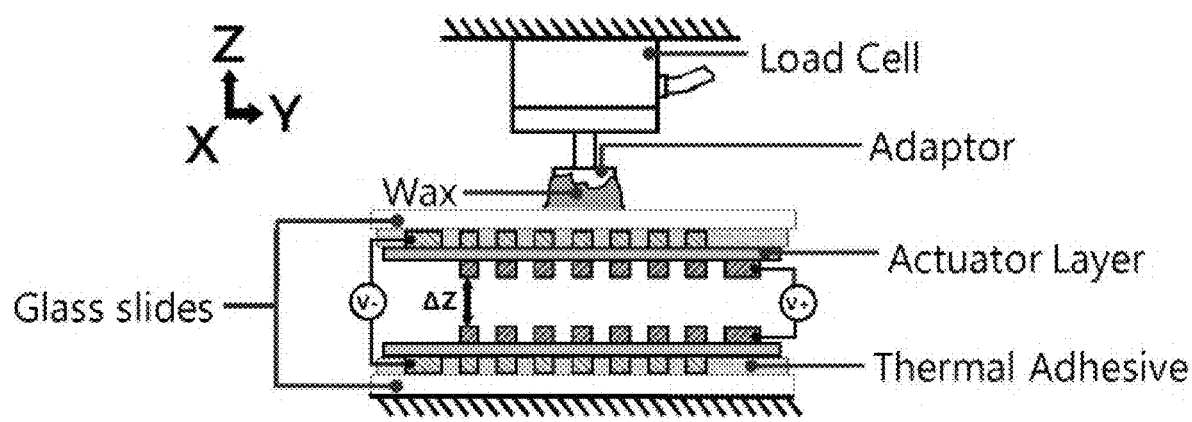
FIG. 52 shows a mechanical diagram of the setup shown in FIG. 51.
Figure 53:
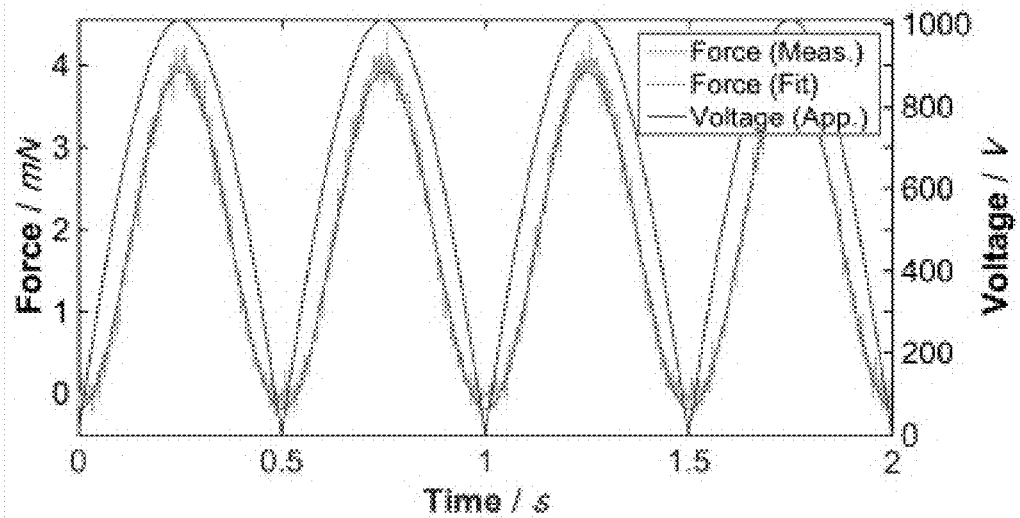
FIG. 53 shows force and applied voltage over time.
Figure 54:
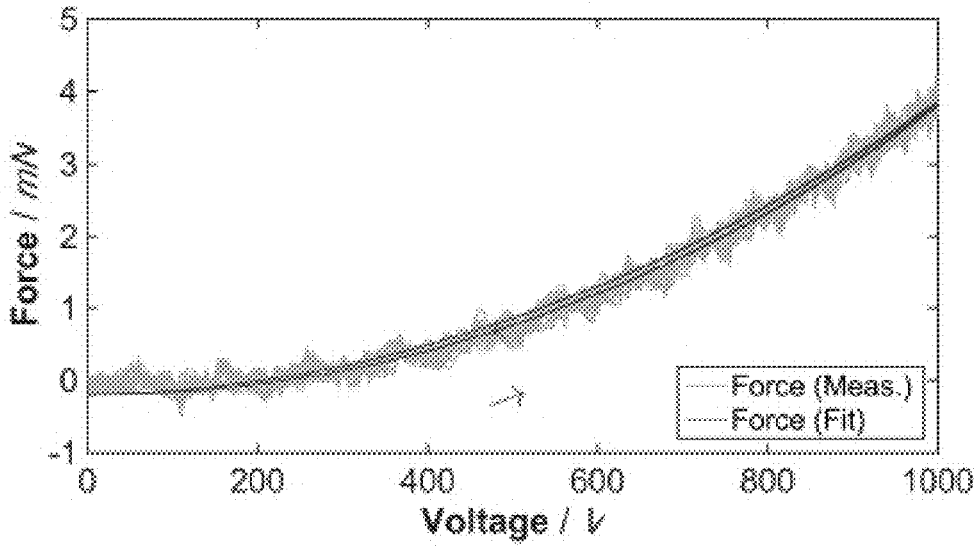
FIG. 54 shows force versus voltage.
Figure 55:
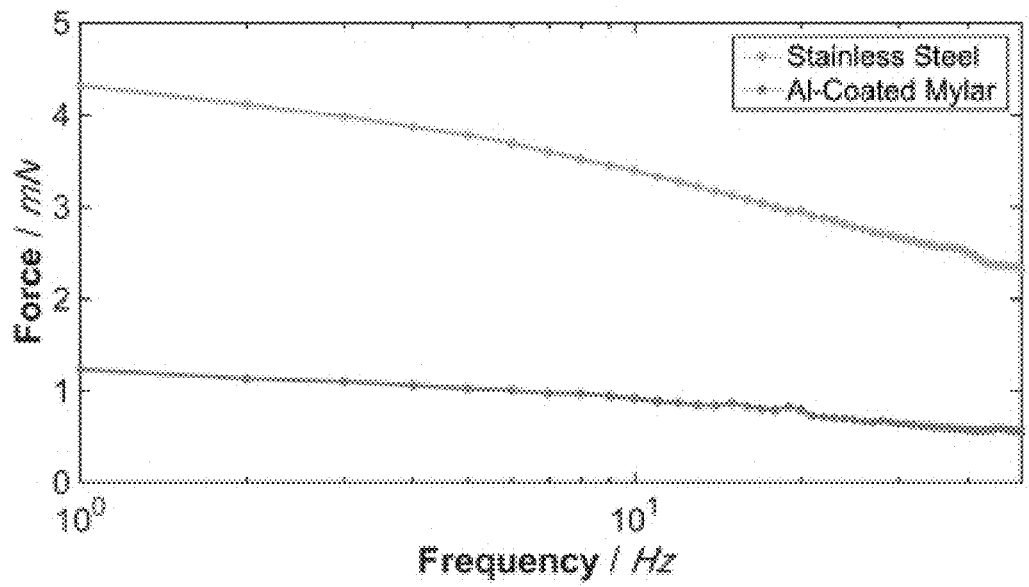
FIG. 55 shows force versus frequency.
Figure 56:
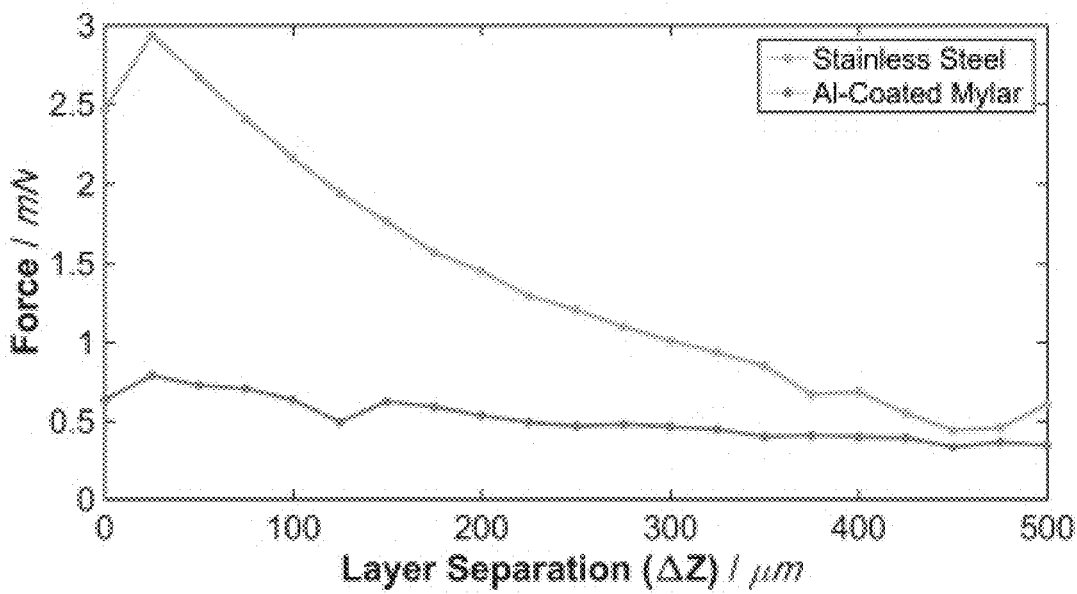
FIG. 56 shows force versus z-axis offsets.

FIG. 51 shows a setup for blocked force characterization, and FIG. 52 shows a mechanical diagram of the setup. FIGS. 53-56 show force testing results. Force correlates quadratically with voltage; the greater the voltage, the greater the repulsive force. Voltage and force peaks occur at the same time. A maximum repulsive force (4 mN) is generated by the two layers with a separation of $\Delta Z=50$ μm and charged to 1000 V. FIG. 55 shows that as frequency increases, the force decreases by approximately 50%. FIG. 56 shows that actuator force is proportional to the inverse of distance squared, with distance measured as the gap between the two actuator layers (i.e. that force decreases quadratically as gap between layers increases linearly). A square-root of sinusoid voltage at 2 Hz/1000 V peak-to-peak is applied to the actuator to generate the measured forces.

FIGS. 57 and 58 show a low-cost, easy-to-assemble robot powered by a flexible repulsive force electrostatic actuator. The robot frame was assembled from 0.67 mm diameter carbon fiber rods aligned in a 3-D printed jig. Actuator suspension adhered to the robot frame. The actuator was powered by an off-board high voltage power supply. The actuator would vibrate at the natural resonant frequency of the robot body, with the goal of causing the robot to vibrate and slide forward through variable friction on the forward-angled legs. The actuator vibration was mechanically coupled into the robot body, as the actuator was physically suspended from the robot's carbon-fiber frame.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A repulsive-force electrostatic actuator, comprising:
    a first actuator layer comprising:
        a first substrate of a first dielectric material having a first transverse thickness and two opposing surfaces,
        a first electrode pattern at least one of attached to or formed on one of said two opposing surfaces of said first substrate, and
        a second electrode pattern at least one of attached to or formed on the other one of said two opposing surfaces of said first substrate so as to be on an opposing side with respect to said first electrode pattern,
    wherein said first and second electrode patterns are substantially a same pattern, and
    wherein said first and second electrode patterns are substantially aligned with each other in a direction of said first transverse thickness on said two opposing surfaces of said first substrate;
    a second actuator layer spaced apart from said first actuator layer with at least one of a vacuum, air, a gas or a dielectric material therebetween, said second actuator layer comprising:
        a second substrate of a second dielectric material having a second transverse thickness and two opposing surfaces,
        a third electrode pattern at least one of attached to or formed on one of said two opposing surfaces of said second substrate, and
        a fourth electrode pattern at least one of attached to or formed on the other one of said two opposing surfaces of said second substrate so as to be on an opposing side with respect to said third electrode pattern,
    wherein said third and fourth electrode patterns are substantially the same pattern of said first and second electrode patterns, and
    wherein said third and fourth electrode patterns are substantially aligned with each other in a direction of said second transverse thickness on said two opposing surfaces of said second substrate;
    at least one voltage source connected to said first, second, third and fourth electrode patterns such that, during operation, each is entirely at a common voltage across the corresponding electrode pattern, said first electrode pattern is at an opposite voltage relative to said second electrode pattern, said third electrode pattern is at an opposite voltage relative to said fourth electrode pattern, and said first and second actuator layers are arranged to have a repulsive electrostatic force therebetween during operation; and
    an actuator frame connected to said first and second actuator layers such that at least a portion of at least one of said first and second actuator layers is movable due to an applied voltage to effect motion to an object at least one of attached to or in mechanical connection to said repulsive-force electrostatic actuator when in operation.

2. The repulsive-force electrostatic actuator according to claim 1, wherein said first and second substrates are each at least one of a thin film or a sheet of a first dielectric material and a second dielectric material, respectively.

3. The repulsive-force electrostatic actuator according to claim 1, wherein said first and second dielectric materials are each selected from at least one of a polyimide or biaxially-oriented polyethylene terephthalate.

4. The repulsive-force electrostatic actuator according to claim 1, wherein said first and second dielectric materials are the same dielectric material.

5. The repulsive-force electrostatic actuator according to claim 4, wherein said first and second dielectric materials are both poly (4,4'-oxydiphenylene-pyromellitimide).

6. The repulsive-force electrostatic actuator according to claim 1, wherein said actuator frame is connected to said first and second actuator layers such that one edge thereof is held relatively fixed and an opposite edge is free to move with a cantilever motion.

7. The repulsive-force electrostatic actuator according to claim 1, wherein said actuator frame is connected to said first and second actuator layers such that said at least one of said first and second actuator layers moves in a direction substantially orthogonal to said two opposing surfaces of said first and second substrates to provide substantially translational motion in operation while said first and second substrates remain substantially parallel to each other.

8. The repulsive-force electrostatic actuator according to claim 1, wherein said at least one voltage source is a high-voltage source capable of providing a voltage of at least 1 kV.

9. The repulsive-force electrostatic actuator according to claim 1, wherein said at least one voltage source is a high-voltage source capable of providing a voltage of between 1 kV to 5 kV.

10. The repulsive-force electrostatic actuator according to claim 1, wherein said first, second, third and fourth electrode patterns each comprises a plurality of substantially parallel rectangular electrode portions interconnected by a substantially rectangular electrode portion.

11. The repulsive-force electrostatic actuator according to claim 1, wherein said first, second, third and fourth electrode patterns are each substantially a fractal electrode pattern.

12. The repulsive-force electrostatic actuator according to claim 1, wherein a width of said first electrode pattern in a direction perpendicular to said first transverse thickness is greater than a width of said second electrode pattern in said direction perpendicular to said first transverse thickness, and
    wherein a width of said third electrode pattern in a direction perpendicular to said second transverse thickness is less than a width of said fourth electrode pattern in said direction perpendicular to said second transverse thickness.

13. The repulsive-force electrostatic actuator according to claim 1, wherein said second electrode pattern opposes and is spaced apart from said third electrode pattern with at least one of a vacuum, air, a gas or a dielectric material therebetween, and wherein said opposing second electrode pattern and third electrode pattern are contained within a projection of said first electrode pattern and said fourth electrode pattern.

14. The repulsive-force electrostatic actuator according to claim 1, further comprising:

a third actuator layer spaced apart from said first and second actuator layers with at least one of a vacuum, air, a gas or a dielectric material therebetween, said third actuator layer comprising:

a third substrate of a third dielectric material having a transverse thickness and two opposing surfaces, a fifth electrode pattern at least one of attached to or formed on one of said two opposing surfaces of said third substrate, and a sixth electrode pattern at least one of attached to or formed on the other one of said two opposing surfaces of said third substrate so as to be on an opposing side with respect to said fifth electrode pattern, wherein said fifth and sixth electrode patterns are substantially the same pattern of said first and second electrode patterns, and wherein said fifth and sixth electrode patterns are substantially aligned with each other in a direction of said transverse thickness on said two opposing surfaces of said third substrate, wherein said at least one voltage source is further connected to said fifth and sixth electrode patterns such that, during operation, each is entirely at a common voltage across the corresponding electrode pattern, said fifth electrode pattern is at an opposite voltage relative to said sixth electrode pattern, and said first, second and third actuator layers are arranged to have repulsive electrostatic force with a closest one of said first, second and third actuator layers; and wherein said actuator frame is further connected to said third actuator layer such that at least a portion of at least one of said first, second and third actuator layers is movable due to an applied voltage to effect motion to an object at least one of attached to or in mechanical connection to said repulsive-force electrostatic actuator.

15. The repulsive-force electrostatic actuator according to claim 14, wherein said fifth and sixth electrode patterns each comprises a plurality of substantially parallel rectangular electrode portions interconnected by a substantially rectangular electrode portion.

16. The repulsive-force electrostatic actuator according to claim 14, wherein said fifth and sixth electrode patterns are each substantially a fractal electrode pattern.

17. The repulsive-force electrostatic actuator according to claim 14, said repulsive-force electrostatic actuator comprising four or more actuator layers, each actuator layer being spaced apart from an adjacent actuator layer, each actuator layer having an electrode pattern at an opposite voltage relative an electrode pattern of said adjacent actuator layer, and each actuator layer being arranged to have repulsive electrostatic force with said adjacent actuator layer.

18. A steerable optical component, comprising:

an optical component attached to an assembly which allows motion in at least one degree of freedom; and repulsive-force electrostatic actuator according to claim 1 arranged in mechanical connection with said optical component.

19. A surface coating comprising a plurality of repulsive-force electrostatic actuators according to claim 1 arranged in an array to control interaction of at least one of a fluid or electromagnetic radiation interactions with a surface coated therewith.

20. A robotic device comprising a plurality of repulsive-force electrostatic actuators according to claim 1 arranged to effect motion of said robotic device.

21. A biological cell growth device comprising a plurality of repulsive-force electrostatic actuators according to claim 1 arranged to effect motion of biological cells being grown or maintain therein.

* * * * *